US012759807B2

(12) United States Patent
Cutter et al.

(10) Patent No.: US 12,759,807 B2
(45) Date of Patent: Oct. 13, 2026

(54) SYSTEMS AND TECHNIQUES FOR ASSEMBLING AND INTRODUCING CARTRIDGES INTO BEVERAGE CONTAINERS DURING PACKAGING

(71) Applicant: Beverage Booster Inc., Boulder, CO (US)

(72) Inventors: Matthew Alex Cutter, Boulder, CO (US); Alexis S. Foreman, Boulder, CO (US); Zack Savarise, Golden, CO (US)

(73) Assignee: Beverage Booster Inc., Boulder, CO (US)

( * ) Notice: Subject to any disclaimer, the term of this patent is extended or adjusted under 35 U.S.C. 154(b) by 0 days.

(21) Appl. No.: 19/353,283

(22) Filed: Oct. 8, 2025

(65) Prior Publication Data

US 2026/0097910 A1 Apr. 9, 2026

Related U.S. Application Data

(60) Provisional application No. 63/858,492, filed on Aug. 6, 2025, provisional application No. 63/705,258, filed on Oct. 9, 2024.

(51) Int. Cl.
*B65G 47/84* (2006.01)
*B65G 47/34* (2006.01)
(Continued)

(52) U.S. Cl.
CPC ........... *B65G 47/846* (2013.01); *B65G 47/34* (2013.01); *B65B 7/26* (2013.01); *B65B 29/025* (2017.08);
(Continued)

(58) Field of Classification Search
CPC .... B65G 51/04–46; B65B 35/28; B65B 37/14
(Continued)

(56) References Cited

U.S. PATENT DOCUMENTS 3,119,215 A 1/1964 Polk, Jr.
3,410,452 A 11/1968 Wolfgang et al.
(Continued)

FOREIGN PATENT DOCUMENTS

CN 106864834 A * 6/2017 ............ B65B 37/14
CN 116461771 A * 7/2023 ............ B65B 35/24
WO WO-2016118687 A1 * 7/2016 ............ B65G 47/72

OTHER PUBLICATIONS

International Search Report and Written Opinion for PCT Application No. PCT/US2025/050104, mailed Feb. 3, 2026, Authorized Officer: Harry Kim, 16 pages.
(Continued)

*Primary Examiner* — Joseph A Dillon, Jr.

(57) ABSTRACT

Systems and methods for assembling and introducing cartridges containing remediating component(s) into packaged beverages are provided herein. In particular, a transport system for transporting sealed cartridges to an introduction system for delivery into beverage containers is provided herein. The transport system may receive cartridges from the source, via an inlet, into a straight-line tube having a diameter approximately 1.1 times a width of the cartridges. A transition guide fluidly connects the straight-line tube to the introduction system and may include an outlet opening through which cartridges are dispensed. The transport system includes assist jets configured to inject inert gas into the straight-line tube to propel cartridges, pressure sensors disposed along the transport tube to detect cartridge presence or movement, and a control system operably coupled to the pressure sensors and assist jets to modulate gas injection and control delivery of the cartridges to the introduction system.

20 Claims, 41 Drawing Sheets

(51) Int. Cl.

| | |
|---|---|
| *B65B 7/26* | (2006.01) |
| *B65B 29/02* | (2006.01) |
| *B65B 31/02* | (2006.01) |
| *B65B 31/04* | (2006.01) |
| *B65B 55/12* | (2006.01) |
| *B65G 43/08* | (2006.01) |
| *B65G 51/02* | (2006.01) |

(52) U.S. Cl.
CPC ............. *B65B 31/025* (2013.01); *B65B 31/04* (2013.01); *B65B 55/12* (2013.01); *B65G 43/08* (2013.01); *B65G 51/02* (2013.01)

(58) Field of Classification Search
USPC ............................................................ 406/92
See application file for complete search history.

(56) References Cited

U.S. PATENT DOCUMENTS

| | | | | | |
|---|---|---|---|---|---|
| 4,135,685 | A * | 1/1979 | Girshovich | B65G 51/20 | 406/84 |
| 4,236,851 | A * | 12/1980 | Szasz | B65G 51/03 | 406/72 |
| 4,655,338 | A * | 4/1987 | Hershey | B65G 47/847 | 198/395 |
| 4,807,425 | A | 2/1989 | Abrams | | |
| 4,995,765 | A | 2/1991 | Tokuhiro et al. | | |
| 5,373,930 | A * | 12/1994 | Tsuzuki | B65H 67/064 | 198/399 |
| 5,503,198 | A * | 4/1996 | Becker | F17C 9/00 | 141/285 |
| 5,620,725 | A | 4/1997 | Jamieson et al. | | |
| 5,660,506 | A * | 8/1997 | Berge | F25C 5/20 | 406/33 |
| 5,660,867 | A | 8/1997 | Reynolds et al. | | |
| 5,715,874 | A | 2/1998 | Reynolds et al. | | |
| 5,827,555 | A | 10/1998 | Thorne et al. | | |
| 6,092,979 | A * | 7/2000 | Miselli | B65B 35/54 | 414/790.7 |
| 6,116,820 | A * | 9/2000 | Suzuki | B65B 5/04 | 406/77 |
| 6,200,071 | B1 * | 3/2001 | Karasawa | B65G 53/521 | 406/92 |
| 6,210,081 | B1 * | 4/2001 | Saho | B23P 19/004 | 406/75 |
| 6,219,996 | B1 | 4/2001 | Searle | | |
| 6,261,030 | B1 * | 7/2001 | Rassman, Jr. | B65G 47/248 | 406/28 |
| 6,382,880 | B2 * | 5/2002 | Rassman, Jr. | B65G 47/248 | 406/88 |
| 6,390,736 | B2 * | 5/2002 | Rassman, Jr. | B65G 51/02 | 406/28 |
| 6,447,215 | B1 * | 9/2002 | Wellmar | B65G 53/66 | 406/122 |
| 6,939,088 | B2 * | 9/2005 | Farrell | B65G 51/32 | 406/192 |
| 7,191,807 | B2 * | 3/2007 | DeMaison | G03G 15/0877 | 141/83 |
| 7,251,544 | B2 * | 7/2007 | Christie, Jr. | G11B 17/225 | 700/229 |
| 7,255,220 | B2 * | 8/2007 | Iwai | B65G 35/06 | 198/465.4 |
| 7,264,421 | B2 * | 9/2007 | Brown | B65G 51/34 | 406/176 |
| 7,293,395 | B1 | 11/2007 | Galloway et al. | | |
| 7,401,695 | B2 * | 7/2008 | DerMarderosian | B65G 11/203 | 406/84 |
| 8,333,224 | B2 * | 12/2012 | Sheehy | B65B 3/045 | 141/10 |
| 8,336,700 | B2 * | 12/2012 | Warecki | B65G 47/841 | 198/743 |
| 8,500,373 | B1 * | 8/2013 | Epps | B65G 51/16 | 406/13 |
| 8,734,061 | B2 * | 5/2014 | Terzini | B65G 51/30 | 406/163 |
| 8,757,220 | B2 * | 6/2014 | Scharger | B65B 1/16 | 141/2 |
| 8,950,625 | B2 * | 2/2015 | Brug | B65B 5/00 | 221/265 |
| 9,481,482 | B2 * | 11/2016 | Brug | B65B 35/06 | |
| 9,540,187 | B2 * | 1/2017 | Valerino, Sr. | B65G 51/04 | |
| 10,087,016 | B2 * | 10/2018 | Nakajima | H05K 13/02 | |
| 10,414,529 | B1 | 9/2019 | Bayer | | |
| 10,888,108 | B2 * | 1/2021 | Longest | G01F 11/40 | |
| 11,242,072 | B2 * | 2/2022 | Neophytou | B61B 13/08 | |
| 11,492,162 | B2 | 11/2022 | Myers et al. | | |
| 11,760,583 | B2 * | 9/2023 | Ellis | B65G 53/58 | 406/154 |
| 12,441,559 | B2 * | 10/2025 | Dohrmann | B65B 13/027 | |
| 2005/0150191 | A1 | 7/2005 | Taylor | | |
| 2006/0174966 | A1 * | 8/2006 | Facchini | B65B 37/14 | 141/67 |
| 2009/0077933 | A1 * | 3/2009 | Backhaus | B65G 47/846 | 53/251 |
| 2009/0301841 | A1 * | 12/2009 | Haehnel | B65G 47/31 | 198/451 |
| 2011/0150580 | A1 | 6/2011 | Terzini | | |
| 2011/0277422 | A1 * | 11/2011 | Weder | B65B 47/10 | 53/428 |
| 2015/0239684 | A1 * | 8/2015 | Soda | B65G 53/20 | 414/293 |
| 2018/0215600 | A1 | 8/2018 | Yuse et al. | | |
| 2018/0222694 | A1 | 8/2018 | Burgess et al. | | |
| 2022/0153566 | A1 | 5/2022 | Mercier et al. | | |
| 2023/0174257 | A1 | 6/2023 | Scafaria et al. | | |
| 2024/0150110 | A1 | 5/2024 | Davidow | | |
| 2024/0239617 | A1 * | 7/2024 | Schlesinger | B65G 51/36 | |
| 2025/0256905 | A1 * | 8/2025 | Cutter | C12C 5/026 | |

OTHER PUBLICATIONS

International Search Report and Written Opinion for PCT Application No. PCT/US2025/050108, mailed Jan. 30, 2026, Authorized Officer: Taina Matos, 12 pages.

International Search Report and Written Opinion for PCT Application No. PCT/US2025/050110, mailed Jan. 30, 2026, Authorized Officer: Taina Matos, 13 pages.

* cited by examiner

1700

SYSTEMS AND TECHNIQUES FOR ASSEMBLING AND INTRODUCING CARTRIDGES INTO BEVERAGE CONTAINERS DURING PACKAGING

CROSS-REFERENCE TO RELATED APPLICATIONS

This application claims priority to Provisional U.S. Application No. 63/705,258, titled "SYSTEMS AND TECHNIQUES FOR ASSEMBLING AND INTRODUCING CARTRIDGES INTO A BEVERAGE PACKAGING LINE", filed Oct. 9, 2024, and to Provisional U.S. Application No. 63/858,492, titled "SYSTEMS AND TECHNIQUES FOR ASSEMBLING AND INTRODUCING CARTRIDGES INTO A BEVERAGE PACKAGING LINE", filed Aug. 6, 2025, both of which are hereby incorporated by reference in its entirety.

TECHNICAL FIELD

Various embodiments of the present technology generally relate to improvements to packaged beverages. More specifically, the technology pertains to systems and techniques for assembling and introducing beverage-enhancing cartridges into beverage containers during movement along a beverage packaging line.

BACKGROUND

Packaged beverages, such as bottled or canned carbonated drinks, are enjoyed by millions worldwide for their convenience and refreshing taste. However, despite their popularity, these beverages often degrade over time, leading to a decline in flavor quality and, consequently, negatively impacting the user's experience. One of the primary factors contributing to flavor degradation is the presence of oxygen within the beverage, which can be due to the permeability of the packaging material, which allows oxygen to slowly infiltrate the container. Oxygen exposure triggers oxidative reactions within the beverage, causing changes in flavor compounds and the breakdown of delicate aromatic molecules. Additionally, fluctuations in temperature during storage can accelerate these chemical reactions, further compromising the beverage's flavor profile. Over time, the once crisp and vibrant taste may become flat, stale, or develop off-flavors, leaving consumers disappointed with their drinking experience.

The degradation of flavor in packaged beverages, such as beer, directly impacts their shelf life, imposing constraints on how long they can maintain their desired taste and quality. Beer, for instance, is particularly sensitive to oxygen exposure and temperature fluctuations, which can rapidly alter its flavor profile. While modern packaging techniques and advancements have extended the shelf life of beers, there is still a finite window within which the beverage retains its intended characteristics. Beyond this period, the flavor degradation becomes more pronounced, leading to a noticeable decline in taste and aroma. Consequently, breweries, like other packaged beverage producers, often provide recommended consumption timelines to ensure consumers enjoy their products at their best. These timelines are often only 6-12 months to ensure optimal consumer experiences.

The information provided in this section is presented as background information and serves only to assist in any understanding of the present disclosure. No determination has been made and no assertion is made as to whether any of the above might be applicable as prior art with regard to the present disclosure.

OVERVIEW

Technology is disclosed herein for systems and techniques for providing a cartridge containing remediating components to be released into a packaged beverage upon consumption. As such, the cartridge may be configured to be inserted into a packaged beverage, in some embodiments, during packaging or production of the beverage. To introduce cartridges into beverage containers during a beverage packaging process, example cartridge assembly and introduction systems and techniques are provided herein. As will be described in greater detail below, the cartridge assembly and introduction system may include an assembly system that sorts the cartridges and orients them such that an inner chamber of a respective cartridge is oriented in a direction to receive remediating components when injected into the inner chamber. The assembly system may sanitize the cartridges, in particular the inner chamber and outer chamber, such as by rinsing the cartridge with ionized air to remove any contaminants. The assembly system may then purge the cartridges to displace the gaseous volume within the inner/outer chambers of the cartridge with a chemically stable or inert gas, such as carbon dioxide or nitrogen.

Once the cartridges are purged, the assembly system may inject one or more remediating components into a respective chamber of the cartridge. Following injection of the remediating components, the assembly system may seal the cartridges, such as by positioning a cap to the body of the cartridge, thereby sealing the inner and outer chambers of the cartridge. In some embodiments, the sealing process may involve creating a near oxygen-free or oxygen-reduced environment for the sealing process, such as applying a carbon-dioxide or nitrogen blanket over the cartridge until the cap is applied. The assembly system may include a cartridge chute configured to receive the cartridge and direct the cartridge as it advances through the assembly system, and a filler-capper assembly comprising a filler assembly with at least one nozzle positioned to inject a remediating component into the inner chamber of the cartridge, and a capping assembly comprising a sealing element configured to seat the cap of the cartridge onto a top end of the body of the cartridge after the remediating component is injected.

Once the cartridges are capped, the sealed cartridges may transition to a transport system of the assembly and introduction system. The transport system may receive the sealed cartridges from the assembly system and be configured to maintain the sealed cartridges in a desired orientation until the sealed cartridges reach an introduction system. The transport system may comprise an inlet with an inlet opening configured to receive cartridges from the assembly system, a straight-line tube having a diameter approximately 1.1 times a width of the cartridges, a first elbow fluidly connecting the inlet to the straight-line tube, and a transition guide fluidly connecting the straight-line tube to the introduction system. The transport system may include one or more assist jets configured to inject an inert gas into the transport tube to modulate the speed at which the sealed cartridges move within the transport system. The transport system may also include one or more pressure sensors that measure the pressure in the transport tube and provide information to a controller that controls the assist jets, thereby allowing for modulation of the assist jets based on the pressure within the tube.

The transport system may be operably coupled to an introduction system of the assembly and introduction system such to dispense the cartridges into an inlet of the introduction system. Upon receipt of the cartridges from the transport system, the introduction system may drop or otherwise insert the sealed cartridges into a beverage container, in some cases, while the beverage container is moving on a packaging line. The introduction system may comprise a transition guide configured to receive cartridges from the transport system, and a dropping mechanism disposed below the transition guide. The dropping mechanism may be actuatable between a retaining position in which the dropping mechanism retains a first cartridge received from the transition guide, and a releasing position in which the dropping mechanism permits the first cartridge to be released into a beverage container. A control system may be configured to actuate the dropping mechanism from the retaining position to the releasing position in synchronization with movement of the beverage container such that the first cartridge is released into the beverage container. The dropping mechanism may comprise either a rotatable member and retaining plate configuration, or a sliding gate and releasing plate configuration, depending on the specific implementation requirements.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

The accompanying drawings, which are incorporated into and constitute a part of this specification, illustrate one or more certain aspects and, together with the description of the example, serve to explain the principles and implementations of the certain examples.

Figure 1:
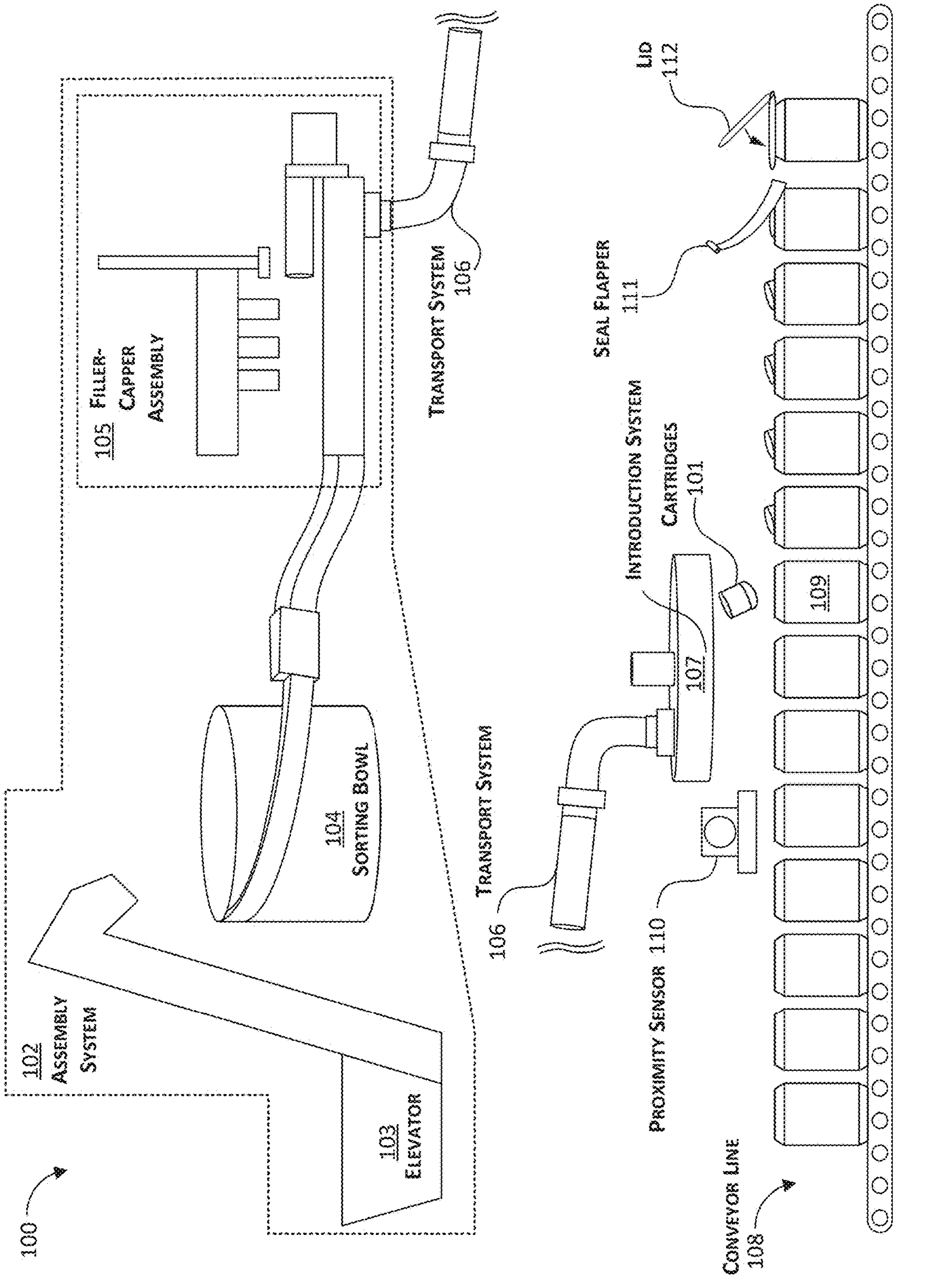
FIG. 1 illustrates an assembly and introduction system for introducing cartridges into beverage containers, according to an embodiment herein.

Some components or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Packaged beverages, particularly carbonated drinks, have become ubiquitous in modern society, readily available in countless markets, convenience stores, vending machines, and households worldwide. These beverages, ranging from colas to beer, offer consumers a convenient and refreshing option for quenching thirst or indulging in a flavorful treat.

Their popularity stems from a combination of factors, including their portability, long shelf life, and diverse flavor options, catering to a wide range of tastes and preferences. Whether enjoyed on their own or paired with meals, packaged carbonated beverages have become ingrained in daily life, serving as go-to options for hydration, relaxation, or social gatherings. Their widespread availability and enduring appeal highlight their status as staples of modern beverage consumption.

One drawback of packaged beverages, including carbonated drinks, is the inevitable flavor degradation that occurs over time, influenced by various factors including oxygen exposure and temperature fluctuations. Despite meticulous efforts to maintain freshness, these beverages can undergo undesirable changes in taste and quality due to their susceptibility to external elements. Oxygen infiltration, for instance, poses a challenge, permeating packaging through various channels. In bottled beverages, imperfect seals between the cap and bottle can allow oxygen to slowly seep in, while canned drinks may experience ingress through micro-defects in the can's seal or minute pinholes in the aluminum. Furthermore, exposure to oxygen during the manufacturing process may initiate flavor deterioration from the start.

Additionally, temperature fluctuations during storage play a crucial role in accelerating flavor degradation. Fluctuations in temperature can cause expansion and contraction of the packaging material, leading to the ingress of external air and subsequent oxidation of the beverage. These variations can occur during transportation, storage, or even in-store display, exacerbating the degradation process. Combined with oxygen exposure, temperature fluctuations contribute to oxidative reactions within the beverage, resulting in changes such as a loss of freshness, development of off-flavors, or a decline in overall palatability over time.

The negative effects of flavor degradation extend beyond mere changes in taste, impacting both consumers and producers alike. One consequence is the limited shelf life of packaged beverages, which directly affects their marketability and profitability. As the flavor deteriorates, the beverage becomes less appealing to consumers, leading to decreased sales and potential waste if unsold inventory reaches its expiration date. This not only results in financial losses for producers but also contributes to environmental concerns due to increased packaging waste. Moreover, flavor degradation can tarnish a brand's reputation, eroding consumer trust and loyalty over time. Additionally, in industries like the craft beer market, where flavor nuances and freshness are highly valued, flavor degradation can undermine the integrity of the product and damage the reputation of the brewery. Overall, the negative effects of flavor degradation extend beyond the sensory experience, impacting the economic viability, environmental sustainability, and brand image of packaged beverage producers.

To address flavor degradation, and its negative consequences, a cartridge containing one or more remediating components may be introduced into a packaged beverage. An example cartridge is described in detail in related U.S. patent application Ser. No. 19/048,463 (hereinafter '463 Application) entitled SYSTEMS AND TECHNIQUES FOR ENHANCING PACKAGED BEVERAGES, filed on Feb. 7, 2025, which is hereby incorporated in its entirety. As described in the '463 Application, the cartridge is configured to release one or more remediating components into a packaged beverage upon opening of the beverage by a consumer. For example, if the packaged beverage is an India Pale Ale (IPA), a beer known for its hoppy profile, a cartridge may include a hop additive that, upon its release, enhances the flavor profile of the IPA. The remediating components may be used to enhance the flavor profile of the beverage, such as to return the packaged beverage to or near its original flavor profile, or to add additional flavors to the packaged beverage, such to enhance the original flavor profile.

It should be appreciated that while the cartridge described in the '463 Application, as well as described herein, have a dual chamber configuration, the following description is equally applicable to cartridges having other configurations, such as single chamber configurations or tri-chamber configurations.

One challenge, however, faced by producers is the ability to introduce the cartridges into a beverage container without impacting the production of the beverage itself. As those skilled in the art readily appreciate, beverage packaging lines, whether for canning or bottling, operate as precise and synchronous systems where each stage of the process is tightly coordinated. From filling and sealing to labeling and packaging, each task may occur within strict time constraints, leaving minimal room for error. Any delays or misalignment in one step can create a bottleneck that disrupts the entire line, impacting both product quality and efficiency. These systems are optimized for high-speed production, meaning even small variances can lead to operational inefficiencies. Accordingly, introducing a cartridge into a beverage container within a beverage packaging line is challenging, as it risks disrupting the precise synchronization of the existing processes, potentially reducing output and compromising the overall efficiency of the system.

To introduce cartridges into beverage containers during a beverage packaging process, cartridge assembly and introduction systems and techniques are provided herein. As detailed below, the assembly and introduction system may be integrated with an existing beverage packaging line in a manner that does not require modification to the beverage filling or sealing operations. That is, these operations—such as dispensing liquid into beverage containers and sealing the beverage containers—may proceed without interruption or alteration. The assembly and introduction system may be configured to operate in coordination with the movement of beverage containers along the packaging line, allowing cartridges to be assembled and introduced into the containers without interfering with the processes used to package the beverages themselves.

Integrating a cartridge assembly and introduction system into a beverage packaging line, in particular an existing line, presents numerous technical challenges to be addressed to maintain production efficiency and product quality. A primary challenge involves the precise assembly of cartridges while maintaining their structural integrity and ensuring proper containment of remediating components within the high-speed, high-throughput environment of commercial beverage production. The assembly process may achieve consistent sealing between the cartridge body and cap to prevent leakage of remediating components prior to consumer activation, while simultaneously preventing contamination during the filling and capping operations. Additionally, oxygen entrapment within the cartridges during assembly poses a technical hurdle, as residual oxygen can degrade both the remediating components and the beverage itself, thereby compromising the intended flavor enhancement benefits. The assembly system therefore may incorporate purging mechanisms to displace atmospheric gases with inert gases such as nitrogen or carbon dioxide, as described in greater detail below. Furthermore, the cartridge assembly throughput may also be precisely synchronized with the packaging line speed to prevent bottlenecks, requiring real-time coordination between multiple mechanical systems operating at industrial production rates.

The transportation and introduction of assembled cartridges presents additional technical complexities, such as introduction of the cartridges into beverage containers without disrupting existing packaging operations. For example, the transport system may be required to maintain cartridge orientation and prevent damage during conveyance from the assembly system to the introduction system, which can involve navigating around existing equipment within space-constrained production facilities. The introduction system faces the further challenge of precise timing coordination with moving beverage containers, requiring accurate detection of beverage container positions and rapid, controlled dispensing of cartridges into open containers without interfering with concurrent beverage filling or sealing operations. This timing precision becomes increasingly difficult as packaging line speeds increase and container spacing decreases. The assembly and introduction system may also be required to accommodate variability in container geometries, fill levels, and beverage viscosities while maintaining consistent cartridge placement accuracy, as the beverage that the beverage packaging line is handling may vary based on current production requirements and product specifications.

Additionally, the assembly and introduction system may be required to operate reliably in the humid, potentially corrosive environment typical of beverage production facilities, while meeting stringent food safety and sanitation requirements. Overall, the integration of the assembly and introduction system may be achieved without requiring modifications to existing beverage production, filling, or sealing equipment, necessitating a modular approach that can adapt to diverse packaging line configurations and operational parameters.

The assembly and introduction system, and the cartridges themselves, provide numerous benefits to both beverage producers and consumers. By providing beverage producers the ability to add a cartridge containing remediating components to their packaged beverage, the assembly system allows producers to produce products that have extended shelf lives, thereby, ensuring that consumers enjoy beverages at their peak freshness for longer periods. This not only enhances consumer satisfaction but also reduces product waste and associated costs, leading to improved economic sustainability. That is, the assembly and introduction system may allow producers to utilize more efficient operations and potentially lower production costs by reducing ingredient amounts and simplifying manufacturing processes. Moreover, by integrating with a beverage packaging line, the assembly and introduction system allows beverage producers to add the cartridges to their products without disrupting their product output, thereby providing a means to easily and efficiently realize the benefits of the cartridges themselves. Overall, the assembly and introduction system not only benefits producers by enhancing product quality and efficiency but also contributes to a more satisfying and sustainable consumer experience.

Referring now to the Figures, FIG. 1 provides an illustrative example of an assembly and introduction system 100, according to an embodiment herein. As shown, the assembly and introduction system 100 includes an assembly system 102, a transport system 106, and an introduction system 107. These components may be operably coupled together such to assemble a cartridge 101 and introduce the cartridge 101 into a beverage container 109 as the beverage container 109 moves along a conveyor line 108, which may be part of a packaging process. As will be described in greater detail below, the assembly and introduction system 100 assembles and introduces the cartridge 101 into the beverage container 109 without disrupting or requiring modifications to the conveyor line 108 or the overall packaging process.

It should be appreciated that the assembly and introduction system 100 illustrated in FIG. 1 is not meant to be limiting, and various modifications may be made to the system configuration without departing from the scope of the present disclosure. In some embodiments, one or more of the illustrated components may not be present, while in other embodiments, additional components may be integrated into the system 100. For example, the system 100 may include additional sorting mechanisms, quality control stations, or buffer systems that are not explicitly shown in FIG. 1. Furthermore, while the assembly system 102, transport system 106, and introduction system 107 are illustrated as directly connected components, these systems may be separated both physically and temporally within the cartridge assembly and introduction process. In some cases, the assembly system 102 may operate independently to produce sealed cartridges 101, which may then be collected and stored in holding bags, containers, or other storage systems until the beverage packaging line is ready for cartridge introduction. At that point, the stored cartridges 101 may be fed into the transport system 106 for conveyance to the introduction system 107, or alternatively, may be fed directly into the introduction system 107, bypassing the transport system 106 entirely. This flexibility in system configuration allows for adaptation to various production schedules, facility layouts, and operational requirements while maintaining the ability to efficiently introduce cartridges 101 into beverage containers 109 during the packaging process.

Following the example assembly and introduction system 100 as illustrated, the assembly system 102 includes an elevator 103 into which open cartridges 101 may be introduced. As will be described in greater detail with respect to FIGS. 2-3, an open cartridge 101 may be a cartridge 101 that has yet to be sealed or closed. In other words, the inner chamber 220 of the cartridge 101 may be exposed to the external environment because the cap of the cartridge 101 is not yet seated on or secured to the body of the cartridge 101, thereby allowing access to an inner chamber for filling with remediating components during the assembly process. The elevator 103 may feed the open cartridges 101 into a sorting bowl 104, which may sort and orient the open cartridges 101 for assembly. The elevator 103 and sorting bowl 104 are described in greater detail below with respect to FIGS. 4A-B and 5-6, respectively.

Once the open cartridges 101 are sorted and oriented by the sorting bowl 104, the open cartridges 101 may be fed into a filler-capper assembly 105. The filler-capper assembly 105 may include a filler assembly and a capper assembly configured to operate in coordination to process the cartridges 101. As will be described in greater detail below with respect to FIGS. 9-20, the filler assembly may inject or otherwise introduce one or more remediating components into the inner chamber of the open cartridge 101, and the capper assembly may cap or otherwise seal the cartridge 101, thereby forming a sealed cartridge 101. In some embodiments, the filler-capper assembly 105 may be configured to maintain an inert atmosphere during the filling and sealing operations to prevent contamination, limit oxygen exposure, and preserve the integrity of the remediating components within the sealed cartridge 101.

The sealed cartridges produced by the filler-capper assembly 105 may be introduced into the transport system 106 through various operational configurations. In some embodiments, the sealed cartridges may be fed directly from the filler-capper assembly 105 into the transport system 106, allowing for continuous, real-time processing that maintains synchronization with the beverage packaging line. Alternatively, in other embodiments, the sealed cartridges 101 may be gathered and stored in a storage system until the underlying packaging line is ready to receive them. This storage approach provides operational flexibility, allowing the assembly system 102 to operate independently of the packaging line schedule and enabling batch processing when needed. Once the packaging line is ready, the sealed cartridges 101 may be fed from the storage system into the transport system 106 for transport to the introduction system 107. As will be described in greater detail below, the transport system 106 may include one or more assist jets that not only maintain an oxygen-reduced environment for the sealed cartridges 101 but also modulate the number of cartridges fed to the introduction system 107, thereby ensuring precise control over the cartridge introduction process.

The configuration of the transport system 106 may vary depending on the spatial constraints and layout of the production facility where the assembly and introduction system 100 is installed. Since the assembly and introduction system 100 may be retrofitted into existing beverage production facilities, the placement of system components may be dictated by available floor space, existing equipment locations, and facility infrastructure. In some installations, the filler-capper assembly 105 (or storage system storing the sealed cartridges) may be positioned in one area of the production floor while the introduction system 107 may be located at a distance away, potentially requiring the transport system 106 to navigate around existing filling equipment, conveyors, storage tanks, or other production machinery. The transport system 106 may therefore incorporate various configurations such as straight-line sections, curved segments, elbows, vertical drops, or elevated pathways to efficiently convey sealed cartridges 101 from the filler-capper assembly 105 to the introduction system 107. In facilities with limited floor space, the transport system 106 may utilize overhead routing or wall-mounted configurations to avoid interference with existing operations and personnel movement. Additionally, the transport system 106 may include multiple segments with different diameters, junction points, or buffer zones to accommodate varying distances and routing requirements while maintaining cartridge 101 integrity and preventing damage during transport. The modular design of the transport system 106 allows for customization based on specific facility layouts, enabling efficient cartridge 101 conveyance regardless of the physical separation between the assembly and introduction components.

The sealed cartridges 101 transported by the transport system 106 may be fed into the introduction system 107, which may be configured to dispense the cartridges 101 in synchronization with the beverage containers 109 as they move along the conveyor line 108. As will be described in greater detail below with respect to FIGS. 24-37B, the introduction system 107 may include a retaining position and a releasing position, wherein a sealed cartridge 101 is retained by the introduction system 107 until a beverage container 109 is detected by a proximity sensor 110 within a release region of the introduction system 107. Once detected, the introduction system 107 may transition from the retaining position to a releasing position, at which point the cartridge 101 held in the retaining position is released. Upon release, the cartridge 101 may fall, under the influence of gravity, into the beverage container 109 moving on the underlying conveyor line 108. In some embodiments, in addition to gravity or in place of gravity introduction, the cartridge 101 may be progressed using assist jets, as described in greater detail below. This synchronized dispensing mechanism may allow for precise timing control, ensuring that cartridges 101 are introduced into beverage containers 109 without disrupting the continuous flow of the packaging line or requiring modifications to existing conveyor systems. The introduction system 107 may accommodate variations in conveyor line speeds and container spacing while maintaining accurate cartridge placement within the beverage containers 109.

In the configuration shown, the beverage container 109 may be an open beverage container in that it has yet to be sealed or receive a lid. As such, when the cartridge 101 is released by the introduction system 107, the cartridge 101 may be dispensed directly into an opening of the beverage container 109. In some embodiments, the beverage container 109 may contain the beverage at the time of cartridge introduction, and thus the cartridges 101 may be introduced after filling of the beverage container 109. In other embodiments, the beverage container 109 may be empty, meaning the cartridges 101 may be introduced prior to filling of the beverage container 109. The specific stage at which the cartridges 101 are introduced may vary depending on the application and container characteristics. For example, if the beverage container 109 is a glass bottle or formed from a firm material, it may be advantageous to introduce the cartridges 101 post-filling to prevent damage of the cartridges 101 and/or the containers 109 upon introduction. The cushioning effect of the beverage may help absorb the impact of the cartridge 101 as it enters the container 109, thereby reducing the risk of cartridge damage or container breakage. Conversely, for containers made from more flexible materials, pre-filling introduction may be suitable, allowing the cartridge 101 to settle at the bottom of the container 109 before beverage filling occurs.

Packaged beverages, as used herein, may encompass any beverage that is packaged in a container for convenient transportation and/or consumption. The beverage containers 109 of packaged beverages may be made from a variety of materials, including aluminum cans, tinplate steel cans, glass bottles of various colors (clear, amber, green, or cobalt), plastic bottles and containers formed from polyethylene terephthalate (PET), high-density polyethylene (HDPE), polypropylene (PP), or other food-grade polymers, multilayer cartons with aluminum foil barriers, Tetra Pak containers, bag-in-box systems, flexible pouches, and composite materials combining multiple layers for enhanced barrier properties. The beverage containers 109 may also include specialized packaging such as nitrogen-flushed cans, vacuum-sealed bottles, pressurized containers for carbonated beverages, and aseptic packaging systems.

The packaged beverages themselves may include an extensive range of drinks, encompassing non-alcoholic beverages such as still and sparkling water, fruit juices, vegetable juices, smoothies, energy drinks, sports drinks, soft drinks, sodas, colas, flavored waters, iced teas, cold brew coffees, dairy-based beverages including milk, protein shakes, plant-based alternatives such as almond milk, soy milk, oat milk, coconut water, kombucha, and functional beverages containing vitamins, minerals, or probiotics. Alcoholic beverages may include beer varieties such as lagers, ales, stouts, pilsners, wheat beers, craft beers, lowalcohol and non-alcoholic beers, wines including still wines, sparkling wines, fortified wines, wine coolers, hard seltzers, ciders, ready-to-drink (RTD) cocktails, pre-mixed spirits, flavored malt beverages, and specialty alcoholic beverages. While the following discussion focuses on carbonated beverages, such as beer and sparkling water, it should be appreciated that the discussion is equally applicable to other types of beverages.

The beverage containers 109 may vary in size and capacity, ranging from single-serving portions such as 8 oz, 12 oz, 16 oz, and 20 oz containers for personal consumption, to larger family-sized containers including 1-liter, 2-liter, and 3-liter bottles, as well as commercial and industrial sizes such as 5-gallon kegs, 15.5-gallon half-barrel kegs, 31-gallon full-barrel kegs, and bulk containers exceeding 50 gallons for commercial distribution and dispensing systems. The various components of the assembly and introduction system 100 may be configured and sized to accommodate different types of beverage containers 109, the specific beverage being packaged, and the size of the beverage container 109. For example, the introduction system 107 may be sized based on the dimensions and opening diameter of the beverage container 109, which may dictate the speed or frequency at which the cartridges 101 are dispensed to ensure proper timing and placement during the packaging process. The transport system 106 may similarly require different tube diameters and pneumatic pressure settings to accommodate varying cartridge sizes and delivery rates. Moreover, as the volume of beverage held by the beverage container 109 increases, the size of the cartridge 101 itself may also increase to accommodate the increased volume of remediating components required to enhance the larger quantity of beverage. For instance, a cartridge 101 designed for a 12 oz beer bottle may contain less hop extract than a cartridge 101 intended for a 31-gallon commercial keg. As such, the various components of the assembly and introduction system 100, including the sorting bowl 104, filler-capper assembly 105, and the introduction system 107, may be sized and configured to accommodate the increased dimensions of larger cartridges 101, requiring adjustments to component spacing, processing speeds, and mechanical tolerances to maintain efficient operation across different cartridge and container size combinations.

As noted above, the beverage container 109 may be an open beverage container when the introduction system 107 dispenses the cartridge 101. When the cartridge 101 is introduced into the beverage container 109, if the container 109 is filled with a beverage, the cartridge 101 may float on the surface of the beverage until the container is sealed. To ensure that the floating cartridge 101 does not interfere with the sealing process of the container 109, such as sealing of a lid 112 onto the beverage container 109, the introduction system 107 may include a seal flapper 111. The seal flapper 111 may be positioned between the introduction system 107 and a sealing system configured to apply the lid 112 onto the beverage container 109. The seal flapper 111 may be configured to push the floating cartridge 101 down into the beverage, thereby preventing the cartridge 101 from impeding or restricting placement of the lid 112. In some embodiments, the seal flapper 111 may comprise a mechanical actuator that extends into the beverage container 109 to submerge the cartridge 101 below the beverage surface before the lid 112 is applied. In other embodiments, the seal flapper 111 may be or include a flexibly-rigid sheet/plate positioned to slide over the top of the beverage container 109 at an angle when the beverage container 109 moves along the conveyor line 108. As the beverage container 109 moves under the seal flapper 111, the seal flapper 111 may submerge or otherwise push the cartridge 101 below the surface of the beverage. The seal flapper 111 may operate in coordination with the sealing system to ensure proper timing, allowing the cartridge 101 to be positioned appropriately within the beverage container 109 without disrupting the sealing operation or compromising the integrity of the container seal.

Figure 2:
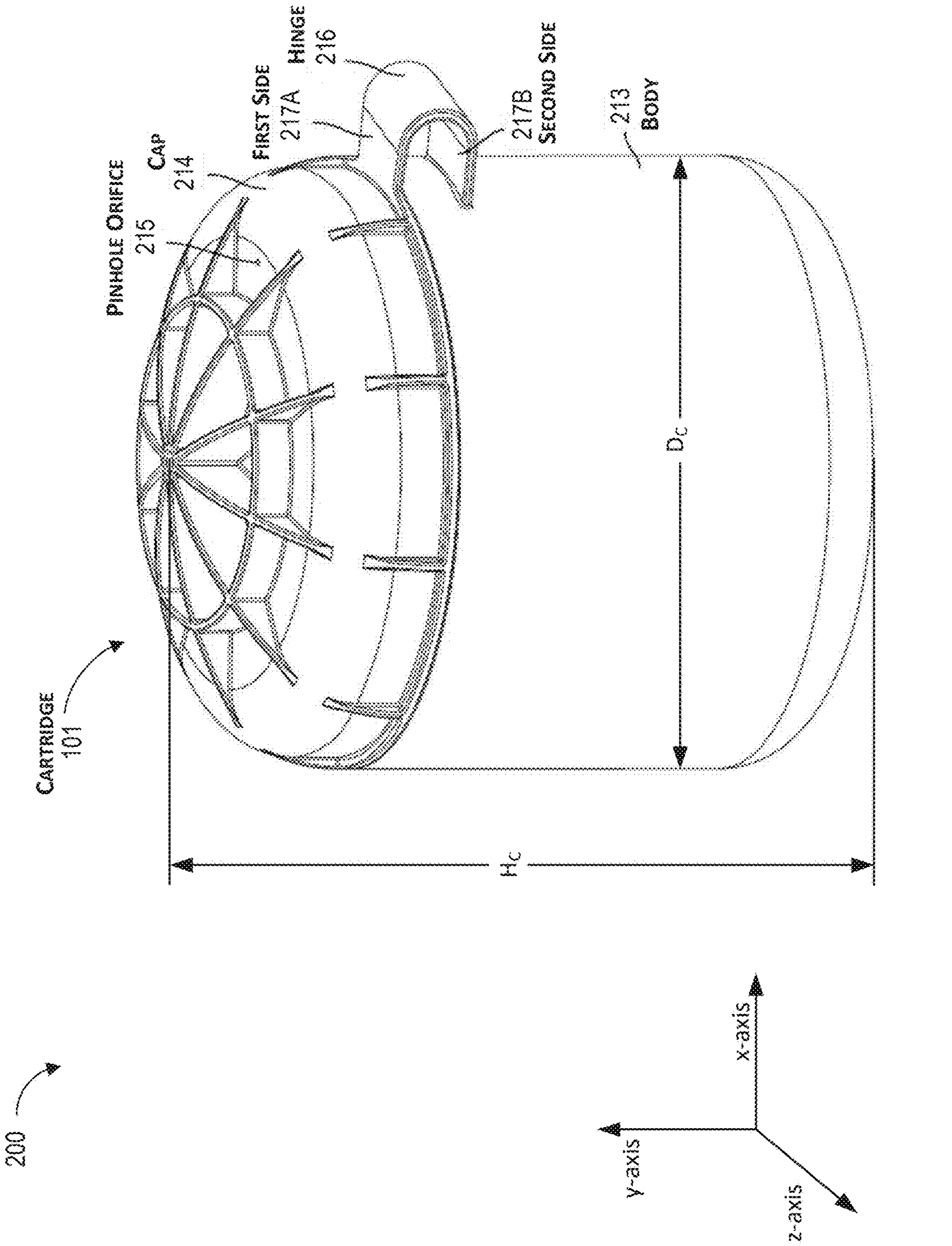
FIG. 2 illustrates a perspective view of a cartridge, according to an embodiment herein.
Figure 3:
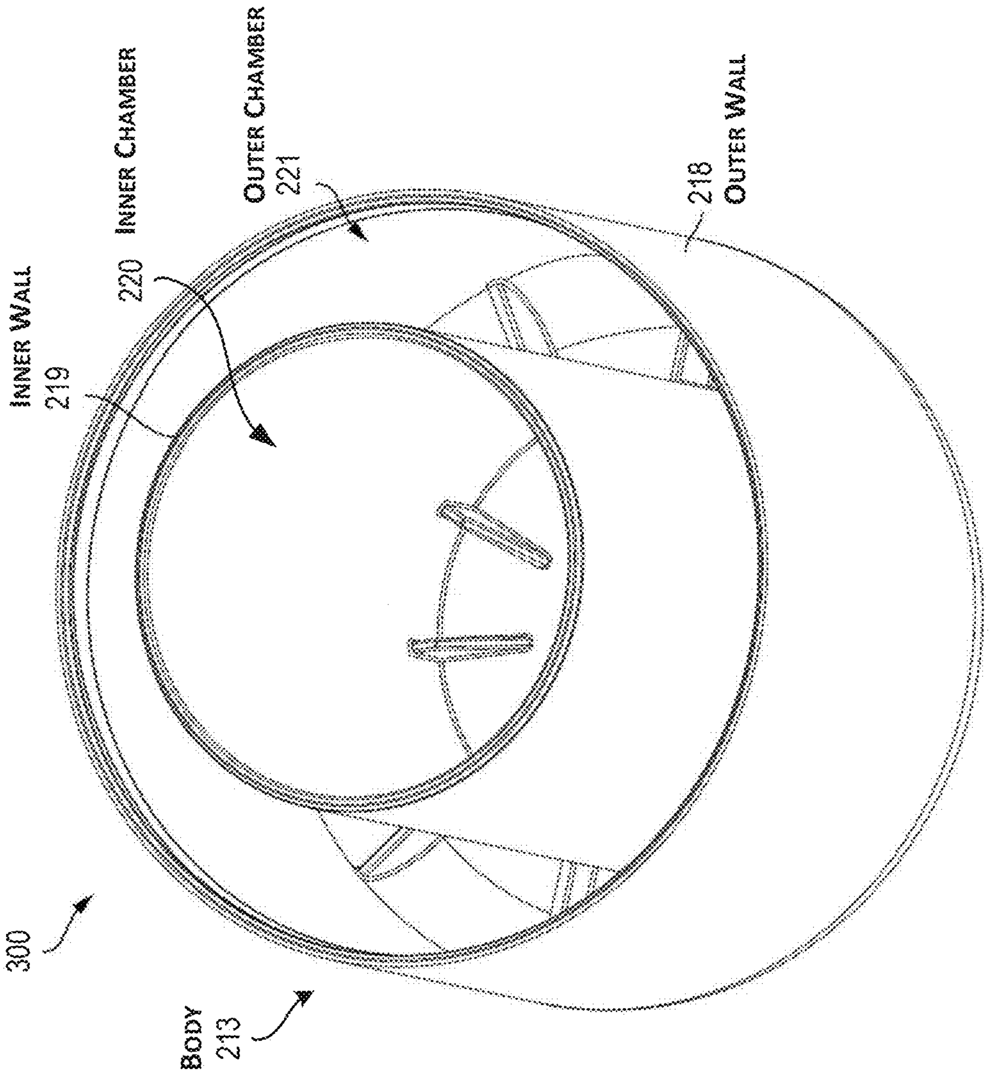
FIG. 3 illustrates a perspective of the body of the cartridge, according to an embodiment herein.

Turning now to FIGS. 2 and 3, various perspectives of an example cartridge 101 are provided to illustrate the context for the assembly and introduction system 100 described herein. These perspectives demonstrate how cartridges 101 may be configured and assembled for introduction into packaged beverages for enhancement purposes. It should be appreciated that the cartridge 101 shown in FIGS. 2 and 3 is provided for illustrative purposes to provide context to the assembly and introduction system 100 and is not meant to be limiting on the types, configurations, or dimensions of cartridges 101 that may be handled by the system 100. For ease of discussion, FIGS. 2 and 3 are described in conjunction.

Starting with FIG. 2, a perspective 200 of the cartridge 101 is illustrated, according to an embodiment herein. As shown by the perspective 200 of the cartridge 101, the cartridge 101 includes a body 213 and a cap 214. In the illustrated perspective 200, the cap 214 is positioned on the body 213, thereby indicating that the cartridge 101 is sealed. When the cap 214 is positioned and secured onto the body 213 to form a closed configuration, the cartridge 101 is referred to herein as a "sealed cartridge." Conversely, when the cap 214 is not positioned and secured onto the body 213, leaving an inner chamber 220 of the cartridge 101 exposed to the external environment, the cartridge 101 is referred to herein as an "open cartridge." This distinction between sealed and open cartridges provides context to the assembly process described herein, as the cartridges 101 begin as open cartridges during the filling operation and are subsequently converted to sealed cartridges during the capping operation.

As illustrated, the cartridge 101 has an approximately cylindrical shape. However, the size and shape of the cartridge 101 may vary depending on the specific application and the beverage container 109 into which the cartridge 101 is to be inserted. For example, if the cartridge 101 is configured to be inserted via a mouthpiece of a bottle, such as a beer bottle, then the cartridge 101 may have a larger cartridge height, HC, and a smaller cartridge diameter, DC, to fit through the slender mouthpiece of the bottle. In contrast, if the cartridge 101 is configured to be inserted into a can during a canning process (e.g., prior to the lid of the can being affixed), then the cartridge 101 may have a lower cartridge height, HC, and a greater cartridge diameter, DC. Moreover, the size and shape of the cartridge 101 may depend on an amount of remediating component being released into the packaged beverage, which as noted above may depend on the type of beverage and/or volume of beverage packaged into the beverage container 109. It should also be appreciated that while the illustrated example shows the cartridge 101 having an approximately cylindrical shape, in some embodiments, the cartridge 101 may have other shapes and dimensions, and the following discussion is equally applicable to such alternative configurations.

In example embodiments, the illustrated cartridge height, HC, may be in a range from 5 to 100 millimeters (mm), from 10 to 80 mm, from 15 to 70 mm, from 20 to 60 mm, from 25 to 50 mm, and from 28 to 35 mm. Similarly, in example embodiments, the cartridge diameter, DC, may be in a range from 5 to 80 mm, from 10 to 60 mm, from 15 to 50 mm, from 18 to 40 mm, from 20 to 35 mm, and from 22 to 32 mm. In an illustrative embodiment, the cartridge height, HC, may be 29 mm while the cartridge diameter, DC, may be 27 mm. In another illustrative embodiment, the cartridge height, HC, may be 15 mm while the cartridge diameter, DC, may be 45 mm. In yet another illustrative embodiment, the cartridge height, HC, may be 65 mm while the cartridge diameter, DC, may be 25 mm.

The cap 214 may be configured to releasably secure to a top end of the body 213. The cap 214 may be secured to the body 213 to form the cartridge 101 in a manner that allows the cap 214 to release and separate from the body 213 when the packaged beverage is opened. In some embodiments, the cap 214 and the body 213 may be separate components, however, in other embodiments, the cap 214 may be connected to the body 213 such that upon releasing, the cap 214 maintains connection with the body 213. As can be appreciated, the cap 214 and the body 213 may be securely held together using various types of connectors that ensure structural integrity and functionality. For example, in the illustrated perspective 200, the cartridge 101 may include a hinge 216. The hinge 216 may be attached on a first side 217A to the cap 214 and a second side 217B to the body 213. In other embodiments, instead of the hinge 216, the cartridge 101 may include a leash, such as a plastic leash, wire leash, or string that maintains connection between the cap 214 and the body 213.

As noted above, the hinge 216 may maintain a connection between the cap 214 and the body 213. By keeping the cap 214 and the body 213 together once the cap 214 releases from the body 213, the hinge 216 may prevent the cap 214 from obstructing an opening of the packaged beverage or preventing the cap 214 from escaping the packaged beverage. As can be appreciated, the body 213 may be the larger of the two components, and by keeping the cap 214 connected to the body 213, the hinge 216 may prevent the cap 214 from negatively affecting a consumer's experience (e.g., obstructing flow of the beverage from the packaging or escaping the packaging).

As illustrated, the cap 214 may include a pinhole orifice 215 through which dissolved gas from the packaged beverage ingresses into an interior chamber (e.g., outer chamber 221 or inner chamber 220) of the cartridge 101 to equalize the cartridge 101 with the pressure of the packaged beverage. As is appreciated, packaged beverages, such as canned beer or sparkling water, commonly contain dissolved gases, such as carbon dioxide. During the packaging process, the beverage is sealed into the beverage container 109, often under pressure, allowing gasses to dissolve into the liquid beverage. This process alters the pressure of the gases within the packaged beverage. When the cartridge 101 is inserted into the packaged beverage, the cartridge 101 is at atmospheric pressure and as such, the dissolved gas within the beverage may ingress into the cartridge 101. As the dissolved gas from the beverage ingresses into the cartridge 101 from the beverage, the cartridge 101 may equilibrize with the pressure of the packaged beverage. In other words, once the dissolved gas ingresses into the cartridge 101, the cartridge 101 may have a pressure that is approximately equal to the pressure of the packaged beverage.

Referring now to FIG. 3, a perspective 300 of the body 213 of the cartridge 101 is illustrated, according to an embodiment provided herein. As shown, the body 213 may include an outer wall 218 and an inner wall 219. The inner wall 219 may form an inner chamber 220 and the outer wall 218 may form an outer chamber 221 in an annulus space between the inner wall 219 and the outer wall 218. It should be appreciated that while the following describes a dual chamber configuration (e.g., an inner chamber 220 and an outer chamber 221), in some embodiments, the cartridge 101 may have a single chamber configuration (e.g., only having an inner chamber 220) or may be a multi-chamber configuration (e.g., having multiple inner chambers 220 and/or outer chambers 221).

During the assembly process, one or more remediating components may be injected into the body 213 of the cartridge 101. For example, one of the inner chamber 220 or the outer chamber 221 of the body 213 may be filled with one or more remediating components. As such, the inner chamber 220 or the outer chamber 221 may have a volume based on an amount of remediating components to be released into the packaged beverage. For ease of explanation, the following discussion focuses on the inner chamber 220 being filled with the remediating components, however, it should be appreciated that in some embodiments the outer chamber 221 may be filled with the remediating components. In yet further embodiments, no remediating components may be filled into the cartridge 101. In such embodiments, the cartridge 101 may function as a gas exchange vessel, where dissolved gas from the packaged beverage ingresses into the cartridge 101 through the pinhole orifice 215 to equilibrate pressure. Upon opening of the packaged beverage, the equilibrated gas within the cartridge 101 may be released back into the beverage to enhance its characteristics. For instance, ingressed nitrogen from a stout beer may be released upon opening to revitalize the beer's creamy texture and enhance the consumer's drinking experience, effectively restoring the beverage's original mouthfeel and flavor profile that may have diminished during storage.

Maintaining the remediating components within the inner chamber 220 may aid in preserving the potency and chemical efficacy of the remediating components until the time of consumption. In some embodiments, premature exposure of the remediating components to the beverage or beverage container may lead to degradation of the remediating components over time. For example, polymer linings commonly used in beverage containers, such as epoxy-based coatings or polyethylene terephthalate (PET) linings, may interact with certain remediating components, potentially causing chemical breakdown or absorption that reduces their effectiveness. Additionally, oxidation reactions within the beverage environment may compromise the integrity of sensitive remediating components, particularly those containing volatile compounds or delicate flavor molecules. Changes in pH levels of the beverage over time may also negatively impact the stability and efficacy of the remediating components. By isolating the remediating components within the inner chamber 220 until activation, the cartridge 101 may help ensure that the remediating components maintain their intended potency and deliver the desired enhancement to the beverage upon consumption.

The inner chamber 220 may have a volume based on a volume of remediating components desired to be released into the packaged beverage. In various embodiments, the volume of the inner chamber 220 may be in a range from 2 milliliters (mL) to 5 mL, from 2.5 mL to 4.5 mL, or from 3 mL to 4 mL, depending on the remediating component and desired amount of remediating component being released into the packaged beverage. In some embodiments, it may be desirable that the remediating component completely fill or close to completely fill the inner chamber 220 as to avoid any gaseous components in the inner chamber 220.

The remediating components provided herein may be non-gaseous components that are released by the cartridge 101 upon opening of the packaged beverage. The type of remediating component may vary depending on the packaged beverage (e.g., sparkling water vs. beer) and an intended result of the remediating component (e.g., enhancing a flavor profile vs. enhancing user experience). Remediating components, as provided herein, may be any non-gaseous component that may be added to a beverage to enhance the consumer experience, shelf life of the packaged beverage, or reduce manufacturing costs of the beverage. Following the above IPA example, the remediating component may be a hop additive (e.g., hop flavoring additive), hop concentrate or a hop oil that is added to the IPA upon consumption to return the IPA close to an original, as-brewed flavor profile. The hop additive may also allow for the IPA to be brewed with less hops, thereby reducing the overall manufacturing costs of the IPA. Additionally, since the hop additive returns the IPA to an original flavor profile, introduction of the hop additive at consumption of the IPA may extend the shelf life of the IPA.

In some embodiments, the remediating component may be a flavor concentrate or flavor oil, such as lime concentrate, mint oil, or mango juice that is released into a packaged beverage. For example, if the packaged beverage is a mint tea or a RTD mojito, the remediating component may be a mint oil or concentrate. Since the flavor of herbs, such as mint, may degrade over time, releasing and mixing the mint oil/concentrate into the beverage at time of consumption, which is assumed to be at or close to opening of the packaged beverage, the flavor profile of the beverage is enhanced, the shelf life of the beverage extended, and in some cases, the manufacturing costs reduced as less mint may be required during production to achieve the same flavor profile at consumption.

In some cases, instead of a liquid, such as an oil or concentrate, the remediating component may be a solid. For example, the remediating component may be baking soda that upon release into the beverage at consumption causes fizzing in the beverage, thereby enhancing the consumer experience. In another example, a solid-phase remediating component may be salt or another type of spice that is added upon conception to enhance the consumer experience and enhance the flavor profile of the beverage. In some embodiments, more than one remediating component may be added, such as a lime concentrate and mint oil into a RTD mojito.

Although the remaining discussion focuses on hop additive as the remediating component, it should be appreciated that the discussion is equally applicable to any other remediating component. For example, the remediating components as provided herein may include one or more of a hop additive, herb concentrate, additive, or oil (e.g., mint, basil, rosemary, lavender, lemongrass), citrus concentrate, additive, or oil (e.g., lemon, lime, orange, grapefruit), salt, baking soda, rock candy (e.g., Pop-Rocks™), CBD, THC, Adaptogens, and the like.

If the inner chamber 220 is filled with the remediating components, the outer chamber 221 may be configured to fill with dissolved gas from the packaged beverage such to reach an equilibrium with the packaged beverage, as described in the '463 Application. As such, the volume of the outer chamber 221 may depend, in part, on the pressure of the packaged beverage. For example, the volume of the outer chamber 221 may be proportional to an amount of energy required to release the cap 214 from the cylindrical body 213. When a consumer opens the packaged beverage, the sudden release of pressure within the beverage container creates a pressure differential between the interior of the cartridge 101 and the surrounding beverage environment. This pressure differential generates sufficient force to overcome the retention mechanism securing the cap 214 to the body 213, causing the cap 214 to release and separate from the body 213. Upon release of the cap 214, the remediating components contained within the inner chamber 220 are exposed to the beverage and begin to disperse throughout the liquid. The dissolved gas that had previously equilibrated within the outer chamber 221 may also be released, further facilitating the mixing and distribution of the remediating components throughout the packaged beverage. This pressure-activated release mechanism ensures that the remediating components are introduced into the beverage at the optimal moment—precisely when the consumer opens the container for consumption—thereby maximizing the enhancement effect on the beverage's flavor profile and overall drinking experience.

Figure 4B:
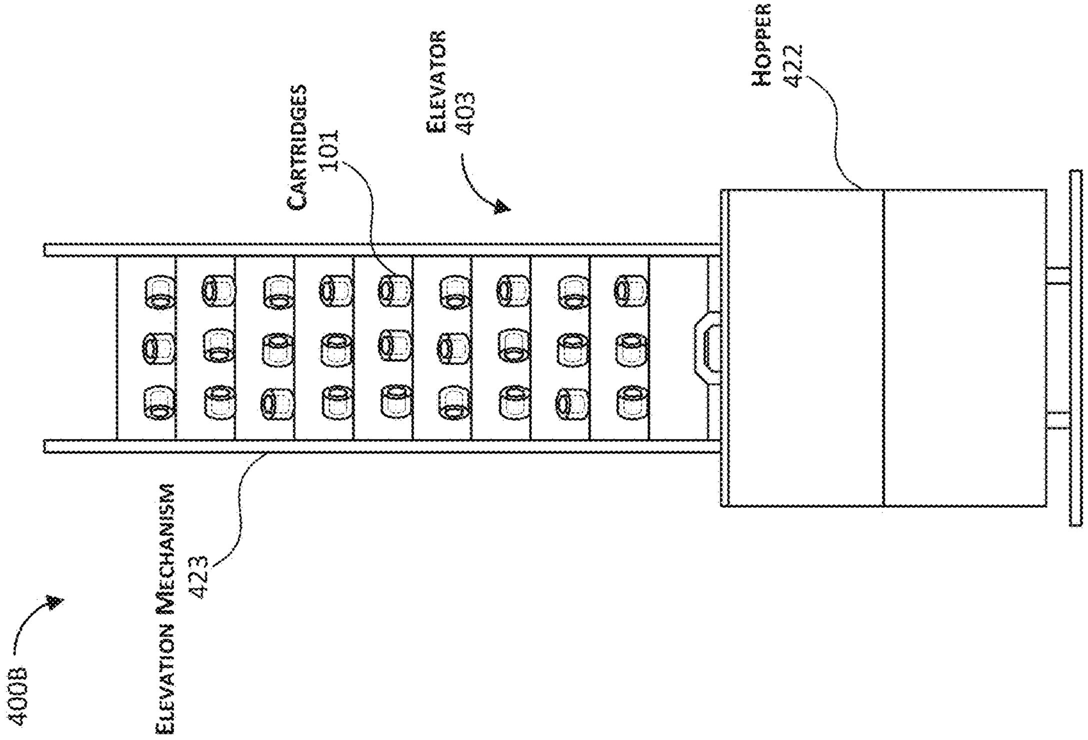
FIGS. 4A-4B illustrate different perspectives of an elevator, according to an embodiment herein.
Figure 4A:
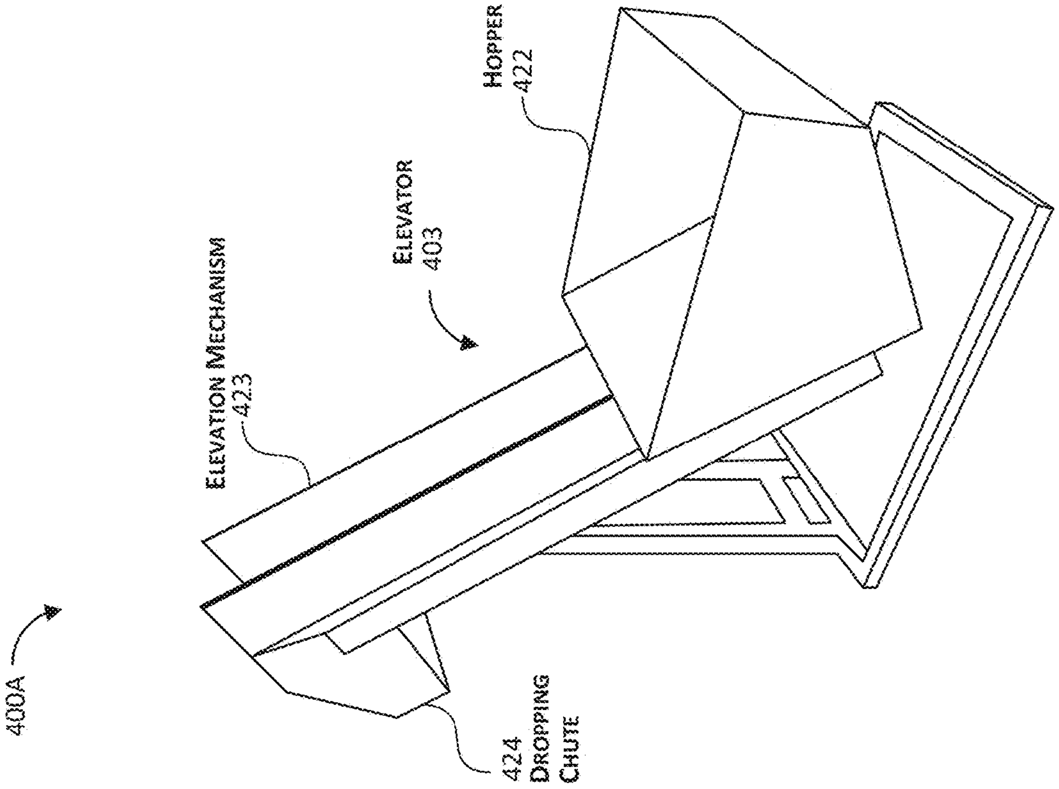

Referring now to FIGS. 4A-B, an example elevator 403 is illustrated, according to an embodiment herein. The elevator 403, which may be the same or similar to the elevator 103, may be configured to receive open cartridges 101 and introduce them into the assembly system 102. For example, the elevator 403 may be configured as a bulk handling component designed to receive a volume of open cartridges 101 and deliver them in a controlled, continuous manner to downstream processing equipment, such as the sorting bowl 104 and/or the filling-capping assembly 105. As shown, the elevator 403 may include a hopper 422 at its base configured to receive and temporarily store the open cartridges 101, and an elevation mechanism 423 configured to transport the cartridges 101 from the hopper 422 to an elevated discharge point.

In various embodiments, the elevation mechanism 423 of the elevator 403 may comprise different configurations to accommodate varying production requirements and facility constraints. For example, the elevation mechanism 423 may include an inclined conveyor belt equipped with cleats, ridges, or other retention features to prevent backsliding of the cartridges 101 during upward transport. The cleats may be spaced at predetermined intervals corresponding to the dimensions of the cartridges 101 to ensure efficient capture and transport without jamming or spillage. Alternatively, the elevation mechanism 423 may include a bucket elevator system having a series of buckets or carriers attached to a continuous chain or belt, where each bucket is sized to hold one or more cartridges 101 during vertical transport.

The elevator 403 may be constructed from various materials suitable for food-grade applications, including stainless steel, food-grade polymers, or composite materials that provide corrosion resistance and ease of cleaning. The hopper 422 may have a capacity ranging from 500 to 10,000 cartridges 101, depending on production volume requirements and available floor space. The elevation angle may be adjustable to a desired angle from horizontal, such as between 30 to 90 degrees to optimize transport efficiency while preventing cartridge damage.

In some embodiments, the elevator 403 may include automated level sensing and control systems. For instance, the elevator 403 may be equipped with optical sensors, ultrasonic sensors, or mechanical level switches positioned at various heights within the hopper portion to monitor cartridge inventory levels. When the sensor system detects that the cartridge level has dropped below a predetermined threshold, the elevation mechanism 423 may automatically activate to replenish the downstream systems, such as the sorting bowl 104. Conversely, when the sorting bowl 104 reaches capacity, the elevation mechanism 423 may pause operation to prevent overflow and potential jamming.

The discharge mechanism of the elevator 403 may be configured to provide gentle, controlled release of cartridges 101 to minimize impact damage and maintain proper orientation for subsequent sorting operations. For example, in the illustrated example elevator 403, the discharge mechanism may be a dropping chute 424 configured to discharge the cartridges 101 into the underlying sorting bowl 104. The discharge point may include adjustable flow control elements, such as variable-speed discharge wheels, adjustable gates, or pneumatic flow regulators, to modulate the rate at which cartridges 101 are delivered to the sorting bowl 104. This flow control capability allows the elevator 403 to synchronize with downstream processing equipment and accommodate varying production speeds.

In alternative embodiments, the elevator 403 may incorporate vibration-assisted transport mechanisms, where controlled vibratory motion is applied to the elevation surface to facilitate smooth cartridge movement and prevent sticking or clustering. The vibration parameters, including frequency and amplitude, may be adjustable to optimize performance for different cartridge materials and environmental conditions. Additionally, the elevator 403 may include integrated cleaning systems, such as compressed air nozzles or brush assemblies, positioned along the transport path to remove debris or contaminants from the cartridges 101 during elevation.

Figure 5:
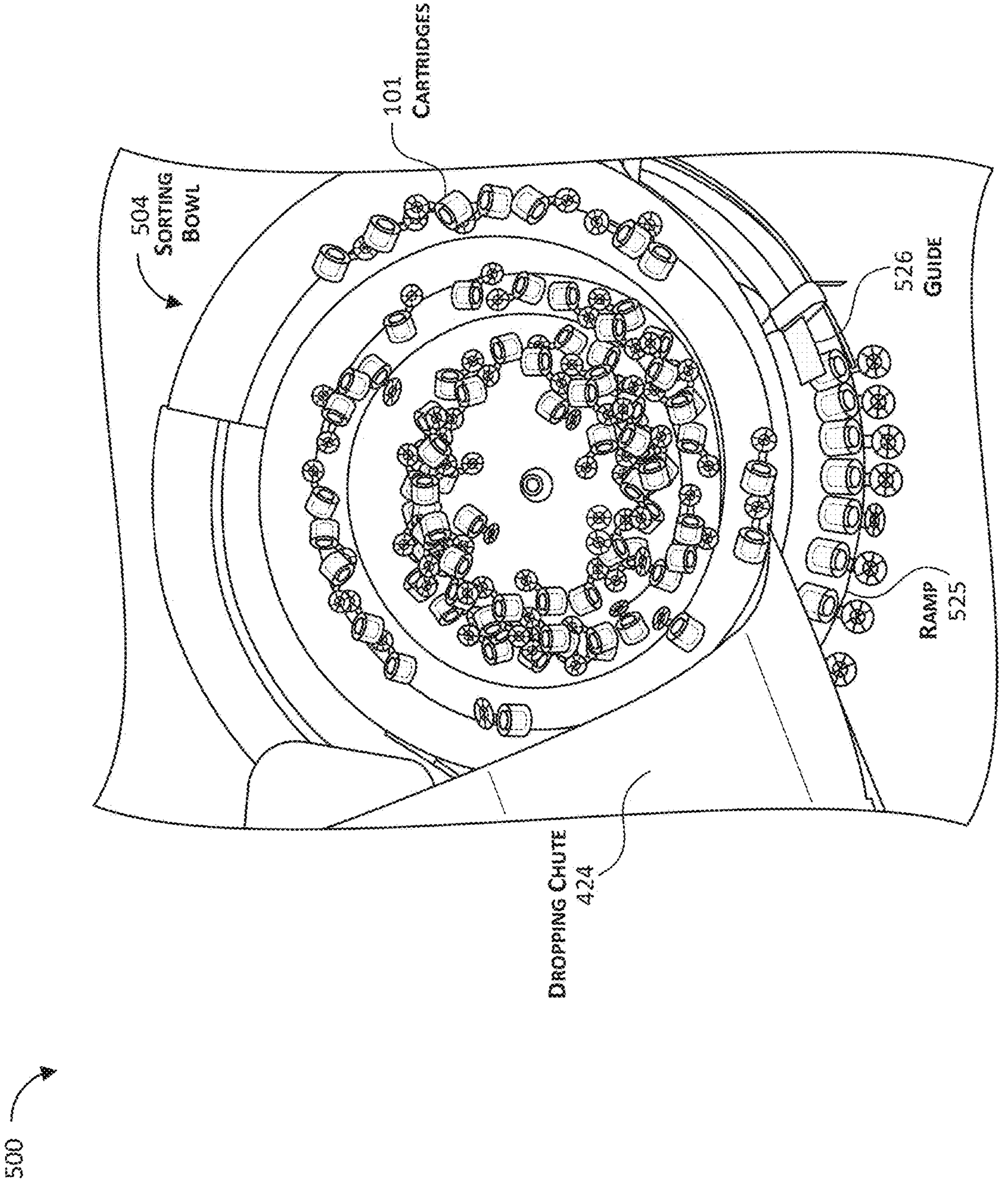
FIGS. 5-6 illustrate various perspectives of a sorting bowl and associated components, according to an embodiment herein.
Figure 6:
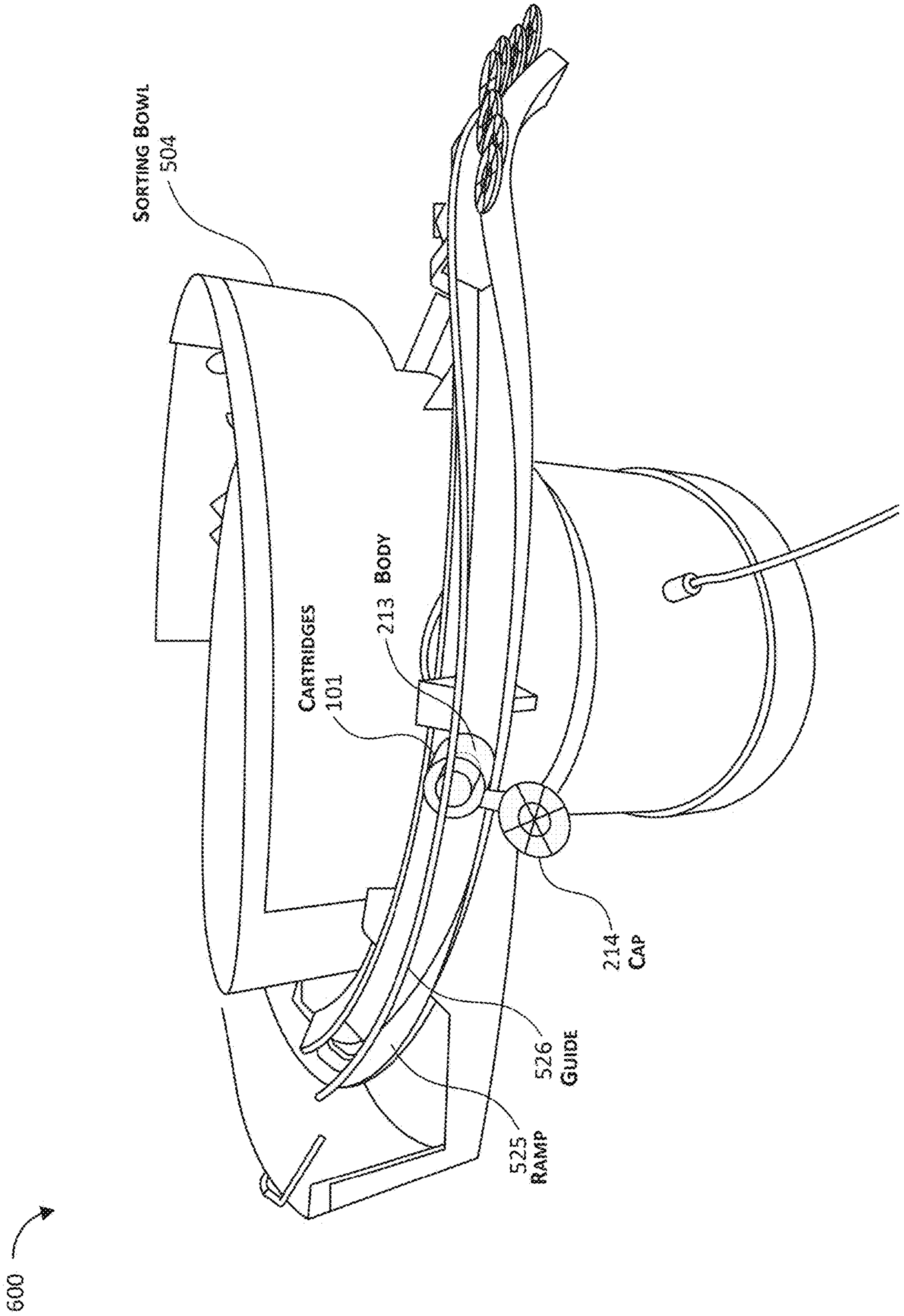

Referring now to FIGS. 5-6, an example sorting bowl 504 is illustrated, according to an embodiment herein. The sorting bowl 504, which may be the same or similar to the sorting bowl 104, may be configured to receive open cartridges 101 from the elevator 403 and orient them for introduction into the downstream filler-capper assembly 105. As shown, cartridges 101 may drop from the dropping chute 424 into the sorting bowl 504, which may have a bowl-shaped configuration. Formed along the surface of the sorting bowl 504 may be ramps 525 that are configured to sort and transfer the cartridges 101 up and out of the sorting bowl 504.

The sorting bowl 504 may operate on vibratory motion principles to facilitate the movement and orientation of cartridges 101. In some embodiments, the sorting bowl 504 may be equipped with one or more vibration motors or electromagnetic drives positioned beneath or around the bowl structure to generate controlled oscillatory motion. The vibratory motion may cause the cartridges 101 to move in a generally circular pattern around the interior surface of the sorting bowl 504, gradually progressing upward along the ramps 525 toward the discharge point. The frequency and amplitude of the vibration may be adjustable to accommodate different cartridge sizes, weights, and materials while maintaining gentle handling to prevent damage to the cartridges 101.

The ramps 525 may be configured with specific geometric features to ensure proper cartridge orientation during the sorting process. For example, the ramps 525 may include guide channels, ridges, or contoured surfaces that encourage cartridges 101 to align in a predetermined orientation as they travel upward. In some cases, the ramps 525 may be designed to separate cartridges 101 that are improperly oriented, such as those with caps 214 positioned incorrectly, allowing only properly oriented cartridges 101 to proceed to the discharge point. The angle and width of the ramps 525 may be tailored based on the dimensions and weight distribution of the cartridges 101 to ensure reliable transport without jamming or backsliding.

In the illustrated example, the sorting bowl 504 includes one or more guides 526 positioned along the ramps 525 or at the discharge point to control cartridge movement and orientation. The guides 526 may include fixed or adjustable barriers, rails, or deflectors that direct the flow of cartridges 101 and prevent them from deviating from the intended path. In some embodiments, the guides 526 may be configured to create a single-file queue of cartridges 101 as they exit the sorting bowl 504, ensuring orderly delivery to the downstream filler-capper assembly 105. The guides 526 may also serve to reject cartridges 101 that do not meet orientation requirements, directing them back into the sorting bowl 504 for additional processing.

The interior surface of the sorting bowl 504 may be constructed from materials that provide appropriate friction characteristics to facilitate cartridge movement while minimizing wear and contamination. For example, the surface may be made from stainless steel, food-grade polymers, or composite materials with specific surface textures or coatings to optimize the interaction with the cartridges 101. The surface may also include drainage features or cleaning ports to facilitate sanitation and maintenance operations.

In various embodiments, the sorting bowl 504 may incorporate sensing and control systems to monitor and optimize the sorting process. For instance, optical sensors or mechanical switches may be positioned at various points around the sorting bowl 504 to detect cartridge levels, flow rates, or orientation status. These sensors may provide feedback to a control system that can adjust vibration parameters, activate or deactivate specific sections of the sorting bowl 504, or coordinate with upstream and downstream equipment to maintain optimal throughput and quality.

The discharge mechanism of the sorting bowl 504 may be configured to provide controlled release of properly oriented cartridges 101 to the downstream processing equipment. The discharge point may include flow control elements such as adjustable gates, timing mechanisms, or pneumatic actuators that regulate the rate at which cartridges 101 are released from the sorting bowl 504. This controlled discharge capability allows the sorting bowl 504 to synchronize with the processing speed of the filler-capper assembly 105 and prevent overflow or starvation conditions in the downstream equipment.

In the illustrated example, the sorting bowl 504 includes the guide 526 that orients the cartridge 101 such that the cap 214 extends downwards/outwards from the ramp 525 while securing the body 213 of the cartridge 101 within the ramp 525. The guide 526 may be positioned to create a specific orientation pathway that allows the body 213 to remain supported and guided along the ramp 525 while permitting the cap 214 to hang freely or extend beyond the edge of the ramp 525. This configuration ensures that the inner chamber 220 of the cartridge 101 is exposed and oriented in a manner to receive the remediating component from the downstream filler-capper assembly 105. The guide 526 may include contoured surfaces or channels that accommodate the specific geometry of the cartridge 101, maintaining the desired orientation as the cartridge 101 progresses through the sorting bowl 504. This orientation arrangement facilitates efficient filling operations by presenting the inner chamber 220 in an accessible position for the injection nozzles of the filler-capper assembly 105, while preventing the cap 214 from interfering with the filling process or becoming misaligned during transport. Additionally, this orientation may ensure that the cap 214 is oriented in a correct position for closing/sealing of the cartridge 101 by the filler-capper assembly 105.

Figure 7:
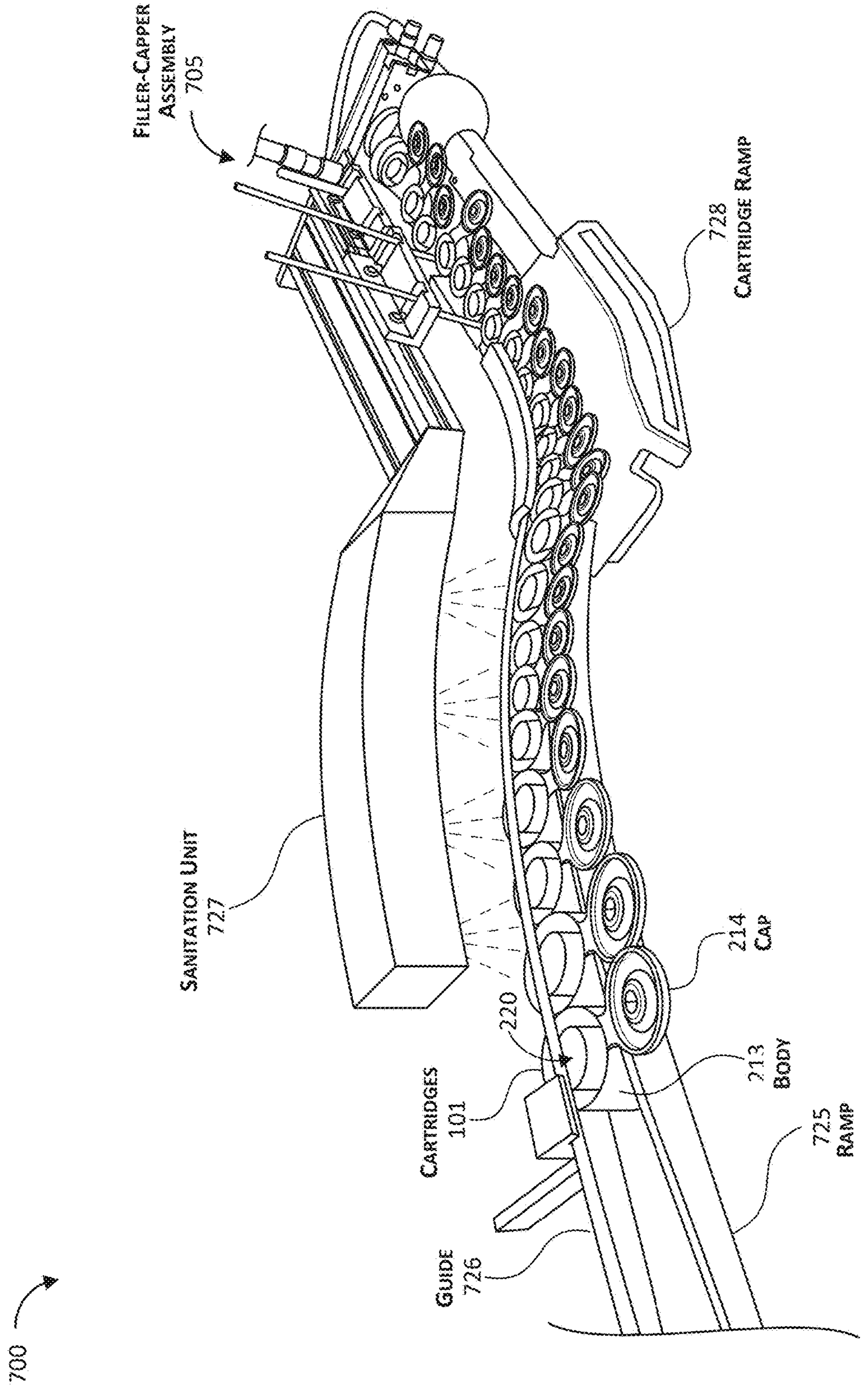
FIG. 7 illustrates a perspective of a sanitation unit, according to an embodiment herein.

Referring now to FIG. 7, an example perspective 700 of a sanitization unit is illustrated, according to an embodiment herein. The perspective 700 shows the discharge point from the sorting bowl 504 and the subsequent processing stages leading to a filler-capper assembly 705. As shown, the ramp 725, which may be the same or similar to the ramp 525 described with respect to FIGS. 5-6, extends from the sorting bowl 504 and is configured to feed the cartridges 101 in a controlled manner to the downstream filler-capper assembly 705. The filler-capper assembly 705 may be the same or similar to the filler-capper assembly 105 described with respect to FIG. 1, and is configured to fill the cartridges 101 with remediating components and subsequently seal them to form completed cartridges ready for introduction into beverage containers.

The guide 726, which may be the same or similar to the guide 526 described with respect to FIGS. 5-6, is positioned along the ramp 725 to maintain the correct orientation of the cartridges 101 as they progress through the system. Specifically, in the illustrated example, the guide 726 ensures proper orientation of the inner chamber 220 and the cap 214 of each cartridge 101. This orientation may aid in the subsequent filling and capping operations, as the inner chamber 220 is accessible to receive the remediating components, while the cap 214 is positioned appropriately for the sealing process. The guide 726 may include contoured surfaces, rails, or other directional elements that prevent the cartridges 101 from rotating or shifting during transport, thereby maintaining the desired orientation established by the sorting bowl 504.

Between the ramp 725, which may also be referred to herein as a track or pathway, and the filler-capper assembly 705, a sanitization unit 727 may be provided to sanitize the cartridges 101, particularly the inner chamber 220 and any exposed surfaces, to reduce or prevent contamination before the filling process begins. The sanitization unit 727 may employ various sanitization methods, such as rinsing the cartridges 101 with ionized air, applying antimicrobial or other chemical sanitization solutions, or using ultraviolet (UV) light treatment to eliminate potential contaminants. This sanitization step may be particularly important in food and beverage applications where maintaining sterile conditions is essential for product safety and quality.

The sanitization unit 727 may be sized and configured to provide adequate sanitization coverage while maintaining the continuous flow of cartridges 101 along the ramp 725. The dimensions of the sanitization unit 727 may be determined based on the speed at which cartridges 101 travel along the ramp 725 and the contact time required for effective sanitization. In some embodiments, the sanitization unit 727 may include an elongated treatment chamber that extends along a portion of the ramp 725, allowing cartridges 101 to receive sanitization treatment as they move through the chamber without requiring them to stop or slow down. The length of the sanitization unit 727 may be calculated to ensure that each cartridge 101 receives sufficient exposure time to the sanitizing agent, whether ionized air, antimicrobial solution, or ultraviolet light, while maintaining the desired throughput rate. Additionally, the sanitization unit 727 may incorporate multiple sanitization zones or stages positioned sequentially along the ramp 725, where each zone provides a specific type of treatment, such as initial debris removal followed by antimicrobial application and final drying. The width and height of the sanitization unit 727 may be configured to accommodate the dimensions of the cartridges 101 while providing uniform coverage of all exposed surfaces, including the inner chamber 220 and outer surfaces of the body 213.

It should be appreciated that while the sanitization unit 727 is illustrated as positioned subsequent to the sorting bowl 504, the sanitization unit 727 may be positioned in various locations throughout the assembly system 102. For example, one or more components of the sanitization unit 727 may be incorporated into the elevator 403 or the sorting bowl 504, such as a UV unit that may be positioned above the sorting bowl 504 to sanitize the cartridges 101 during the sorting process. In other cases, the sanitization unit 727 may be incorporated into the dropping chute 424, allowing for sanitization of the cartridges 101 as they transition from the elevator 403 to the sorting bowl 504. This flexibility in positioning allows the sanitization process to be integrated at multiple stages of the assembly system 102, providing redundant contamination control or enabling specialized sanitization treatments at different points in the cartridge handling process. The modular nature of the sanitization unit 727 components may also allow for customization based on specific production requirements, facility constraints, or regulatory standards for different beverage types or packaging environments.

Figure 8:
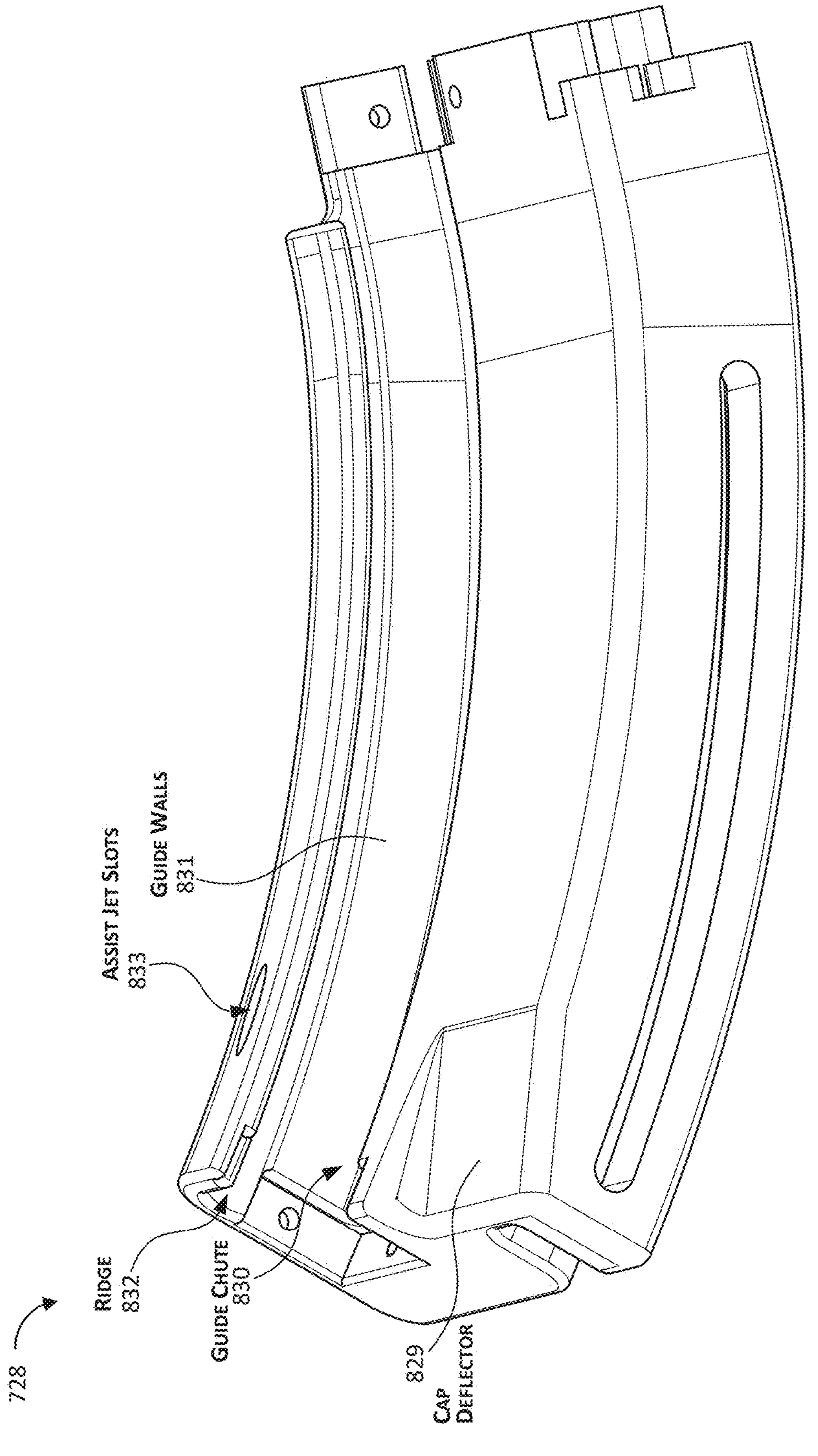
FIG. 8 illustrates a perspective view of a guide assembly, according to an embodiment herein.
Figure 9:
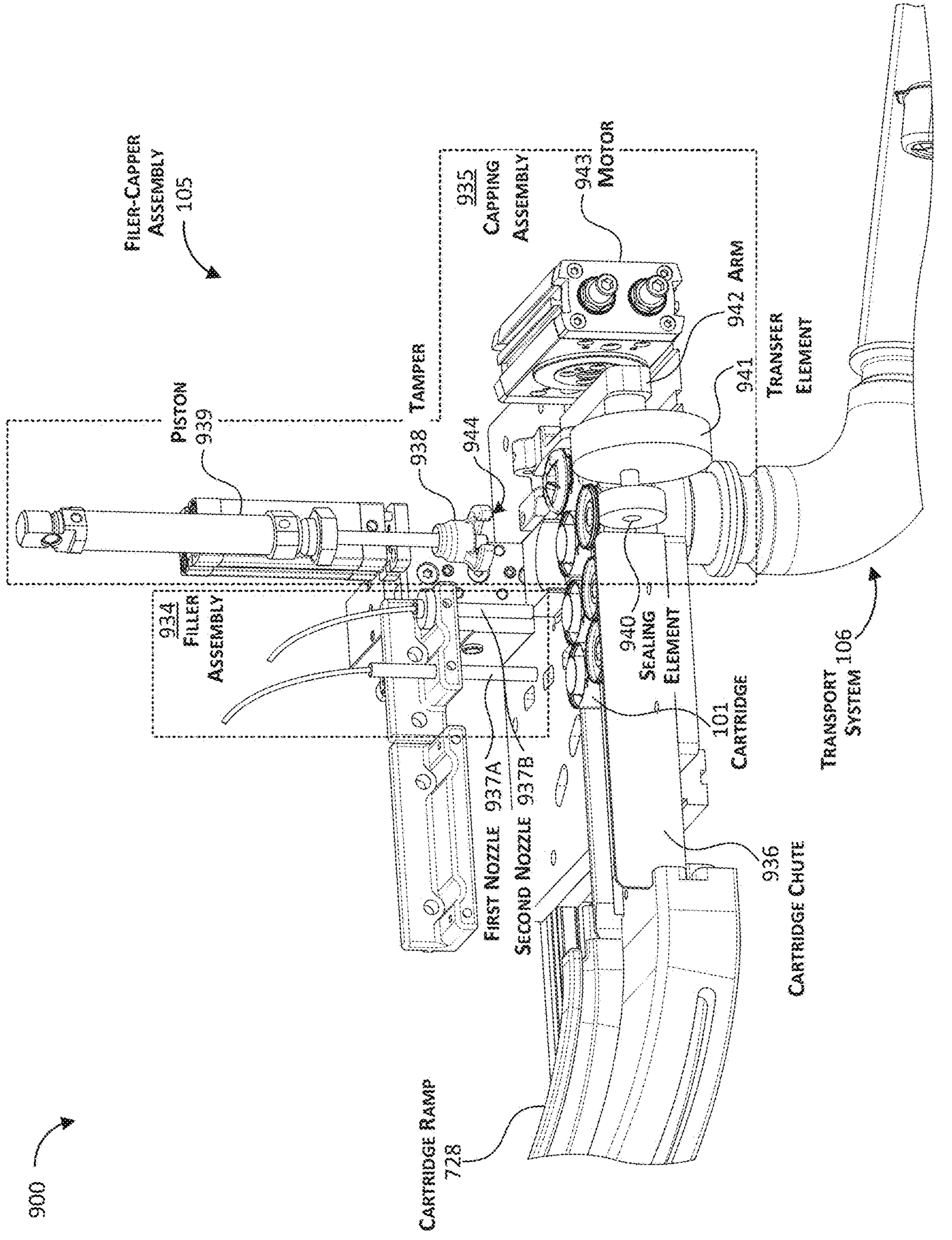
FIG. 9 illustrates a perspective of a filler assembly and capping assembly, according to an embodiment herein.

Following sanitization, the cartridges 101 proceed along the ramp 725 to a cartridge ramp 728. Reference is now made to FIG. 8, which provides a detailed perspective of the cartridge ramp 728, according to an embodiment herein. The cartridge ramp 728 may be configured to provide a smooth transition from the ramp 725 to the filler-capper assembly 705 and maintain the cartridges 101 in a proper orientation for receiving the remediating component. As shown, the cartridge ramp 728 includes a guide chute 830 configured to guide the cartridges 101 from the ramp 725 to the filler-capper assembly 705. The guide chute 830 may include guide walls 831 on opposing sides which direct the cartridges 101 along a defined path. The guide walls 831 may be spaced to accommodate the diameter of the cartridge body 213 while preventing lateral movement that could cause misalignment. In some embodiments, the exterior sidewalls of the body 213 of the cartridge 101 may include cut-outs or flattened surfaces. In such cases, the guide walls 831 may prevent the cartridge 101 from rotating once entered into the guide chute 830.

As shown, the cartridge ramp 728 further includes a cap deflector 829 positioned near the entrance of the guide chute 830. The cap deflector 829 may have a ramp-like surface configured to catch caps 214 in various positioning orientations as they enter the guide chute 830 and raise them to approximately the same height and orientation. This pre-orientation function may be required because caps 214 may arrive at different angles or positions due to the preceding sorting and transport processes. As will be described in greater detail below, by pre-orienting the caps 214 prior to entering the filler-capper assembly 105, the cap deflector 829 ensures that the capping assembly can efficiently and correctly engage with the cap 214 and seal the cartridge 101.

In some embodiments, the cartridge ramp 728 may include one or more assist jet slots 833 configured to receive assist jets for injecting gas into the guide chute 830. The assist jets may be strategically positioned along the cartridge ramp 728 to provide controlled gas flow that assists in progressing the cartridges 101 along the guide chute 830 and towards the filler-capper assembly 105. The gas injection from the assist jets may help maintain consistent cartridge movement speed and prevent stalling or jamming within the guide chute 830, particularly when cartridges 101 encounter directional changes or transitions in the transport pathway. The assist jets may utilize inert gases such as nitrogen or carbon dioxide to maintain an oxygen-reduced environment while providing the necessary propulsion force to advance the cartridges 101 through the system efficiently.

As shown, a ridge 832 may extend along an upper portion of the guide chute 830, providing structural support and helping to maintain the proper trajectory of the cartridges 101 as they advance through the guide chute 830. The ridge 832 may be positioned to create a defined pathway that constrains the vertical movement of the cartridges 101 while allowing them to progress smoothly along the longitudinal axis of the guide chute 830. For example, the ridge 832 may engage with the top of the body 213 of the cartridge 101 and prevent the cartridges 101 from dislodging from the cartridge ramp 728. This engagement may ensure that when the cartridges 101 are subjected to pneumatic forces from the assist jet slots 833, the ridge 832 provides a counteracting force that maintains cartridge stability and prevents unwanted vertical displacement.

The ridge 832 may be configured with a specific height and contour that accommodates the dimensional variations of different cartridge sizes while maintaining consistent contact with the cartridge body 213. In some embodiments, the ridge 832 may include a curved or chamfered surface that facilitates smooth interaction with the cartridges 101, reducing friction and potential damage during transport. Additionally, the ridge 832 may extend substantially along the entire length of the guide chute 830, or alternatively, may be segmented into discrete sections positioned at set points where cartridge stability is required, such as at curves or transitions in the guide chute 830 pathway.

Turning now to FIGS. 9-22, various perspectives of a filler-capper assembly 705 are provided. The following description of FIGS. 9-22 addresses these figures collectively, with specific reference made to individual figures where particularly relevant to the discussion. Starting with FIG. 9, an overview perspective 900 of a filler-capper assembly 705 is illustrated, according to an embodiment herein. The filler-capper assembly 705, which may be the same or similar to the filler-capper assembly 105, may include a filler assembly 934 and a capping assembly 935. The cartridges 101 may be introduced into the filler-capper assembly 705 via the cartridge ramp 728, which as described above may orient the cartridges for filling and capping operations. From the cartridge ramp 728, the cartridges 101 may be introduced into a cartridge chute 936 which maintains the cartridge's orientation during the filling and capping operations within the assembly 705. The cartridge chute 936, as described in greater detail below, may also facilitate progression of the cartridges through the filler-capper assembly 705.

As shown, the filler assembly 934 may include one or more nozzles, such as a first nozzle 937A and a second nozzle 937B. Depending on the application, the first nozzle 937A may be configured to provide a puff or blast of inert gas (e.g., carbon dioxide or nitrogen) into the cartridge 101, such as into the inner chamber 220 to eject oxygen within the chamber. The second nozzle 937B may be configured to inject the remediating component, such as into the inner chamber 220. In embodiments where more than one remediating component is injected into the cartridge 101, there may be additional nozzles, and in embodiments where no remediating component is injected into the cartridge 101, there may only be a single nozzle.

The capping assembly 935 may be positioned downstream from the filler assembly 934 and may include various components configured to secure the cap 214 to the body 213 of the cartridge 101. As illustrated, the capping assembly 935 may include a sealing element 940 configured to position and seat the cap 214 onto the top end of the body 213. The sealing element 940 may be operatively connected to an arm 942, which may be driven by a motor 943 to provide controlled movement during the capping operation. In some embodiments, the capping assembly 935 may also include a tamper 938 positioned to apply downward pressure to the cap 214 after the sealing element 940 has positioned the cap 214, thereby ensuring a secure seal between the cap 214 and the body 213. A top press cylinder 939 may be positioned above the assembly to provide additional force or control during the capping operation, ensuring consistent sealing pressure across different cartridge configurations. The sealing process is described in greater detail below with respect to FIGS. 14-17.

The filler-capper assembly 705 may also include a transfer element 941 configured to move sealed cartridges from the capping assembly 935 to a downstream location, such as toward the transport system 106. The transfer element 941 may be mounted to the arm 942 and may operate in coordination with the sealing element 940 to provide efficient processing of multiple cartridges. In some embodiments, the transfer element 941 and the sealing element 940 may be configured to operate simultaneously such that a first cartridge 101 is sealed by the sealing element 940 at the same time that a second cartridge 101 is transferred by the transfer element 941. The transfer process is described in greater detail below with respect to FIGS. 18-20.

Figure 10:
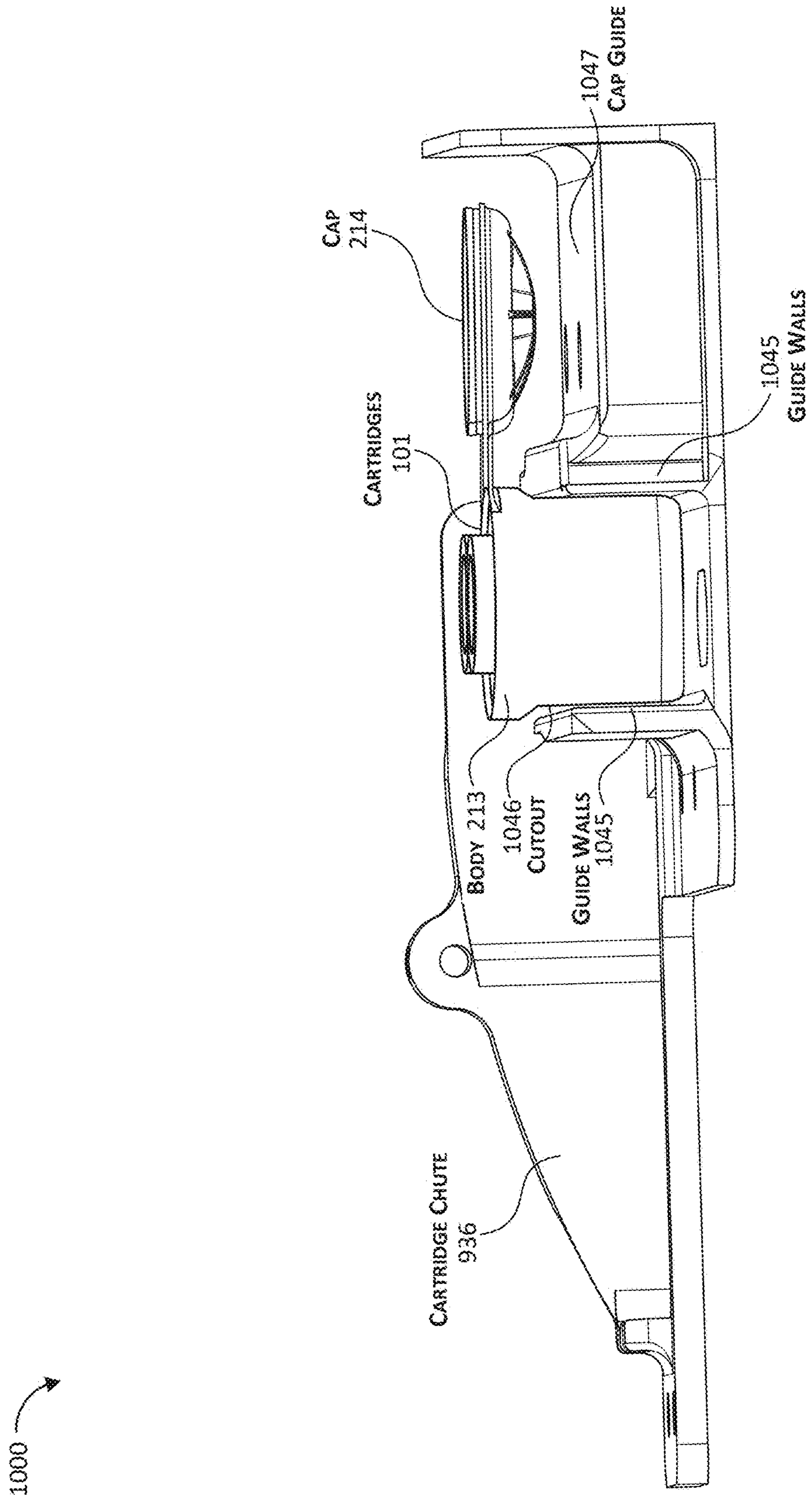
FIGS. 10-12 illustrate various perspectives of a cartridge chute, according to an embodiment herein.
Figure 11:
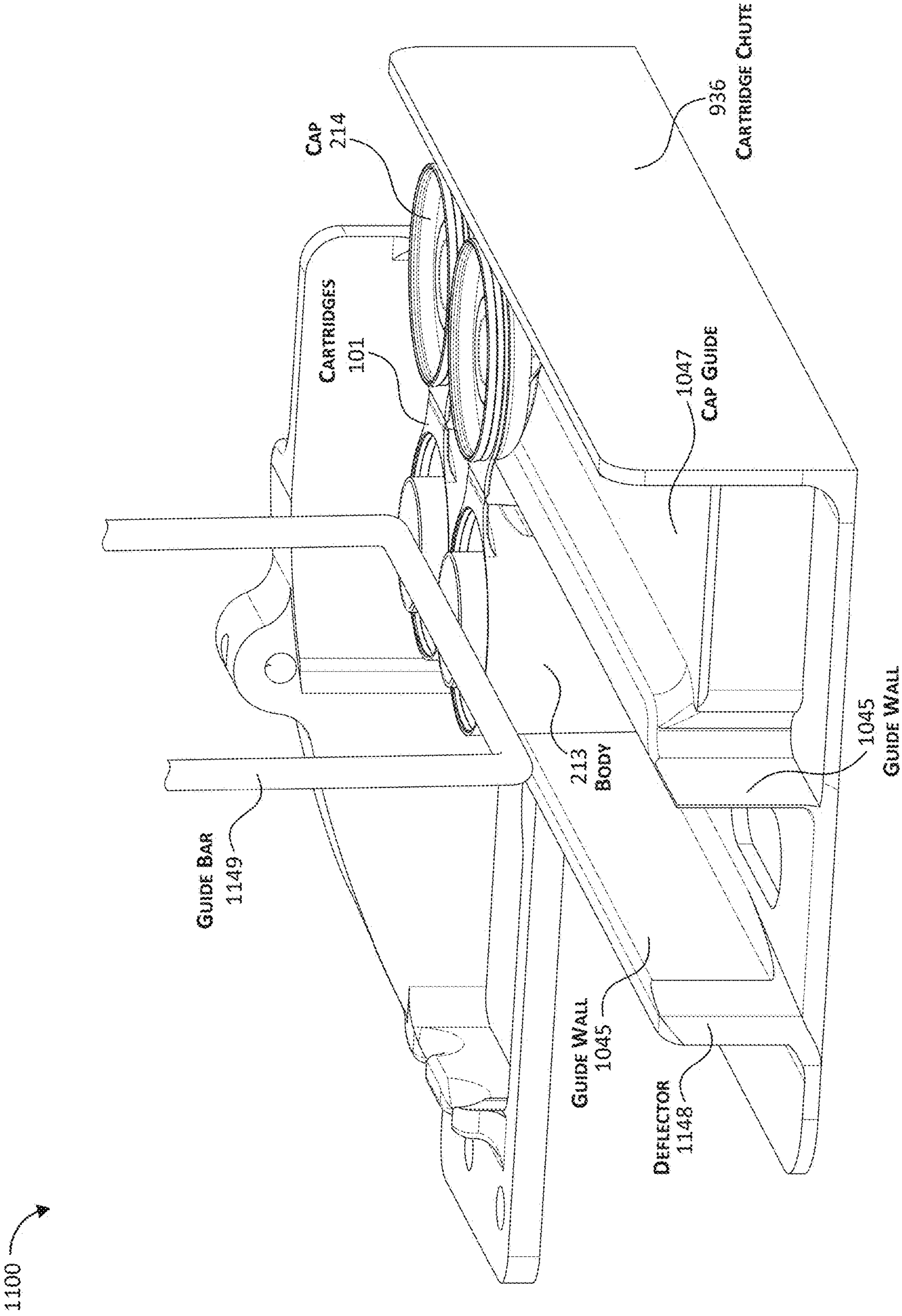
Figure 12:
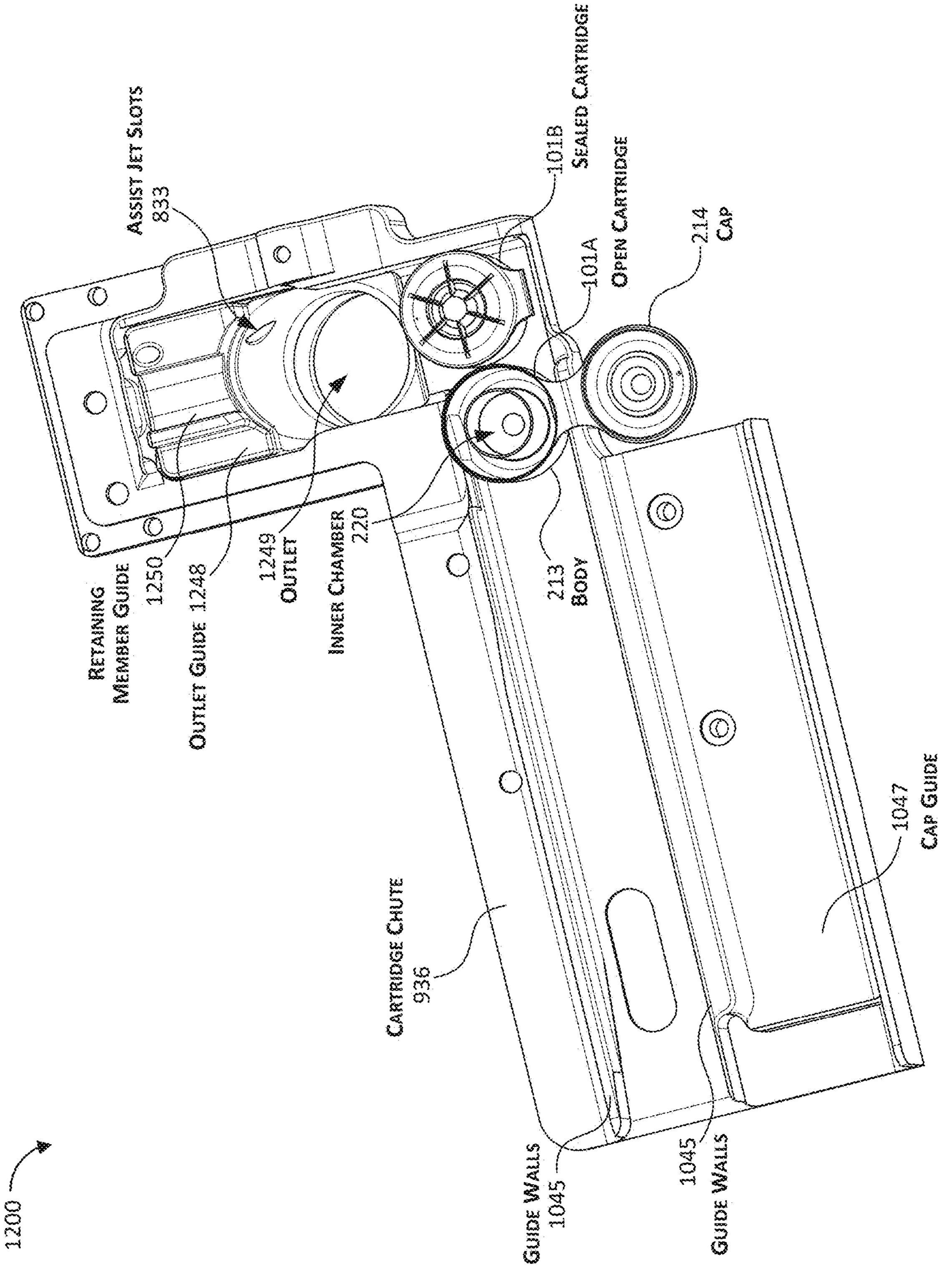

With reference to FIGS. 10-12, various perspectives 1000-1200 of the cartridge chute 936 are provided, according to embodiments herein. The cartridge chute 936 may extend through the filler-capper assembly 705 and may include features to maintain proper cartridge alignment and facilitate smooth progression through the filling and capping stages. As shown, the cartridge chute 936 includes guide walls 1045 which may prevent the cartridges 101 from rotating during their progression. As noted above, in some cases the cartridges 101 may include cutouts 1046, such to aid in alignment and orientation of the cartridge 101 during processing. As such, the guide walls 1045 may be sized to substantially match a diameter of the cartridge body 213 between the cutouts 1046, thereby limiting rotation of the cartridge body about a vertical axis.

In some embodiments, the cartridge chute 936 may include a deflector 1148 to facilitate a smooth transition of cartridges 101 from the cartridge ramp 728 into the cartridge chute 936. For example, the deflector 1148 may accommodate dimensional changes in the pathway width between the two components. That is, the distance between the guide walls 1045 of the cartridge chute 936 may be less than the distance between the guide walls 831 of the guide chute 830, creating a narrowing pathway that requires precise alignment of the cartridges 101. The deflector 1148 may be positioned at the transition point to guide the cartridges 101 as they enter the reduced pathway width, preventing jamming or misalignment that could occur due to the dimensional change. As the cartridges 101 progress from the wider guide chute 830 to the narrower cartridge chute 936, the deflector 1148 may provide a gradual redirection of the cartridge movement, ensuring that the cartridges 101 maintain proper orientation and continue smoothly through the assembly system without interruption or damage to the cartridge structure.

The cartridge chute 936 may also include a cap guide 1047 that maintains the orientation and deflection of the cap 214 during cartridge progression through the assembly system. The cap guide 1047 may comprise a contoured surface or rail structure positioned to engage with the cap 214 and prevent rotational movement about the longitudinal axis of the cartridge chute 936. In some embodiments, the height of the cap guide 1047 may be substantially similar to the height of the cap deflector 829 of the cartridge ramp 728, typically ranging from 2 to 8 millimeters above the base surface of the cartridge chute 936, such to maintain consistent cap positioning throughout the transport pathway. The cap guide 1047 may be configured with a specific clearance tolerance, for example 0.5 to 2 millimeters, relative to the cap 214 dimensions to accommodate manufacturing variations while maintaining secure guidance. In other embodiments, the cap guide 1047 may further refine the cap's 214 orientation and positioning through progressive geometric constraints, such as tapered surfaces or stepped configurations that gradually adjust the cap 214 to a precise angular orientation relative to the cartridge body 213, ensuring proper alignment for subsequent filling and capping operations.

The cartridge chute 936 may further include a guide bar 1149 positioned slightly above the top end of the body 213 as the cartridge 101 progresses through the cartridge chute 936. The guide bar 1149 may be strategically located to provide vertical constraint and stability for the cartridges 101 during their movement through the assembly system. By maintaining a predetermined clearance above the cartridge body 213, the guide bar 1149 may prevent the cartridges 101 from dislodging from the cartridge chute 936, particularly when subjected to pneumatic forces or mechanical vibrations that could otherwise cause unwanted vertical displacement. The guide bar 1149 may extend longitudinally along a portion or the entire length of the cartridge chute 936, creating a physical barrier that maintains the cartridges 101 within the defined transport pathway. In some embodiments, the cartridge chute 936 may be configured with one or more gas jet slots (not shown) positioned along its length to accommodate pneumatic gas jets that provide propulsion force to move the cartridges 101 through the chute. The combination of the guide bar 1149 and the pneumatic gas jets may work in coordination, where the guide bar 1149 provides the necessary counteracting force to maintain cartridge stability while the gas jets supply the forward momentum required for efficient cartridge progression through the filler-capper assembly 705.

The cartridge chute 936 may be constructed from food-grade materials such as stainless steel or FDA-approved polymers to maintain sanitary conditions and prevent contamination during the assembly process. For example, the cartridge chute 936 may be constructed from food-grade materials including stainless steel grades such as 316L or 304, food-grade polymers such as polyethylene terephthalate (PET), polypropylene (PP), or polyoxymethylene (POM), or composite materials that combine multiple layers for enhanced durability and chemical resistance. The material selection for the cartridge chute 936 may be based on factors including chemical compatibility with cleaning agents, resistance to wear from repeated cartridge contact, thermal stability during sanitization processes, and compliance with food safety regulations.

In some embodiments, the cartridge chute 936 may be constructed as a mono-formed structure, meaning that the guide walls 1045, cap guide 1047, and other structural elements are formed as a single, continuous piece through manufacturing processes such as injection molding, machining from a solid block, or additive manufacturing. This mono-formed construction eliminates joints, seams, or connection points that could harbor contaminants, provides enhanced structural integrity, and simplifies cleaning and maintenance procedures by creating smooth, continuous surfaces throughout the cartridge pathway.

Referring specifically to FIG. 12, the progression of cartridges through the cartridge chute 936 demonstrates the transformation from open to sealed configurations during the assembly process. As the cartridge 101 progresses through the cartridge chute 936, the cartridge may be an open cartridge 101A during the filling operation and until the sealing process. The open cartridge 101A maintains its unsealed state while the inner chamber 220 receives the remediating components through the filling nozzles 937A/B. After the filling operation, the open cartridge 101A may undergo the sealing process during which the cap 214 is positioned on the body 213, and in some cases, a downward force applied to seal the cartridge 101. At this point, the cartridge is now a sealed cartridge 101B.

The sealed cartridge 101B may progress to the end of the cartridge chute 936, where it may be transitioned out of the filler-capping assembly 705. In the illustrated example, to transition the sealed cartridge 101B out of the filler-capping assembly 705, the cartridge chute 936 may include an outlet 1249. The outlet 1249 may be an opening through which the transfer element 941 pushes the sealed cartridge 101B. As described in greater detail below, the outlet 1249 may be in fluid connection with the transport system 106, such that the sealed cartridge 101B is fed directly into the transport system 106. The outlet 1249 may be positioned at the downstream end of the cartridge chute 936 and may be sized to accommodate the dimensions of the sealed cartridge 101B while providing a smooth transition pathway that prevents damage to the cartridge during the transfer operation.

Figure 13:
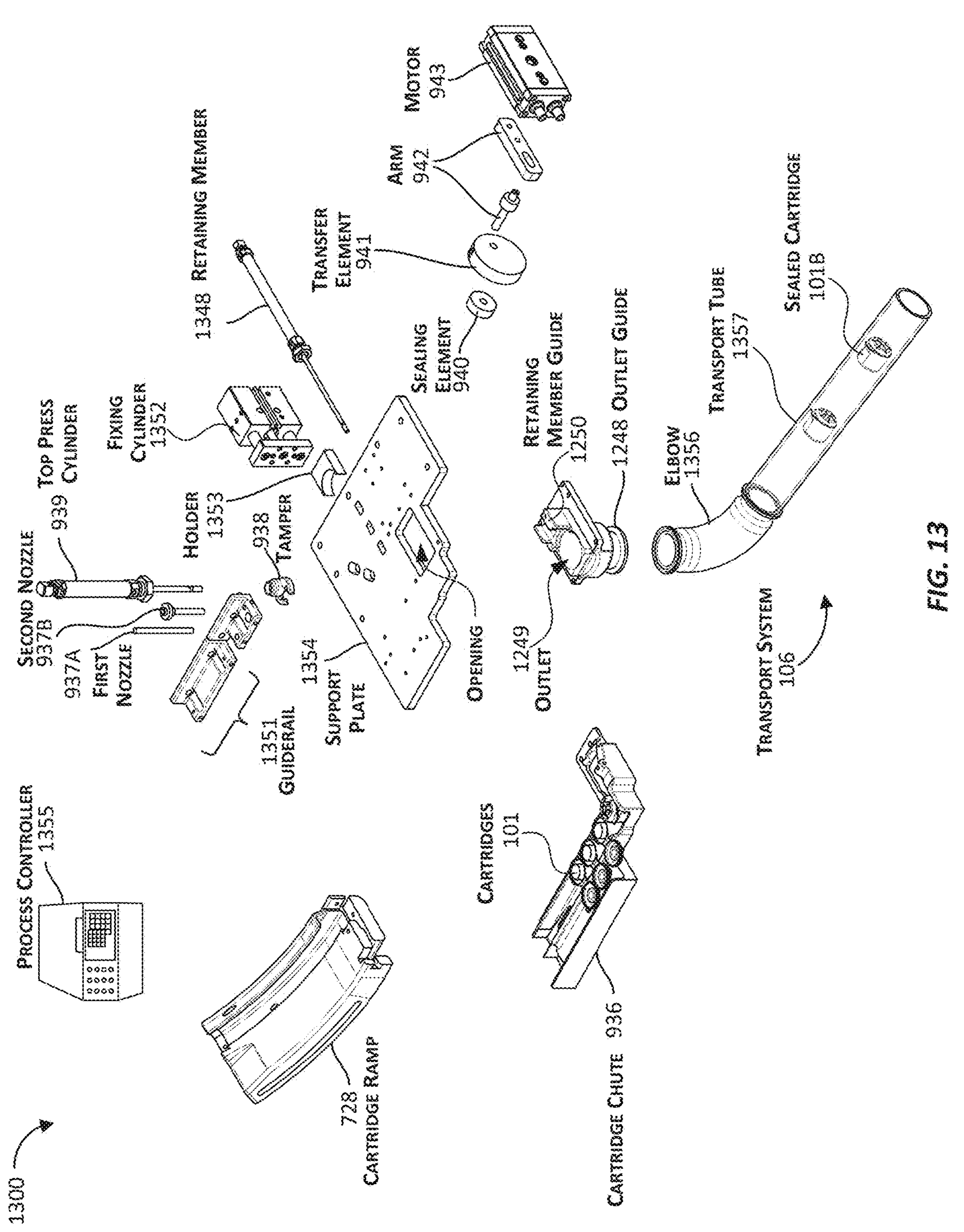
FIG. 13 illustrates an exploded view of a filler-capper assembly, and associated components, according to an embodiment herein.

With reference to FIG. 13, which provides an exploded view 1300 of the filler-capper assembly 705, the various components of the filler-capper assembly 705 may be built-upon or supported by a support plate 1354. As shown, the cartridge ramp 728 may connect to the cartridge chute 936 such that cartridges 101 transition from the guide chute 830 into the cartridge chute 936. The cartridge chute 936 may be supported by the support plate 1354. The filler-capper assembly 705 may include guiderails 1351 which support the first and second nozzles 937A-B. The top press cylinder 939 for the tamper 938 may be in operable communication with a fixing cylinder 1352 that provides structural support and positioning control for the tamper assembly during operation. A holder 1353 may support and guide the top press cylinder 939, ensuring it doesn't shift during the assembly processing.

As shown, the support plate 1354 may have an opening through which cartridges 101 can reach the outlet 1249. The outlet guide 1248 may be configured to attach to a bottom side of the support plate 1354 and be aligned such that the retaining member guide 1250 projects through the opening of the support plate 1354. The exploded view 1300 also illustrates how the outlet guide 1248 may be in operable communication with segments of the transport system 106. In particular, the outlet guide 1248 may be in fluid connection with an elbow 1356 which redirects the received cartridges 101 from the outlet guide 1248 to the transport tube 1357.

The filler-capper assembly 705 may also include a process controller 1355 configured to coordinate and synchronize the various operations within the assembly system. The process controller 1355 may be in operable communication with multiple mechanical and electrical components of the filler-capper assembly 705, enabling centralized control and timing coordination for managing multiple cartridges 101 simultaneously. For example, the process controller 1355 may control the purging process performed by the first nozzle 937A, regulating the timing and duration of inert gas injection into the inner chamber 220 to ensure adequate oxygen displacement. The process controller 1355 may also manage the injection process of the second nozzle 937B, controlling the flow rate, volume, and timing of remediating component delivery to achieve consistent filling across multiple cartridges 101. For example, in some embodiments, the second nozzle 937B may be operatively connected to a peristaltic pump or other metering system configured to dispense precise volumes of the remediating component into the inner chamber 220. The process controller 1355 may control the peristaltic pump by regulating the pump's rotational speed and duration of operation to achieve precise volumetric dispensing, while also coordinating the activation timing with cartridge positioning within the cartridge chute 936 to ensure that each cartridge 101 receives the predetermined volume of remediating component at the optimal moment during the filling sequence.

Additionally, the process controller 1355 may coordinate the sealing process by synchronizing the operation of the sealing element 940 and the tamper 938, ensuring that cap positioning and pressure application occur in proper sequence and with appropriate timing intervals. The process controller 1355 may further manage the coordination between the transfer element 941 and the retaining member 1348, controlling the precise timing of cartridge transfer operations to maintain smooth workflow and prevent bottlenecks within the assembly system.

The process controller 1355 may enable the filler-capper assembly 705 to maintain consistent processing quality while maintaining consistent and efficient throughput across varying production speeds and cartridge configurations. In some embodiments, the filler-capper assembly 705 may be configured to handle multiple cartridges 101 simultaneously, with individual cartridges 101 positioned at different stages of the assembly process, such as one cartridge undergoing purging while another receives remediating components and a third undergoes sealing operations. The process controller 1355 may ensure that each of these concurrent processes remains synchronized with the others, maintaining proper timing intervals and coordination between all assembly stages to provide continuous, uninterrupted assembly of cartridges 101 throughout the production cycle.

Figure 14:
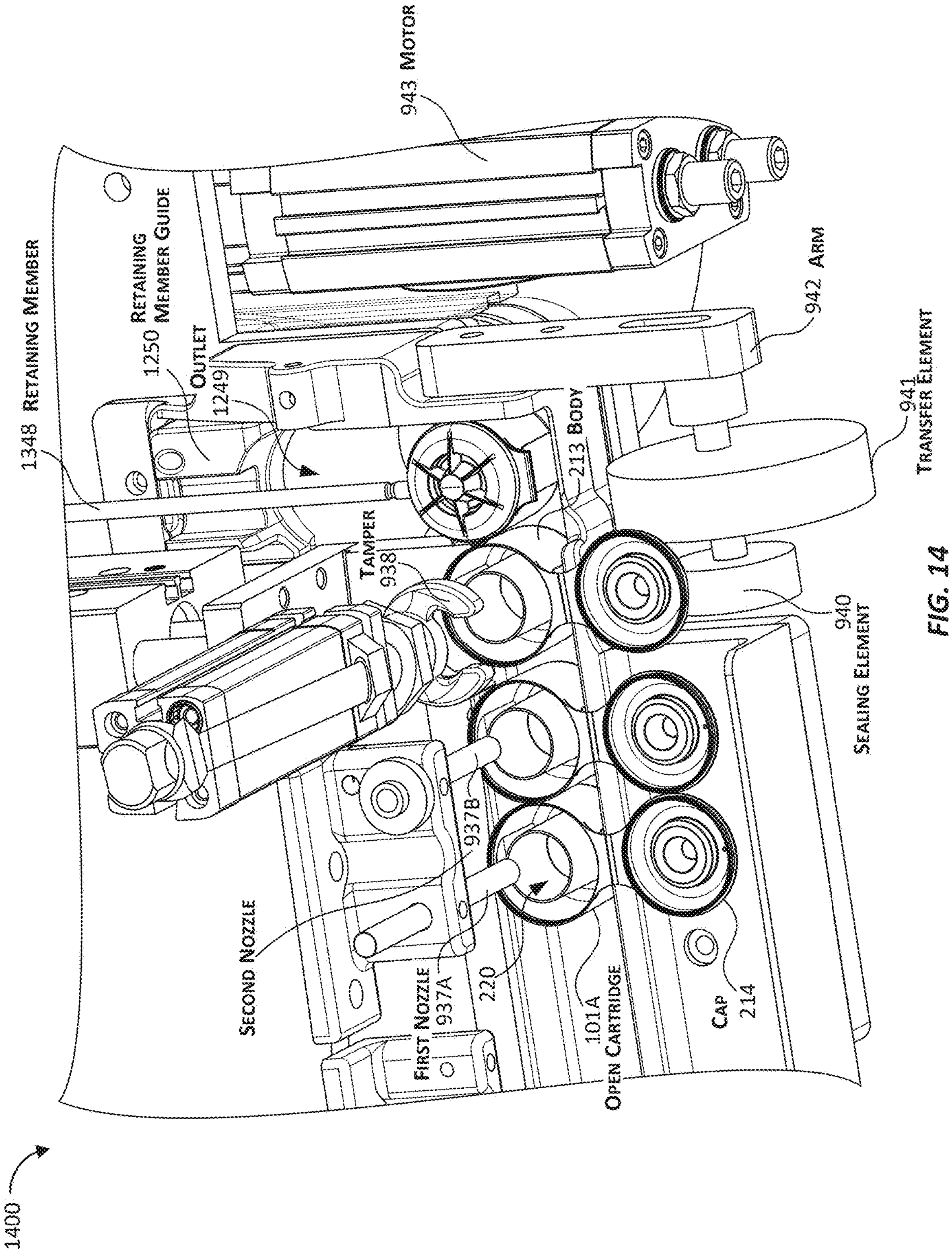
FIG. 14-17 illustrate various perspectives of the filler-capper assembly, according to an embodiment herein.

With reference specifically to FIG. 14, perspective 1400 illustrates how the first nozzle 937A and the second nozzle 937B may be spaced such when the cartridges 101 progress through the cartridge chute 936, an inner chamber 220 of first cartridge 101 may be aligned with the first nozzle 937A and an inner chamber 220 of the second cartridge 101 may be aligned with the second nozzle 937B. As noted above the first nozzle 937A may inject an inert gas, such as carbon dioxide or nitrogen, into the inner chamber 220. By injecting the inert gas into the inner chamber 220, the first nozzle 937A displaces any contaminants that may be present and may remove oxygen from the inner chamber 220. As oxygen can degrade both the remediating components stored within the cartridge 101 and the packaged beverage itself, displacing oxygen may be required during the assembly process. Since the cartridge 101 is designed to open inside the packaged beverage upon consumer activation, any oxygen trapped within the inner chamber 220 would be released directly into the beverage, potentially causing oxidative reactions that compromise the beverage's flavor profile, freshness, and overall quality. By purging the inner chamber 220 with inert gas during the assembly process, the filling assembly 934 ensures that the cartridge 101 maintains an oxygen-free environment, thereby preserving both the integrity of the remediating components and preventing the introduction of oxygen into the packaged beverage upon consumption.

The second nozzle 937B may be positioned in close proximity to the first nozzle 937A along the cartridge chute 936 to minimize the time interval between purging and filling operations. In some embodiments, the spacing between the first nozzle 937A and the second nozzle 937B may be configured to allow for sequential processing of cartridges 101 with minimal delay, such that a cartridge 101 may progress from the purging station to the filling station within a predetermined time frame. The cartridges 101 may be timed through the system such that there is minimal time between purging of the inner chamber 220 by the first nozzle 937A and injection of the remediating component by the second nozzle 937B. By reducing the time between the first nozzle 937A and the second nozzle 937B, the time for oxygen or ambient air to ingress into the inner chamber 220 may be limited. This timing coordination may be achieved through controlled advancement mechanisms, such as pneumatic propulsion or mechanical indexing systems, that ensure consistent cartridge movement speed through the cartridge chute 936. In some cases, the time interval between purging and filling operations may be maintained at less than 5 seconds, or in other embodiments less than 2 seconds, to prevent oxygen infiltration that could compromise the effectiveness of the purging process and the quality of the remediating components.

In some cases, to further prevent oxygen exposure or ingression within the inner chamber 220, the filler-capper assembly 705 may operate within a controlled atmosphere environment, such as with nitrogen or carbon dioxide. The filler-capper assembly 705 may be enclosed within a chamber or housing that maintains an inert gas blanket over the entire filling and capping operation, creating an oxygen-depleted environment that surrounds the cartridges 101 throughout the processing stages. This controlled atmosphere may be maintained through continuous injection of inert gas into the enclosure, with the gas concentration monitored and regulated to ensure oxygen levels remain below predetermined thresholds, such as less than 1% or less than 0.5% oxygen by volume. The nitrogen or carbon dioxide environment may extend from the point where cartridges 101 enter the filler-capper assembly 705 through the cartridge ramp 728 until the sealed cartridges 101B exit through the outlet 1249, providing comprehensive protection against oxygen contamination during the most vulnerable stages of the assembly process. Additionally, the controlled atmosphere may include positive pressure relative to the surrounding environment to prevent ambient air infiltration through any gaps or openings in the assembly housing, ensuring that the inert gas environment is maintained consistently throughout the operation.

The second nozzle 937B may have an injection diameter (not shown) that minimizes backsplash during the remediating component injection process. As can be appreciated, the inner chamber 220 may have a volume that varies depending on the size of the cartridge 101, however, in the illustrated example, the volume may be approximately 5 mL and due to the processing speeds at which the cartridges 101 are assembled, injecting the remediating component at a high speed may result in backsplash. Since it may be desirable to limit the amount of backsplash, such as limiting the amount of remediating component that ends up in the outer chamber 221, the second nozzle 937B may have an injection diameter of approximately 1 to 3 millimeters. This injection diameter may be optimized to balance injection speed requirements with splash control, allowing for efficient filling while maintaining precise containment of the remediating component within the inner chamber 220. In some embodiments, the injection diameter may be further refined based on the viscosity of the specific remediating component being injected, with lower viscosity components potentially requiring smaller injection diameters to achieve comparable splash reduction. The injection diameter may also be coordinated with injection pressure and flow rate parameters to ensure that the remediating component is delivered in a controlled manner that minimizes turbulence and associated splashing during the high-speed assembly process.

In some embodiments, the filler assembly 934 may be configured to process multiple cartridges 101 simultaneously to increase throughput and production efficiency. The filler assembly 934 may include multiple first nozzles 937A and multiple second nozzles 937B arranged in parallel configurations along the cartridge chute 936, allowing for concurrent purging and filling operations on multiple cartridges 101. For example, the filler assembly 934 may include two, three, or more sets of nozzle pairs, where each set comprises a first nozzle 937A for inert gas purging and a second nozzle 937B for remediating component injection. The cartridge chute 936 may be configured with multiple parallel pathways or wider dimensions to accommodate the simultaneous processing of multiple cartridges 101, with appropriate spacing between the nozzle sets to ensure proper alignment with the inner chambers 220 of the respective cartridges 101. This parallel processing configuration may allow the assembly system 102 to maintain consistent timing intervals between purging and filling operations for each cartridge 101 while increasing the overall production rate. The multiple nozzle arrangement may be coordinated through the process controller 1355 to ensure synchronized operation, where all first nozzles 937A may activate simultaneously to purge multiple cartridges 101, followed by coordinated activation of all second nozzles 937B to inject remediating components into the purged cartridges 101, thereby maintaining the oxygen-free environment and processing quality across all cartridges 101 being processed concurrently.

Once a cartridge 101 is filled with the remediating component, the cartridge chute 936 may advance the cartridge 101 to position it within the capping assembly 935 for the sealing operation. In the illustrated example, this advancement may involve progressing the cartridge 101 over one cartridge width to the next position within the cartridge chute 936, effectively moving the filled cartridge from the filling station to the capping station. This positioning may place the open cartridge 101A directly beneath the tamper 938 and may situate the cap 214 in an engageable position relative to the sealing element 940, thereby enabling the sealing element 940 to properly contact and manipulate the cap 214 during the capping operation. The cartridge chute 936 may facilitate this progression through various mechanisms, such as pneumatic propulsion through the assist jet slots 833, mechanical indexing systems, or gravity-assisted movement along the chute pathway. The precise positioning achieved through this advancement may ensure proper alignment between the cartridge components and the capping assembly elements, thereby enabling efficient and reliable sealing of the cartridge 101 to form the sealed cartridge 101B.

As the filled cartridge progresses from the filling station to the capping station, the cap guide 1047 may guide the cap 214 of the open cartridge 101A into the engageable position with the sealing element 940. The cap guide 1047 may be configured with a contoured pathway that maintains the cap 214 in a predetermined orientation as the cartridge 101 advances through the cartridge chute 936. The sealing element 940 may be positioned at the end of the cap guide 1047 such that when the cartridge 101 progresses from the filling station to the capping station, the cap 214 of the filled, open cartridge 101A is positioned directly above the sealing element 940. This alignment may ensure that the sealing element 940 can efficiently engage with the cap 214 without requiring additional positioning adjustments, thereby facilitating a smooth transition from the filling operation to the capping operation. The cap guide 1047 may include graduated surfaces or tapered sections that progressively direct the cap 214 into the proper angular and spatial relationship with the sealing element 940, ensuring consistent cap placement across different cartridge configurations and processing speeds.

Figure 15:
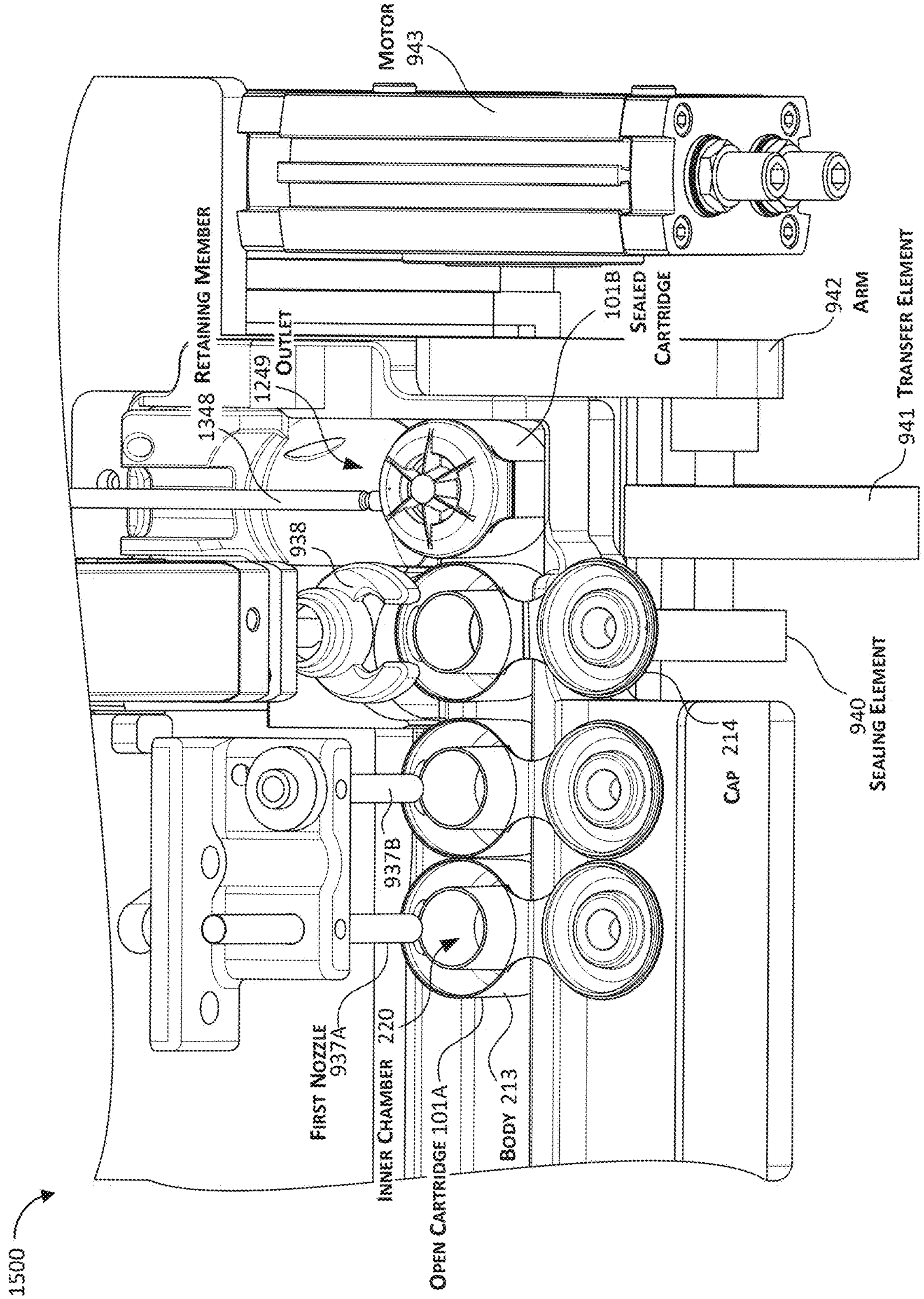
Figure 16:
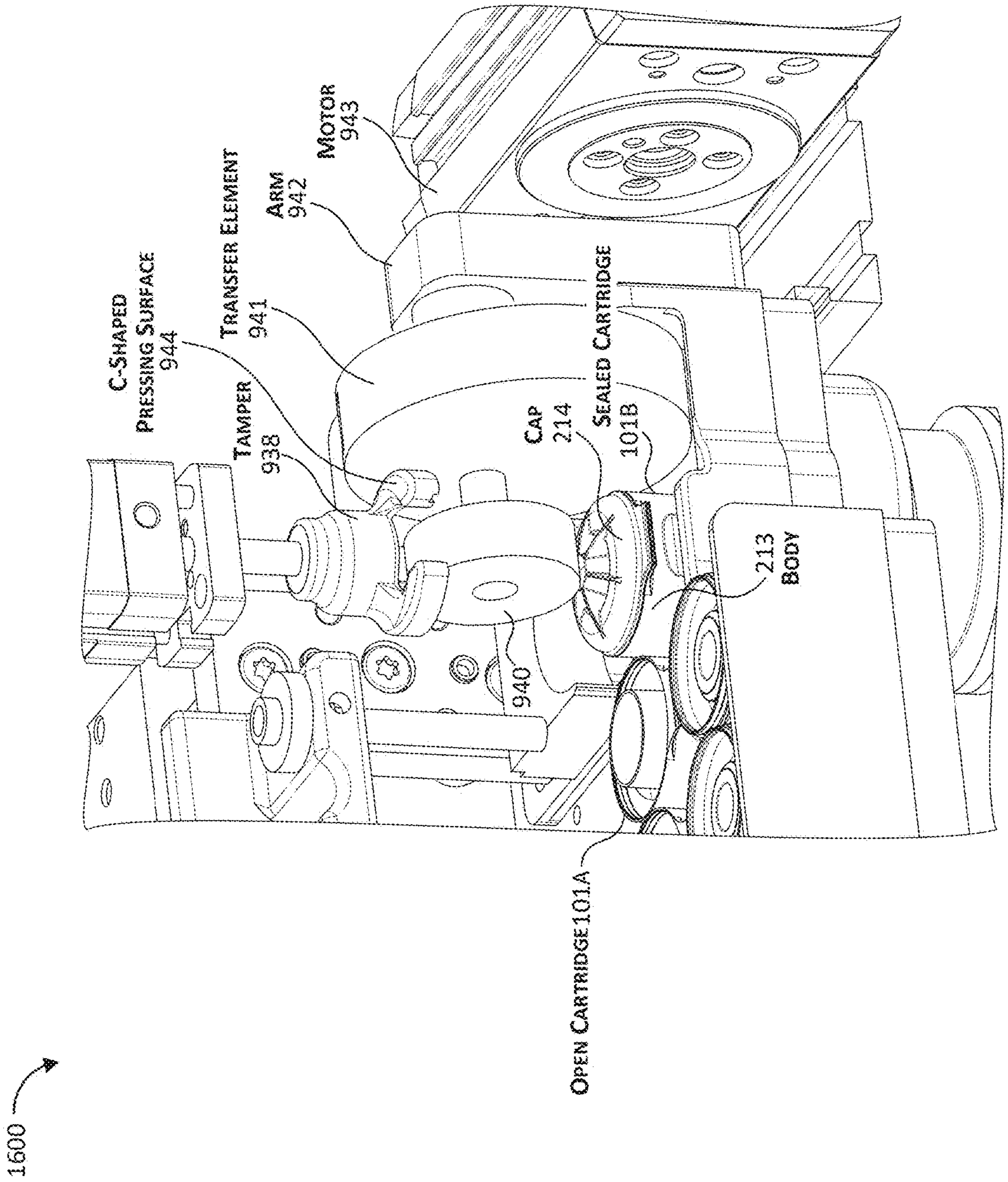

In the illustrated example, the sealing element 940 may be or include a roller attached to the arm 942. The arm 942 may rotate about a rotation axis when driven by the motor 943, providing controlled movement for the sealing operation. When rotating, the sealing element 940 may engage with the cap 214 and push the cap 214 upward and onto the body 213 to form a sealed connection. FIG. 15 illustrates the sealing element 940 engaging with the cap 214 when the cartridge 101 is in a fully open configuration, with the cap 214 positioned away from the body 213, and FIG. 16 illustrates how the sealing element 940 rotates upward and positions the cap 214 onto the body 213, demonstrating the transition from the open cartridge 101A to the sealed cartridge 101B. The roller configuration of the sealing element 940 may provide smooth contact with the cap 214 during the sealing process, reducing friction and potential damage to the cartridge components while ensuring consistent application of sealing force across different cartridge sizes and materials.

In some embodiments, the sealing element 940 may be configured with an elongated roller design that extends along a greater length of the cartridge chute 936 to accommodate simultaneous sealing of multiple cartridges 101. The elongated sealing element 940 may span a distance sufficient to engage with two, three, or more cartridges 101 concurrently, allowing for parallel capping operations that increase the throughput of the assembly system 102. The extended length of the sealing element 940 may be coordinated with the spacing of cartridges 101 within the cartridge chute 936, ensuring that as the arm 942 rotates about its axis, the elongated roller contacts multiple caps 214 simultaneously and applies consistent sealing force across all engaged cartridges 101. This multi-cartridge sealing capability may be particularly beneficial in high-volume production environments where processing speed is a priority, as it allows the capping assembly 935 to seal several cartridges 101 in a single operational cycle rather than requiring individual sealing operations for each cartridge 101. The elongated sealing element 940 may maintain uniform pressure distribution along its length through appropriate roller design and mounting configurations, ensuring that each cartridge 101 receives adequate sealing force regardless of its position along the roller's contact surface.

Figure 17:
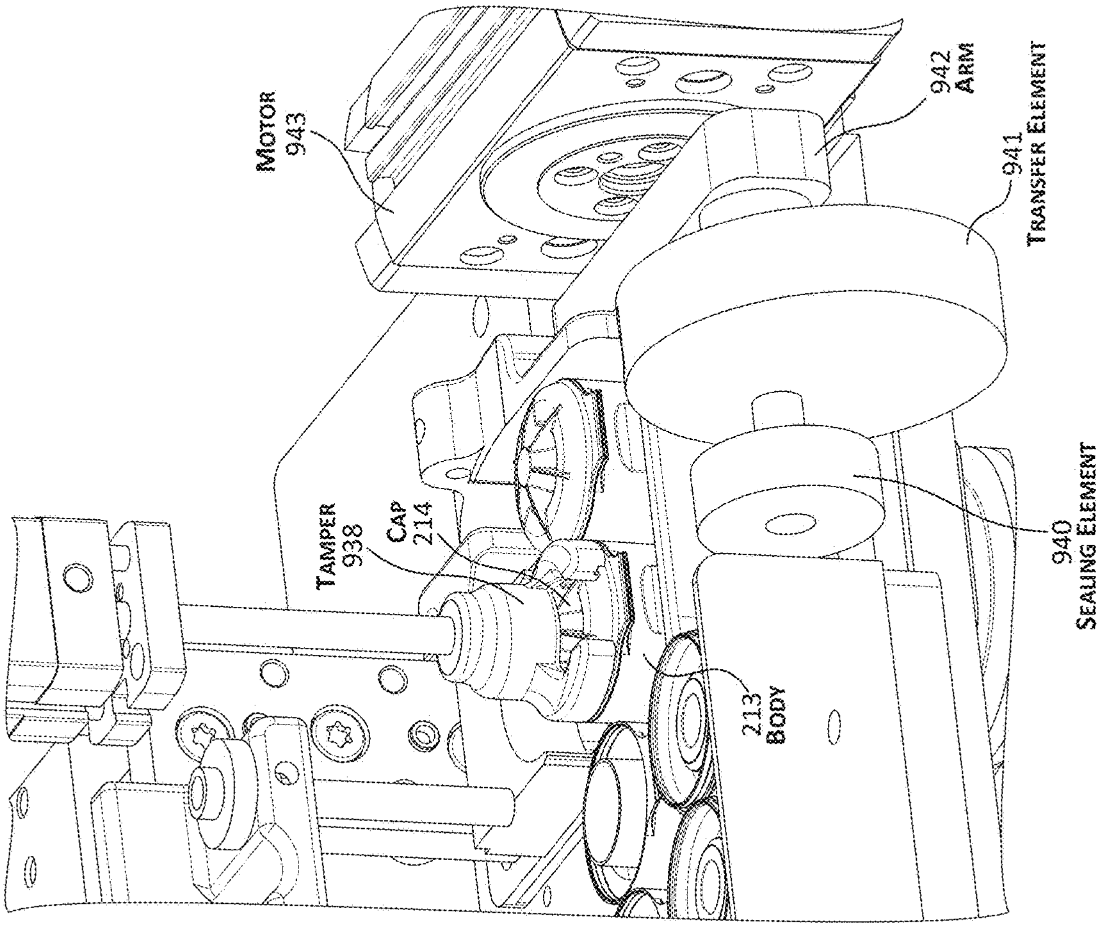

As shown in FIG. 17, once the sealing element 940 positions the cap 214 onto the body 213, the tamper 938 may extend downward and apply pressure to the cap 214, thereby sealing the cartridge 101. The tamper 938 may be driven by the top press cylinder 939, which upon actuation causes the tamper 938 to apply controlled downward force to the cap

214, ensuring proper engagement between the cap 214 and the body 213 to form a secure seal. The tamper 938 may include a C-shaped pressing surface 944 that accommodates the simultaneous retraction of the sealing element 940 upon application of the tamper 938. This C-shaped configuration allows the sealing element 940 to freely retract once the tamper 938 makes contact with the cap 214, preventing interference between the two components during the sealing operation. The coordinated movement between the tamper 938 and the sealing element 940 may ensure that the cap 214 remains properly positioned while the tamper 938 applies the necessary sealing force. In some embodiments, the timing of the tamper 938 extension and the sealing element 940 retraction may be synchronized through a process controller 1355 to optimize the sealing process and maintain consistent cartridge quality across different production speeds and cartridge configurations.

The C-shaped pressing surface 944 may facilitate efficient sealing by applying targeted pressure along a portion of the perimeter of the cap 214, specifically where the cap 214 contacts the top end of the outer wall 218 of the cartridge body 213. During the sealing operation, the cap 214 may form a seal by engaging with the outer wall 218 through corresponding sealing surfaces on both components. The C-shaped configuration of the pressing surface 944 may be designed to distribute pressure along a sealing interface between the cap 214 and the body 213, ensuring that the cap 214 is pressed firmly into contact with the outer wall 218 to create a secure, leak-resistant seal. This targeted pressure application may help compress any sealing gaskets or deformable materials positioned between the cap 214 and the outer wall 218, while the curved geometry of the C-shaped surface 944 may conform to the cylindrical profile of the cartridge components. The partial perimeter coverage provided by the C-shaped design may allow for uniform pressure distribution around the sealing interface while maintaining the clearance necessary for the sealing element 940 to retract without interference, thereby optimizing both sealing effectiveness and operational efficiency during the capping process.

In embodiments where multiple cartridges 101 are processed simultaneously, the capping assembly 935 may be configured with multiple tampers 938 or a single elongated tamper 938 to accommodate concurrent sealing operations. When multiple tampers 938 are employed, each tamper 938 may be individually actuated by separate top press cylinders 939, allowing for independent control of sealing pressure and timing for each cartridge 101 being processed. This configuration may provide flexibility in accommodating variations in cartridge dimensions or sealing requirements across different cartridges 101 within the same processing cycle. In other cases, however, a single top press cylinder 939 may actuate the multiple tampers 938 in tandem, thereby providing an efficient and uniform application of the tampers 938.

Alternatively, a single elongated tamper 938 may be utilized, extending along the length of the cartridge chute 936 to simultaneously contact multiple caps 214. The elongated tamper 938 may be driven by one or more top press cylinders 939 positioned along its length to ensure uniform pressure distribution across all cartridges 101 being sealed. The elongated tamper 938 may include multiple C-shaped pressing surfaces 944 spaced at intervals corresponding to the cartridge spacing within the cartridge chute 936, with each pressing surface 944 configured to engage with a respective cap 214. This single elongated tamper design may simplify the mechanical complexity of the capping assembly 935 while maintaining consistent sealing performance across multiple cartridges 101, and may be coordinated with the elongated sealing element 940 to ensure proper timing and clearance during the concurrent sealing operations.

In alternative embodiments, various other sealing mechanisms may be employed to secure the cap 214 to the body 213 of the cartridge 101. For example, the capping assembly 935 may utilize a press-fit mechanism where a pneumatic or hydraulic actuator applies direct downward pressure to seat the cap 214 onto the body 213 without the need for a separate tamper component. In some cases, the capping assembly 935 may incorporate adhesive application systems that dispense a food-grade adhesive or sealant to the interface between the cap 214 and body 213 prior to mechanical compression. In other embodiments, the sealing mechanism may employ snap-fit connections, where mechanical features on the cap 214 and body 213 engage through controlled compression forces applied by linear actuators or cam-driven mechanisms. The sealing element 940 may alternatively include a flat pressing plate, a contoured pressing head designed to match the specific geometry of the cap 214, or multiple pressing elements that apply distributed force across the cap surface to ensure uniform sealing pressure and prevent deformation of the cartridge components during the sealing process.

As illustrated in FIG. 16, when the sealing element 940 rotates upward to position the cap 214 onto the body 213, the transfer element 941 may also rotate simultaneously. In the illustrated examples, the sealing element 940 and the transfer element 941 may both be attached to the same arm 942, meaning that rotation of the arm 942 causes both the sealing element 940 and the transfer element 941 to rotate concurrently during the capping operation. This coordinated movement may allow the transfer element 941 to be positioned for subsequent cartridge handling operations while the sealing element 940 completes the cap positioning process. Although the illustrated example shows the sealing element 940 and the transfer element 941 as attached to the same arm 942, in other embodiments, they may be separately rotatable, such as being attached to separate arms 942 that operate independently or in coordinated sequences. This independent operation may provide greater flexibility in timing and positioning control for different cartridge configurations or processing requirements. In yet other embodiments, instead of being two separate rollers, the sealing element 940 and the transfer element 941 may be part of the same roller assembly. In such cases, the roller may be elongated along its axial length to perform both the sealing process and the transfer process, with different sections of the roller surface configured to engage with cartridge components during different stages of the assembly operation.

As the transfer element 941 rotates upward with the axial rotation of the arm 942, the transfer element 941 may engage with and push the sealed cartridge 101B positioned in the cartridge chute 936 directly in front of it through the outlet 1249. This pushing action may provide controlled advancement of the sealed cartridge 101B from the capping station to the downstream transport system 106, ensuring smooth transition between processing stages. As shown in FIG. 14, in some embodiments, the filler-capper assembly 705 may include a retaining member 1348 which prevents the sealed cartridge 101B from falling into the outlet 1249 prior to engagement with the transfer element 941. The retaining member 1348 may be positioned to create a staging position that holds the sealed cartridge 101B in place until the transfer element 941 is properly positioned to provide controlled movement through the outlet 1249. This retaining mechanism may allow for regulation and metering of the sealed cartridges 101B to downstream processes, such as the introduction system 107, by ensuring that cartridges are released only when the transfer element 941 is in the appropriate position to guide them through the outlet 1249.

The coordinated operation between the retaining member 1348 and the transfer element 941 may be achieved through synchronized control by the process controller 1355. The retaining member 1348 may be controlled by a piston that is operably coupled to the process controller 1355, which also controls the motor 943 that drives the arm 942 and controls rotation of the transfer element 941. This synchronized control enables the retaining member 1348 to retract precisely when the transfer element 941 engages with the cartridge 101, ensuring that the cartridge 101 is released from its staging position at the exact moment the transfer element 941 is positioned to guide it through the outlet 1249. The timing coordination between these components prevents uncontrolled cartridge movement and maintains proper synchronization with downstream equipment, thereby optimizing the overall efficiency of the assembly and introduction system 100.

Figure 18B:
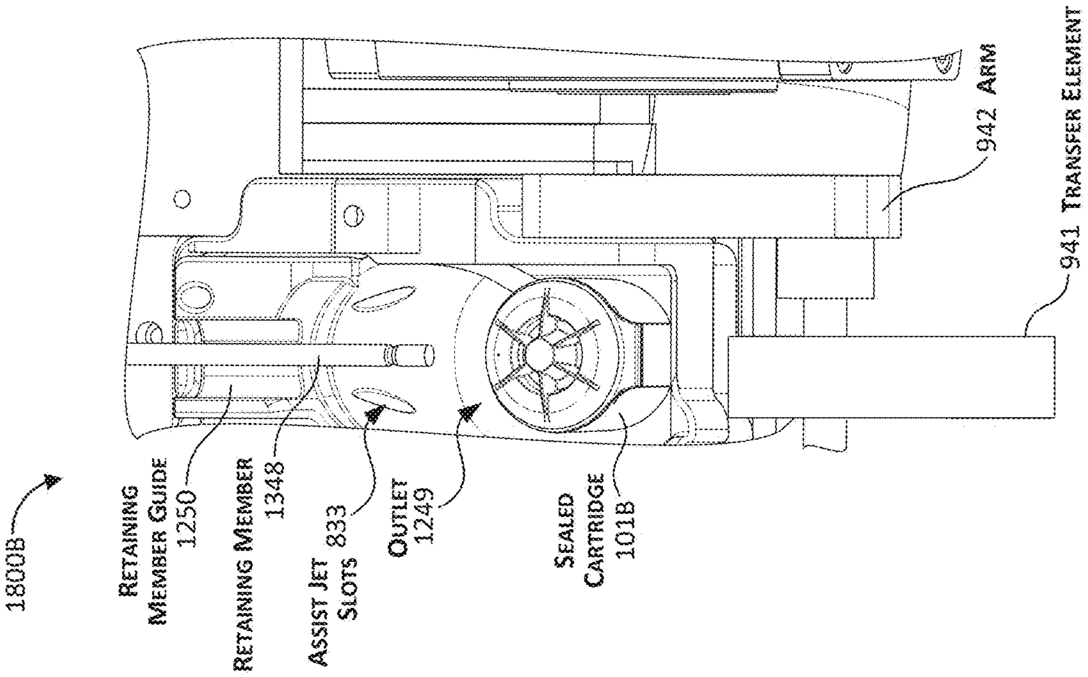
FIGS. 18A and 18B illustrate perspectives of a retaining member, according to an embodiment herein.
Figure 18A:
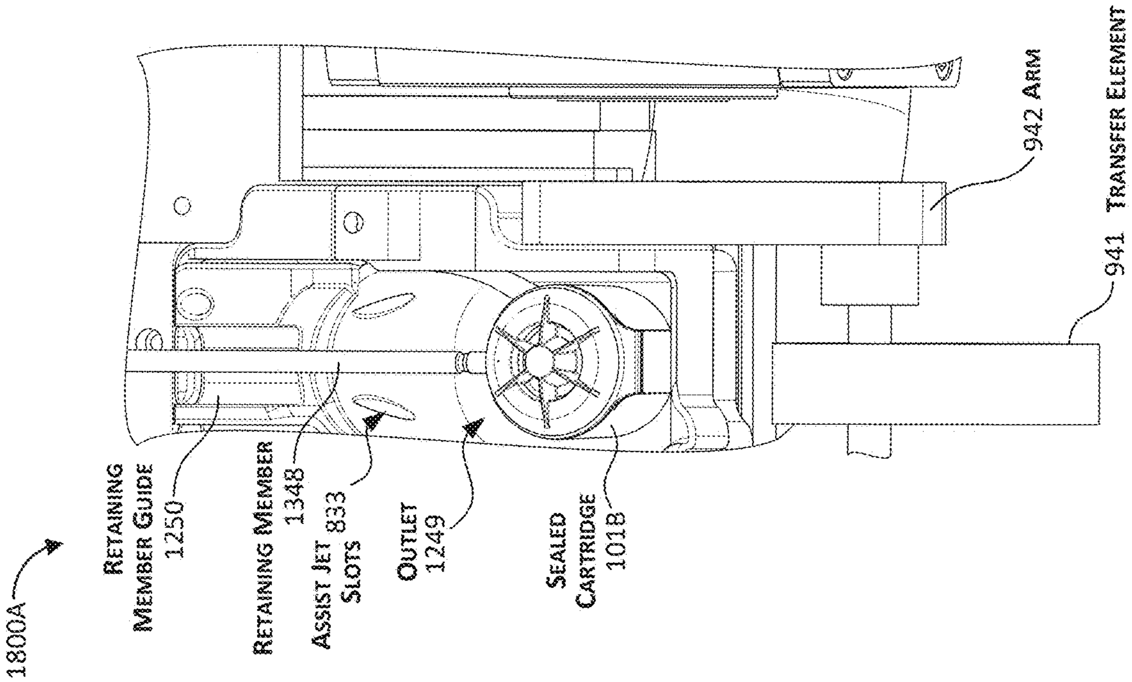
Figure 19:
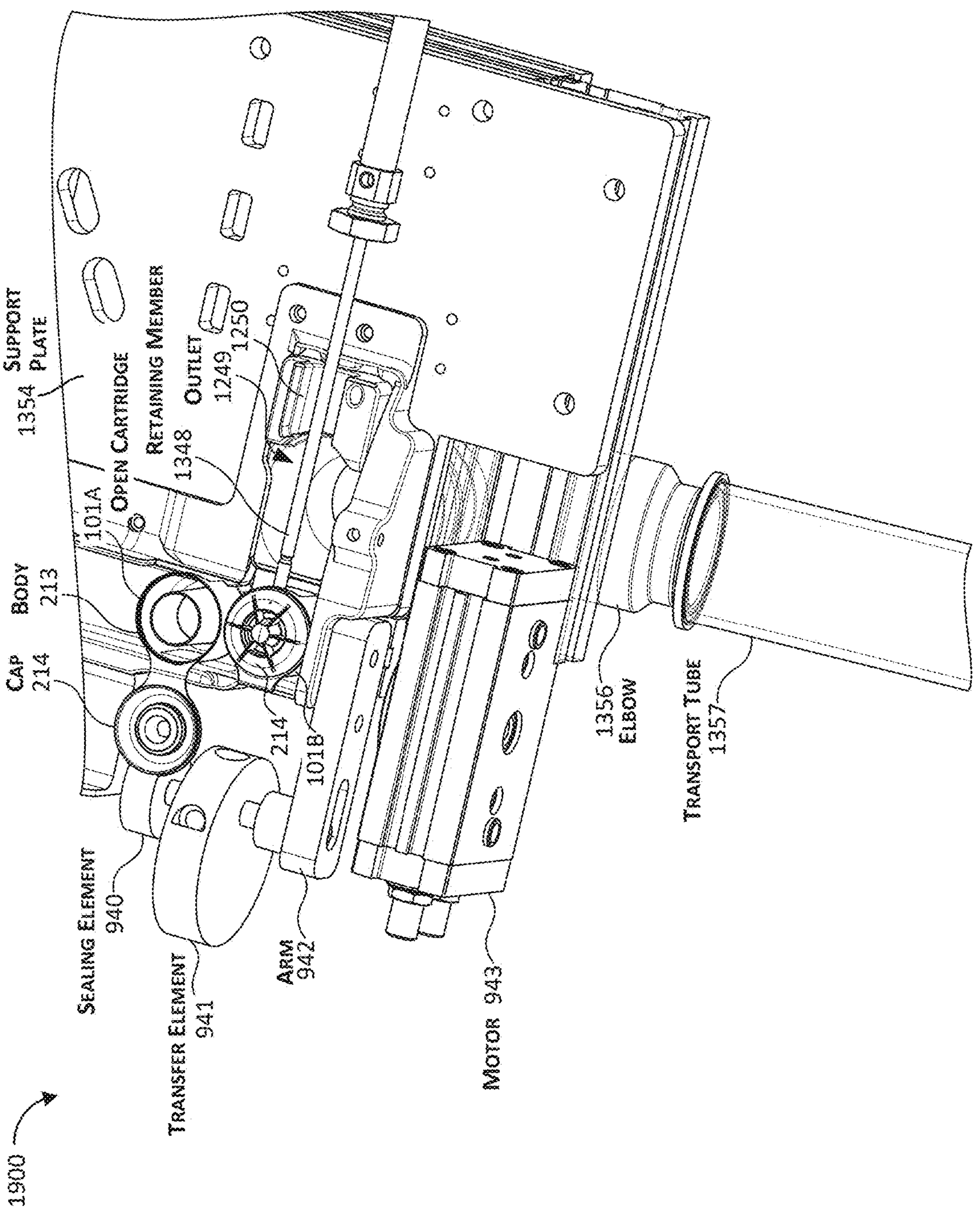
FIG. 19-20 illustrates various perspectives of an assembly system, according to an embodiment herein.

In some embodiments, the cartridge chute 936 may include a retaining member guide 1250 configured to support and prevent the retaining member 1348 from shifting during processing. As illustrated in FIGS. 18A-B, the retaining member guide 1250 may provide structural stability and precise positioning control for the retaining member 1348 throughout the cartridge transfer operation. The retaining member guide 1250 may include guide rails, channels, or other directional features that constrain the movement of the retaining member 1348 to ensure consistent positioning relative to the cartridge chute 936 and outlet 1249. Perspective 1800A of FIG. 18A illustrates the retaining member 1348 holding the sealed cartridge 101B in position until the transfer element 941 is activated. As shown in FIG. 19, the retaining member guide 1250 may maintain the retaining member 1348 in a fixed position that creates an effective barrier, preventing premature release of the sealed cartridge 101B into the outlet 1249, and allowing for precise timing control of cartridge release.

Perspective 1800B of FIG. 18B illustrates the retaining member 1348 retracting as the transfer element 941 is axially rotated towards the sealed cartridge 101B. During this retraction phase, the retaining member guide 1250 may guide the controlled withdrawal of the retaining member 1348, ensuring smooth and consistent movement that does not interfere with the transfer element 941 or the sealed cartridge 101B. Once the retaining member 1348 is retracted, the transfer element 941 can move the sealed cartridge 101B towards the outlet 1249, which upon reaching the sealed cartridge 101B may fall into due to gravity. The retaining member guide 1250 may facilitate this coordinated sequence by providing stable support during the retraction process and ensuring that the retaining member 1348 clears the cartridge pathway completely, allowing for unobstructed movement of the sealed cartridge 101B through the outlet 1249.

Figure 20:
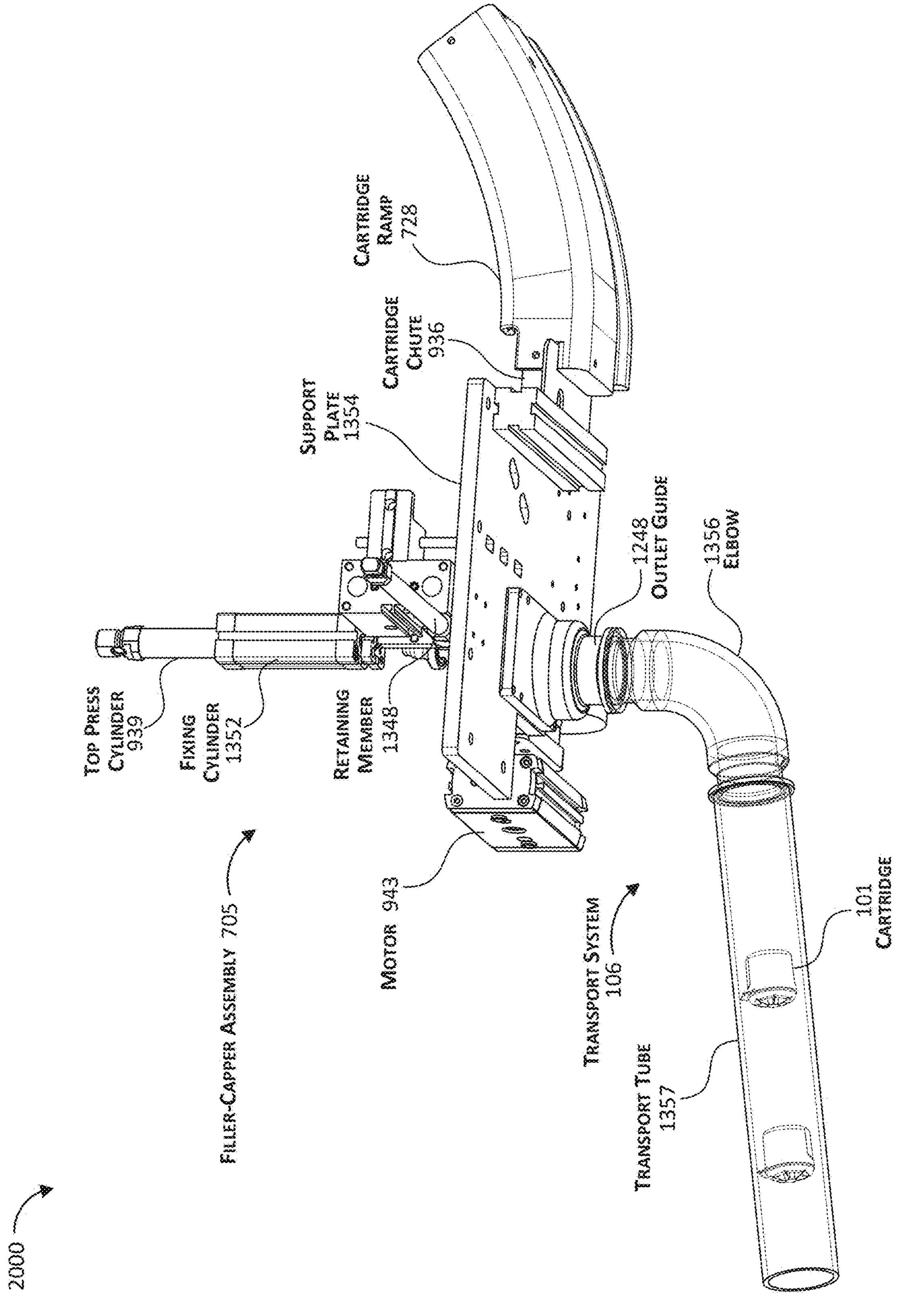

As shown by FIG. 20, the outlet 1249 may directly feed the sealed cartridges 101B into the transport system 106. The outlet 1249 may be part of or in fluid communication with an outlet guide 1248 which provides a transition between the filler-capper assembly 705 and the transport system 106. For example, the outlet guide 1248 may serve as an inlet into the transport system 106 and be fluidly connected to the elbow 1356 and the transport tube 1357 of the transport system 106. This configuration allows for seamless transfer of sealed cartridges 101B from the assembly operations to the transport operations without interruption or potential for cartridge damage during the transition between systems.

It should be appreciated that while the illustrated example shows the transport system 106 being directly fed from the filler-capper assembly 105, in some cases, the sealed cartridges 101B from the filler-capper assembly 105 may be collected into a storage system and fed into the transport system 106 at a future time, such as to align with production scheduling of the beverage packaging line. This configuration provides operational flexibility by allowing the assembly system 102 to operate independently of the packaging line schedule, enabling batch processing and inventory management of sealed cartridges 101B until they are needed for introduction into beverage containers 109.

Figure 21:
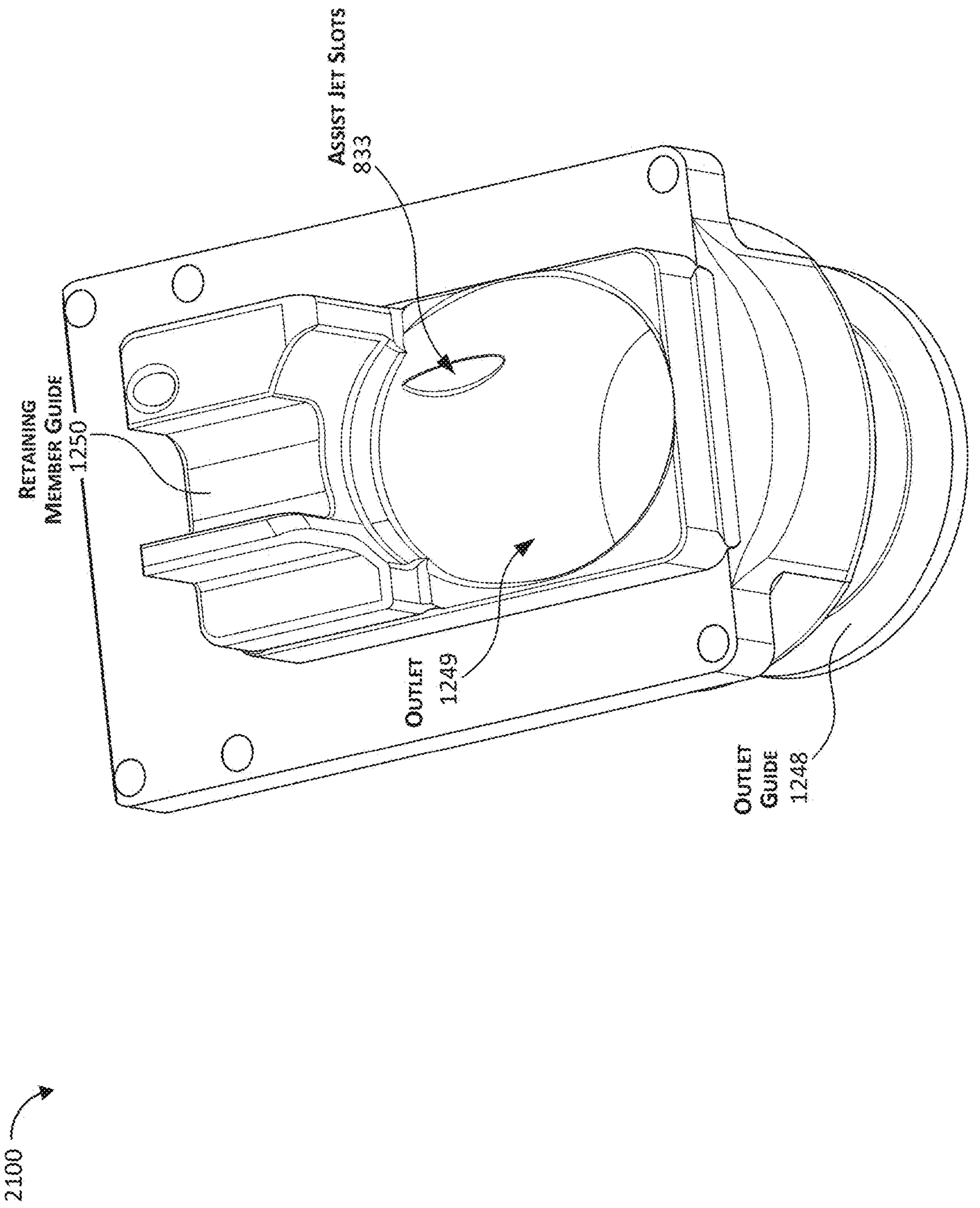
FIG. 21 illustrates a perspective of an outlet guide, according to an embodiment herein.
Figure 22:
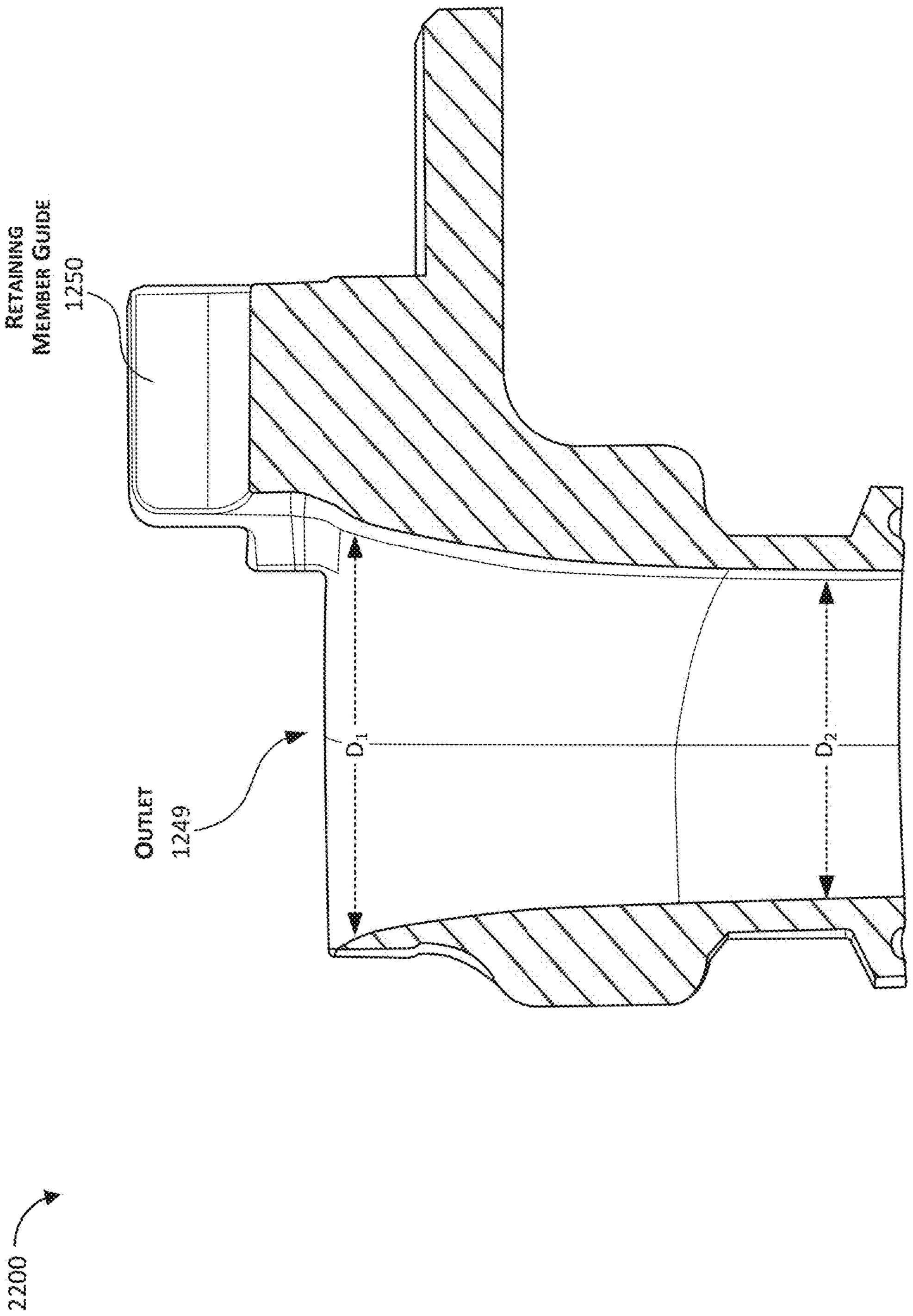
FIG. 22 illustrates a cross-sectional perspective an outlet guide, according to an embodiment herein.

In some embodiments, the outlet 1249 and/or the outlet guide 1248 may be configured to orient or maintain orientation of the sealed cartridge 101B upon the transfer operation. With reference to FIGS. 21-22, the outlet 1249 may be an opening through the outlet guide 1248 through which the sealed cartridges 101B are pushed by the transfer element 941. When the transfer element 941 pushes the sealed cartridges 101B into the outlet 1249, the outlet 1249 may be placed and configured such that the sealed cartridge 101B rotates away from the sealing element 940. In other words, when the sealed cartridge 101B begins to fall into the outlet 1249, the sealed cartridge 101B may rotate such that the cap 214 orients towards the retaining member guide 1250. The outlet 1249 may have an inlet diameter, D1, that is sized to allow the sealed cartridge 101B to continue rotation until the cap 214 is directed downwards into the outlet 1249. Then to prevent continued rotation of the sealed cartridge 101B, the outlet 1249 may have an outlet diameter, D2, that is smaller and sized approximately 1.1 to 1.3 times the width of the cartridge 101.

In some embodiments, the D1 may be approximately 1.5 to 2.5 times the width of the cartridge 101, allowing sufficient clearance for the sealed cartridge 101B to begin rotation as it enters the outlet 1249. The D2 may be approximately 1.1 to 1.3 times the width of the cartridge 101, providing a more constrained pathway that prevents continued rotation while still allowing smooth passage of the sealed cartridge 101B through the outlet 1249. It should be appreciated that while the illustrated examples show the cartridge's 101 orientation as cap down, in other implementations, the cap 214 may be oriented up, depending on the application.

In various embodiments, the inlet diameter D1 may be in a range from 15 to 150 millimeters, from 20 to 100 millimeters, from 40 to 100 millimeters, from 40 to 80 millimeters, from 40 to 60 millimeters, or from 40 to 50 millimeters, depending on the specific cartridge dimensions and the degree of rotation control desired during the transfer operation. Similarly, the outlet diameter D2 may be in a range from 10 to 120 millimeters, from 25 to 100 millimeters, from 25 to 50 millimeters, or from 30 to 40 millimeters, with the specific dimensions selected to provide appropriate constraint for the sealed cartridge 101B while maintaining smooth passage through the outlet guide 1248. In the illustrated example, D1 may be approximately 40 millimeters and D2 may be approximately 34 millimeters. A ratio between D1 and D2 may be in a range from 1.1 to 1.3, in particular from 1.15 to 1.2. The dimensional relationship between D1 and D2 may vary based on the cartridge geometry and the desired orientation control, ensuring that the sealed cartridge 101B achieves proper positioning for subsequent transport through the transport system 106 In some embodiments, the outlet guide 1248 may include one or more assist jet slots configured to receive an assist jet that provides additional propulsion for the sealed cartridges 101B as they transition into the transport system 106. The assist jet may inject inert gas, such as nitrogen or carbon dioxide, into the outlet guide 1248 to provide a boost to the cartridges 101B during the transfer operation, ensuring consistent movement velocity and preventing potential stalling or jamming at the transition point between the assembly system 102 and the transport system 106. As shown in the figures, the assist jet slots may be positioned on a side wall of the outlet 1249 of the outlet guide 1248 underneath the retaining member guide 1250, such that the inert gas injection provides a lateral or angled force to the sealed cartridge 101B as it enters the transport system 106. This positioning may allow the assist jet to engage with the cartridge 101B after it has been released by the retaining member 1348 and is beginning its descent through the outlet 1249, providing supplemental momentum that facilitates smooth entry into the transport tube 1357. The assist jet may be coordinated with the transfer element 941 operation through the process controller 1355, activating at predetermined intervals to coincide with cartridge release timing and ensuring that each sealed cartridge 101B receives appropriate propulsion assistance during the transition phase between processing systems.

The transport system 106 may serve as a conduit for conveying sealed cartridges 101B from the assembly system 102 to the introduction system 107, providing a controlled pathway that maintains cartridge integrity and orientation during transport. As illustrated by FIGS. 20 and 23-25, the transport system 106 may include an inlet at a first end configured to receive sealed cartridges 101B, either directly from the filler-capper assembly 705 as shown, or alternatively from a storage system where sealed cartridges 101B may be temporarily held until needed for introduction into beverage containers 109. At the opposite end, the transport system 106 may include an outlet configured to dispense the sealed cartridges 101B to the introduction system 2307, thereby completing the transport pathway between the assembly and introduction operations.

In some embodiments, the transport system 106 may include directional transition components at both the inlet and outlet to accommodate spatial constraints and equipment positioning within production facilities. At the inlet, the transport system 106 may include a first elbow 1356 which may be in fluid communication with the outlet guide 1248, providing a smooth transition from the vertical discharge of the filler-capper assembly 705 to the transport pathway. In some embodiments, the outlet guide 1248 may serve as the inlet into the transport system 106. Similarly, at the outlet, the transport system 106 may include a second elbow 2358 that redirects the sealed cartridges 101B from the transport pathway toward the introduction system 2307, which may be the same or similar to the introduction system 107. The first elbow 1356 and second elbow 2358 may each provide a bend of approximately 20 to 90 degrees, allowing the transport system 106 to navigate around existing equipment and accommodate various facility layouts while maintaining smooth cartridge flow. In some embodiments, the cartridges 101 may be introduced into a side of the introduction system 2307 instead of the top-down approach as shown. The elbows may be constructed from food-grade materials such as stainless steel or FDA-approved polymers, with internal diameters sized approximately 1.1 to 1.5 times the cartridge width to provide adequate clearance while preventing excessive cartridge movement within the transport pathway.

The transport system 106 may include one or more straight-line transport tubes, such as transport tube 1357 and transport tube 2357, that connect the inlet and outlet components and provide the primary conveyance pathway for the sealed cartridges 101B. These transport tubes 1357 and 2357 may be sized with internal diameters that accommodate the sealed cartridges 101B while preventing jamming or excessive lateral movement during transport. The transport tubes 1357 and 2357 may have internal diameters that are approximately 1.1 to 1.3 times the width of the cartridge 101, providing sufficient clearance for smooth cartridge movement while limiting excessive rotational movement during transport. In some embodiments the ratio of internal diameter of the transport tubes 1357 and 2375 to the width of the cartridge 101 may be in a range from 1.05 to 1.5, from 1.05 to 1.4, from 1.05 to 1.3, from 1.1 to 1.5, from 1.1 to 1.4, from 1.1 to 1.3, or 1.1 to 1.2. In preferred embodiments, the ratio may be 1.1. This dimensional relationship may ensure that the sealed cartridges 101B maintain a relatively stable orientation as they travel through the transport system 106, preventing unwanted tumbling or spinning that could potentially damage the cartridge components or disrupt the controlled flow through the system.

The transport tubes 1357 and 2357 may feature uniform internal diameters throughout their length, creating consistent transport conditions and eliminating diameter variations that could cause cartridge jamming, speed fluctuations, or orientation changes during conveyance. The uniform diameter design may facilitate predictable cartridge movement patterns and enable accurate timing calculations for downstream operations, while also simplifying manufacturing and maintenance requirements for the transport system 106 components.

The transport tubes may be constructed from materials that provide smooth internal surfaces to minimize friction and facilitate consistent cartridge movement, while also meeting food safety requirements for beverage production environments. In some embodiments, the transport system 106 may include multiple tube segments connected by additional elbows or transition fittings to accommodate complex routing requirements, allowing the system to span considerable distances between the assembly system 102 and introduction system 107 while maintaining reliable cartridge transport performance.

The transport tubes 1357 and 2357 may include assist jet slots 833 positioned at predetermined intervals along their length to facilitate controlled propulsion of the sealed cartridges 101B during transport. The assist jet slots 833 may be configured to receive assist jets that inject inert gas into the transport pathway to provide supplemental momentum to the cartridges 101B as they move through the transport system 106. The spacing of the assist jet slots may be determined based on the length of the transport tubes 1357 and 2357, the desired cartridge velocity, and the specific transport requirements of the production facility. In some embodiments, the assist jet slots may be positioned at intervals ranging from 0.5 to 3 meters along the transport tube length, allowing for consistent propulsion assistance throughout the entire transport pathway while preventing cartridge stalling or excessive acceleration that could cause damage or jamming.

The assist jet slots 833 may be positioned along a top surface of the transport tubes 1357 and 2357 to minimize direct contact between the sealed cartridges 101B and the slot openings during transport. By locating the assist jet slots 833 on the upper portion of the transport tubes, the sealed cartridges 101B may travel along the bottom surface of the tubes 1357/2375 under the influence of gravity, maintaining separation from the slot openings and reducing the likelihood of cartridge components becoming lodged or stuck within the assist jet slots 833. This positioning may allow the inert gas injection to provide effective propulsion force while directing the gas flow downward toward the cartridges 101B, creating a cushioning effect that lifts the cartridges 101 slightly off the tube bottom surface, facilitating smooth movement through the transport pathway. The top-mounted configuration of the assist jet slots 833 may also simplify maintenance and cleaning operations, as the slots 833 remain accessible from above the transport tubes 1357 and 2357 without requiring disassembly of the transport system 106 components.

In some embodiments, the assist jets may be pneumatic jets that inject an inert gas into the transport tubes 1357 and 2357 to provide controlled propulsion for the sealed cartridges 101B. The inert gases may include nitrogen, carbon dioxide, argon, or other chemically stable gases that do not react with the cartridge components or the beverage environment, thereby maintaining the integrity of the sealed cartridges 101B during transport while preventing oxidation or contamination. In alternative embodiments, the assist jets may be mechanical jets that utilize compressed air or other non-reactive gases, electromagnetic jets that employ magnetic fields to propel cartridges containing ferromagnetic components, or vibration-assisted jets that combine pneumatic propulsion with controlled vibratory motion to facilitate cartridge movement through the transport pathway. The assist jets may also include vacuum-assisted systems that create pressure differentials to draw cartridges 101 through specific segments of the transport tubes 1357/2357, or hybrid systems that combine multiple propulsion methods to optimize cartridge velocity and positioning control based on varying transport conditions and facility requirements.

The assist jets may serve multiple functions beyond basic propulsion, including modulation of cartridge transport speed and regulation of the quantity of cartridges 101B delivered to the introduction system 2307. By controlling the timing, duration, and pressure of gas injection through the assist jets, the transport system 106 may adjust the velocity at which sealed cartridges 101B travel through the transport system 106, enabling synchronization with downstream operations and preventing overflow or starvation conditions at the introduction system 2307. The assist jets may operate independently or in coordinated sequences, allowing for precise control over cartridge spacing and delivery timing to match the requirements of the beverage packaging line.

To facilitate this controlled operation, the transport tubes 1357 and 2357 may include one or more slots configured to receive cartridge tube sensors 2360 that monitor cartridge presence and movement within the transport system 106. In some embodiments, the cartridge tube sensors 2360 may be or include pressure sensors that detect pressure variations within specific segments of the transport tubes 1357 and 2357, providing real-time feedback on cartridge density and flow characteristics. These cartridge tube sensors 2360 may be positioned at strategic locations along the transport pathway, such as immediately downstream of assist jet positions, at tube junctions, or near the outlet to the introduction system 2307, enabling comprehensive monitoring of cartridge movement throughout the transport process.

Based on readings, which may be pressure readings, from the cartridge tube sensors 2360, a process controller (not shown) in operable communication with the assist jets may determine the volume or quantity of cartridges 101B within particular segments of the transport system 106 and automatically modulate the assist jets to adjust cartridge transport speed accordingly. For example, if cartridge tube sensors 2360 detect an accumulation of cartridges 101B in a downstream segment near the introduction system 2307, the process controller may reduce the gas flow from upstream assist jets to slow the delivery rate of additional cartridges 101, preventing jamming or overflow conditions. Conversely, if the cartridge tube sensors 2360 indicate low cartridge density in the transport tubes 1357 and 2357, the process controller may increase assist jet activity to accelerate cartridge delivery and maintain consistent supply to the introduction system 2307, ensuring continuous operation without interruption to the beverage packaging process.

In alternative embodiments, the cartridge tube sensors 2360 may be or include different sensing technologies to detect cartridge presence and movement within the transport system 106. For example, the cartridge tube sensors 2360 may include optical sensors, such as photoelectric sensors or infrared sensors, positioned along the transport tubes 1357 and 2357 to detect the passage of individual cartridges 101B through specific segments of the transport pathway. These optical sensors may utilize light beams that are interrupted by passing cartridges 101B, generating discrete detection signals that allow the process controller to count the number of cartridges 101B within defined segments of the transport tubes 1357 and 2357. In some cases, the cartridge tube sensors 2360 may include ultrasonic sensors that emit high-frequency sound waves and detect reflections from cartridge surfaces, providing non-contact detection of cartridge presence and movement. Based on the cartridge count data from the cartridge tube sensors 2360, the process controller may calculate the cartridge density within specific transport tube segments and modulate the assist jets accordingly, increasing gas flow when fewer cartridges are detected to accelerate delivery, or reducing gas flow when higher cartridge concentrations are detected to prevent jamming or excessive accumulation at downstream locations. In yet other embodiments, the cartridge tube sensors 2360 may be or include a combination of sensing technologies, such as including both pressure sensors and optical sensors.

In some embodiments, the transport tubes 1357 and 2357 may include vents (not shown) positioned at spaced intervals along their length to facilitate controlled gas discharge and prevent pressure buildup within the transport pathway. The vents may be strategically located at predetermined intervals, such as every 1 to 5 meters along the tube length, to maintain optimal pressure conditions for cartridge transport while preventing excessive gas accumulation that could impede cartridge movement or create turbulent flow conditions. The vents may be positioned on the top surface of the transport tubes 1357 and 2357, similar to the assist jet slots 833, to minimize interference with the sealed cartridges 101B as they travel along the bottom surface of the tubes under gravitational influence. This top-mounted vent configuration may prevent cartridge components from becoming obstructed by vent openings while allowing excess gas to escape upward and away from the transport pathway. The vents may be sized to provide adequate pressure relief without creating excessive gas loss that could compromise the propulsion effectiveness of the assist jets, and may include adjustable flow control elements or filters to regulate discharge rates and prevent contamination ingress into the transport system 106.

With specific reference to FIGS. 23-37B, the following discussion focuses on the introduction system 2307, according to various embodiments herein. The introduction system 2307 may include a dropping mechanism that is configured to transition between a retaining position and a releasing position. In the releasing position, the dropping mechanism releases a cartridge in synchronization with a beverage packaging line, such that the released cartridge is dispensed into an open beverage container, such as the beverage container 109. Two distinct embodiments of the introduction system 2307 are illustrated and described in the following sections. The first embodiment, shown in FIGS. 23-30, features a rotatable member configuration in which the dropping mechanism includes a rotatable member that rotates about a central axis to transition between the retaining and releasing positions. The second embodiment, shown in FIGS. 31-37B, features a sliding gate configuration in which the dropping mechanism includes a sliding gate that translates linearly or pivots to transition between the retaining and releasing positions. While these two specific embodiments are depicted and respectively described in detail, it should be appreciated that various other configurations and implementations are contemplated herein.

Figure 23:
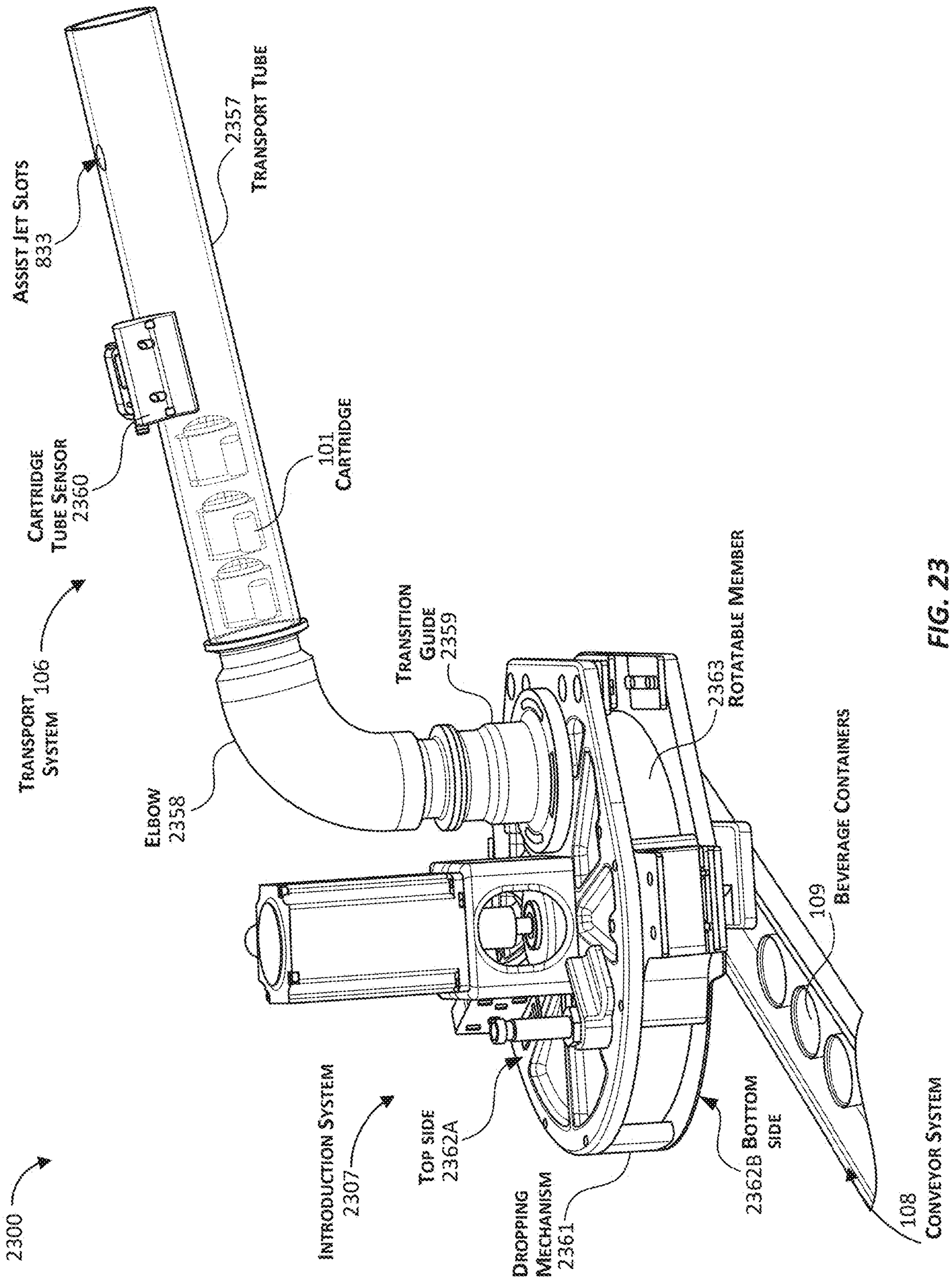
FIG. 23 illustrates a perspective of a transport system and a introduction system, according to an embodiment herein.
Figure 24:
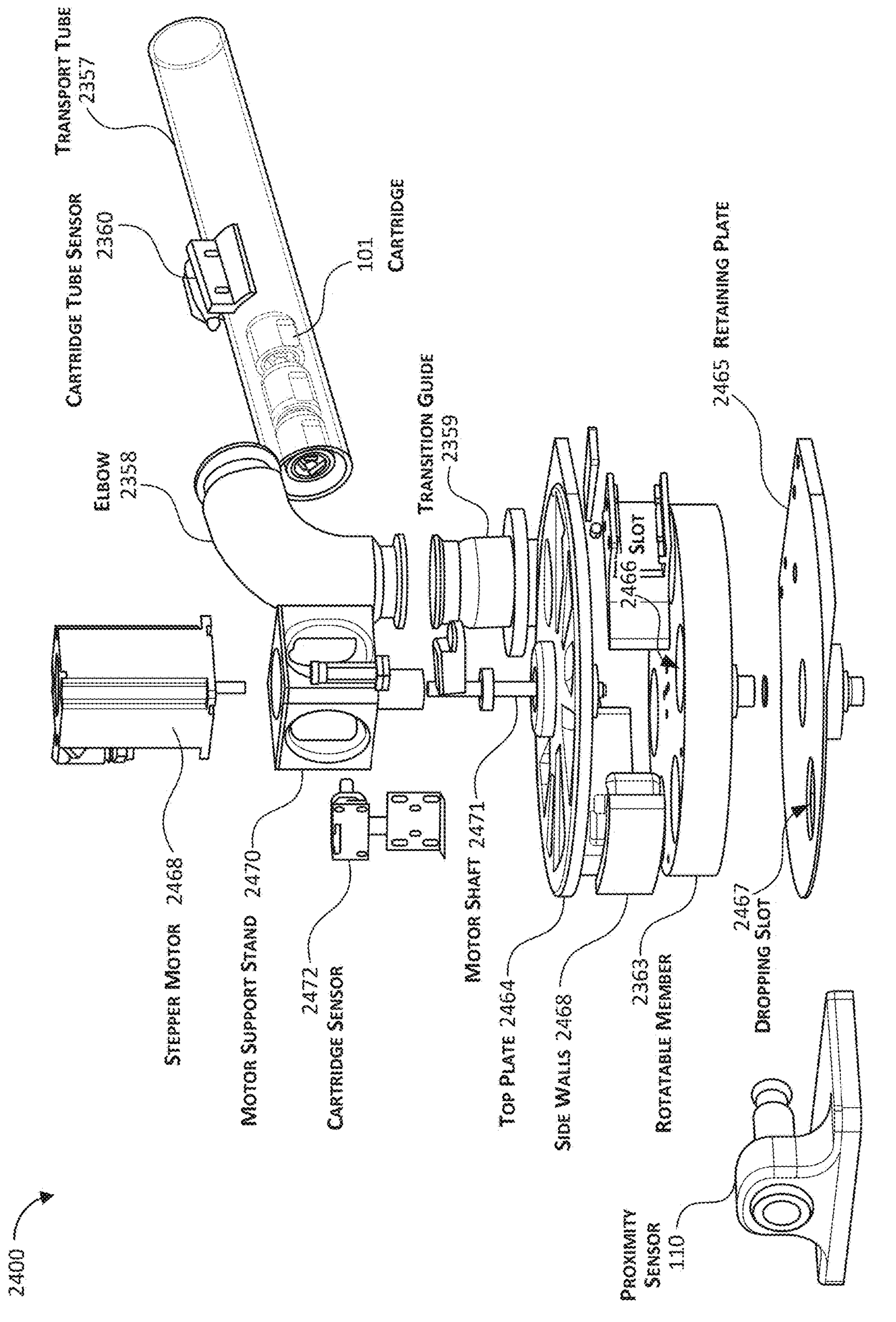
FIG. 24 illustrates an exploded view of an introduction system and its related components, according to an embodiment herein.

As shown in FIGS. 23-24, the transport system 106 may deliver the cartridges 101 to the introduction system 2307. The introduction system 2307 includes a dropping mechanism 2361 that is configured to transition between a retaining position, in which a sealed cartridge 101B is retained, and a releasing position in which the sealed cartridge 101B is released into an underlying beverage container 109, in some cases as it moves along a conveyor system 108. As illustrated, the introduction system 2307 may be positioned directly above a conveyor system 108, such to align a dropping slot 2467 with the beverage containers 109 as they are transported along the conveyor line 108.

In the illustrated embodiment, the dropping mechanism 2361 includes a rotatable member 2363. The rotatable member 2363 may be positioned between a top plate 2464 on a first side 2362A and a retaining plate 2465 on a second, opposing side 2362B. The retaining plate 2465, which may be positioned opposing the top plate 2464, includes the dropping slot 2467 through which the cartridge 101 may be released when the rotatable member 2363 is in the releasing position. As will be expanded on in greater detail below, the rotatable member 2363 may include multiple slots 2466 configured to receive sealed cartridges 101B as they are received from the transport system 106. The rotatable member 2363 may receive cartridges 101 from the transport system 106 via a transition guide 2359, which may serve as an outlet for the transport system 106 and an inlet for the introduction system 2307.

The transition guide 2359 may be configured to direct the sealed cartridges 101B, one at a time, as they are received from the transport system 106 into a respective slot 2466 that aligns with the transition guide 2359 at that particular rotation index of the rotatable member 2363. The transition guide 2359 may align with an opening in the top plate 2464 of the introduction system 2307, which also aligns with a respective slot 2466 of the rotatable member 2363. This alignment ensures that each sealed cartridge 101B is properly positioned for controlled release into the introduction system 2307 during the indexed rotation of the rotatable member 2363.

In some embodiments, the transition guide 2359 may include one or more assist jet slots 833 configured to receive assist jets that provide additional propulsion to facilitate the movement of sealed cartridges 101B from the transport system 106 into the receiving slots 2466 of the rotatable member 2363. These assist jets may inject inert gas at the transition point to ensure reliable cartridge transfer from the transport pathway into the introduction system 2307, particularly when cartridges 101B may experience reduced momentum due to directional changes or transitions between system components. The assist jets positioned at the transition guide 2359 may operate at controlled pressure levels that are coordinated with the overall transport system 106 operation to maintain proper flow dynamics throughout the cartridge conveyance process, as noted above.

In some embodiments, the pressure at which the assist jets activate at the transition guide 2359 may be less than the pressure at which the assist jets activate at the outlet guide 1248, thereby ensuring an adequate pressure differential between the inlet and outlet of the transport system 106. This pressure differential may facilitate consistent cartridge flow direction from the assembly system 102 toward the introduction system 2307, preventing backflow or stagnation conditions that could disrupt the synchronized delivery of cartridges 101B to the beverage packaging line. The controlled pressure variation between different assist jet locations may also allow for fine-tuning of cartridge velocity and spacing as they progress through the transport system 106, enabling precise timing coordination with the indexed rotation of the rotatable member 2363 and the movement of beverage containers 109 along the conveyor line 108.

In some embodiments, the transition guide 2359 may expand in diameter between the transport system 106, such as where it connects with the elbow 2358, and the introduction system 2307, such as where it connects with the top plate 2464. In particular, the transition guide 2359 may transition from a smaller diameter, which may be the same diameter as the elbow 2358, to a larger diameter at its exit point. This diameter expansion may allow for the movement required to drop the cartridge 101 into the slot 2466 of the rotatable member 2363. By providing an increase in diameter at the exit of the transition guide 2359, the sealed cartridges 101B are given sufficient clearance to settle properly into the slots 2466 without jamming or misalignment, while also accommodating any slight variations in cartridge positioning that may occur during transport through the system.

The rotatable member 2363 facilitates controlled dispensing of cartridges 101 from the introduction system 2307 into beverage containers 109. The rotatable member 2363 includes multiple slots 2466 that are configured to receive and temporarily retain cartridges 101 as they are delivered from the transition guide 2359. In various embodiments, these slots 2466 may be equidistantly spaced about the circumference of the rotatable member 2363, creating uniform angular spacing between adjacent slots 2466. For example, if the rotatable member 2363 includes six slots 2466, each slot may be positioned at 60-degree intervals around the circumference, ensuring balanced distribution and smooth operation during rotation.

In some embodiments, the rotatable member 2363 may be configured as a starwheel, which is a disc-shaped component with radially extending slots or pockets arranged around its perimeter. The starwheel configuration may include at least three slots 2466, with each slot 2466 being sized to receive a cartridge 101 from the transition guide 2359. The slots 2466 may be equidistantly spaced about the circumference of the starwheel, creating uniform angular spacing between adjacent slots 2466. For example, if the starwheel includes six slots 2466, each slot may be positioned at 60-degree intervals around the circumference, ensuring balanced distribution and smooth operation during rotation. The starwheel configuration provides reliable cartridge positioning and smooth indexed rotation about the central axis 2574, making it particularly suitable for high-speed packaging operations where precise timing and consistent cartridge handling are required. In other embodiments, the rotatable member 2363 may have a drum configuration, where the slots 2466 are formed as recesses or cavities in the cylindrical surface of a rotating drum. Alternative configurations may include a turret-style rotatable member with vertical slots, or a carousel-type arrangement with horizontal cartridge-receiving chambers positioned around the circumference.

Figure 25:
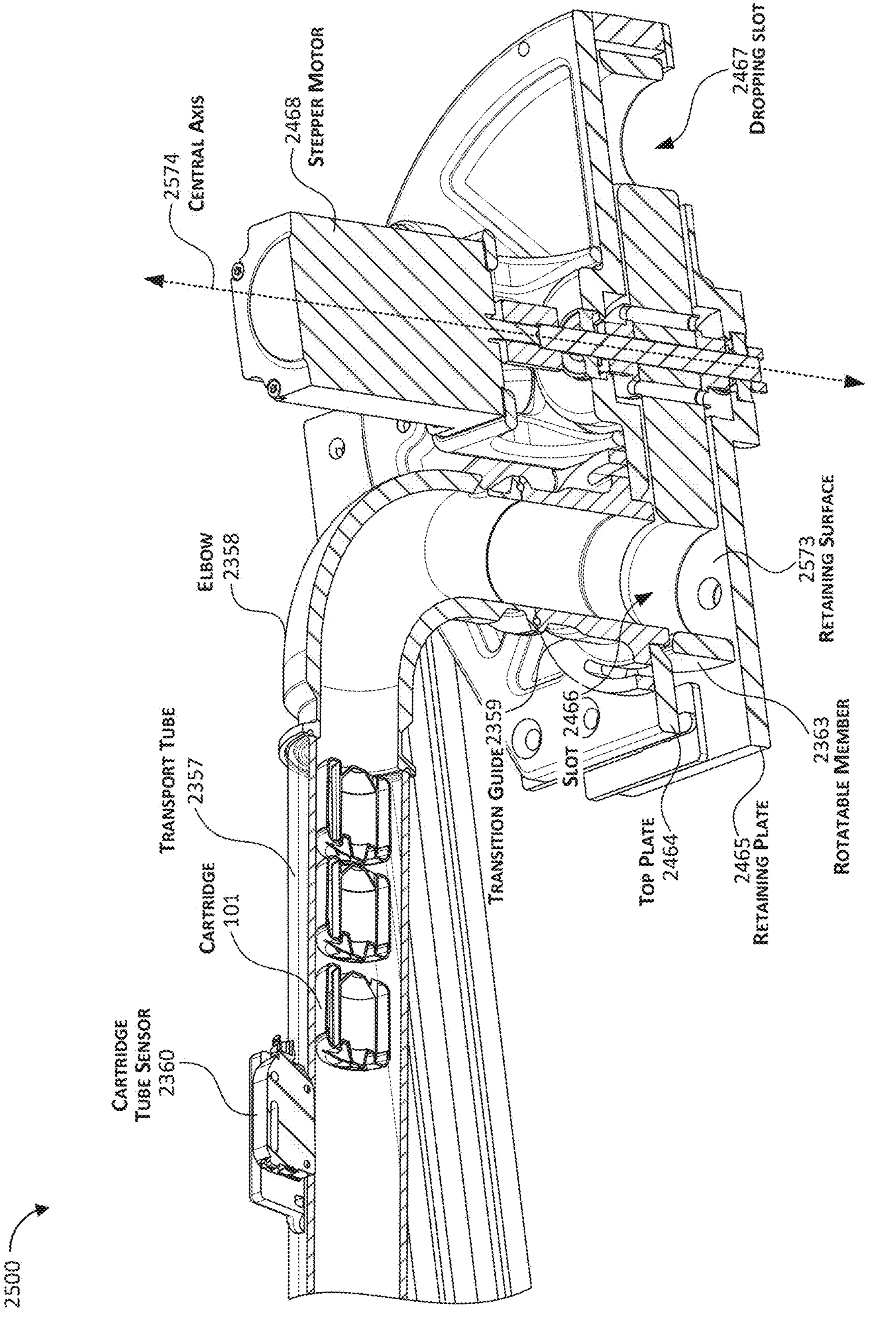
FIG. 25 illustrates a cross-sectional perspective view of the transport and introduction systems, according to an embodiment herein.

The rotatable member 2363 may be configured to rotate about a central axis 2574, as illustrated in FIG. 25. This central axis 2574 provides the rotational reference point for the indexed movement of the rotatable member 2363, allowing each slot 2466 to be positioned relative to the transition guide 2359 for cartridge receipt and the dropping slot 2467 for cartridge release. A stepper motor 2468 drives the rotation of the rotatable member 2363, providing precise angular control and enabling accurate positioning of the slots 2466 during operation. The stepper motor 2468 may be mounted on a motor support stand 2470, which provides stable positioning and alignment for the drive mechanism. A motor shaft 2471 extending from the stepper motor 2468 may align with the central axis 2574, directly coupling the motor's 2468 rotational output to the rotatable member 2363. The motor 2468 may control rotation of the rotatable member 2363 in precise increments, enabling synchronized operation with the movement of beverage containers 109 along the conveyor line 108.

To facilitate precise cartridge dispensing, the stepper motor 2468 may drive the rotatable member 2363 in indexed rotation. The indexed rotation of the rotatable member 2363 may refer to a controlled, incremental rotational movement where the rotatable member 2363 advances in discrete angular steps rather than continuous rotation. During indexed rotation, the rotatable member 2363 may rotate by one index position, which corresponds to the angular distance between adjacent slots 2466, thereby advancing each slot 2466 to the position previously occupied by the next slot 2466 in the rotational sequence. This indexed movement may ensure that as one slot 2466 moves from the cartridge-receiving position to the cartridge-releasing position, the next slot 2466 in sequence simultaneously moves into alignment with the transition guide 2359 to receive the subsequent cartridge 101B. Moreover, the indexed rotation may allow simultaneously receipt of a first cartridge 101 in one slot 2466 and release of a second cartridge 101 from another slot 2466. The indexed rotation may be controlled by a stepper motor 2468 or similar precision actuator that can provide accurate angular positioning, allowing the introduction system 2307 to maintain precise timing coordination with the movement of beverage containers 109 along the conveyor line 108.

The retaining plate 2465 may include a retaining surface 2573 that serves as a barrier to prevent premature release of cartridges 101 from the slots 2466 during indexed rotation of the rotatable member 2363. In other words, the retaining surface 2573 may extend along a portion of the retaining plate 2465 circumference, providing continuous support for cartridges 101 as they progress from the cartridge-receiving position toward the cartridge-releasing position at the dropping slot 2467. The retaining surface 2573 may be positioned to align with the slots 2466 as they rotate about the central axis 2574, creating a physical barrier that retains the cartridges 101 within their respective slots 2466 until the slots 2466 reach the proper angular position for release. This alignment between the retaining surface 2573 and the slots 2466 may be maintained throughout the indexed rotation process, ensuring that cartridges 101 remain securely positioned within the rotatable member 2363 until they are intentionally released through the dropping slot 2467.

In some embodiments, as illustrated in FIG. 25, the retaining surface 2573 may include one or more vents positioned to prevent adverse pressure effects on the retained cartridges 101. These vents may allow air or gas to flow around the cartridges 101 during indexed rotation, preventing the formation of vacuum conditions or pressure differentials that could interfere with proper cartridge positioning or release timing. The vents in the retaining surface 2573 may be particularly beneficial when the introduction system 2307 operates in conjunction with pneumatic assist systems or when the rotational movement of the rotatable member 2363 creates air displacement that could otherwise affect cartridge stability. By providing pressure equalization through the vented retaining surface 2573, the introduction system 2307 may maintain consistent cartridge handling performance across varying operational conditions and rotation speeds.

Figure 26:
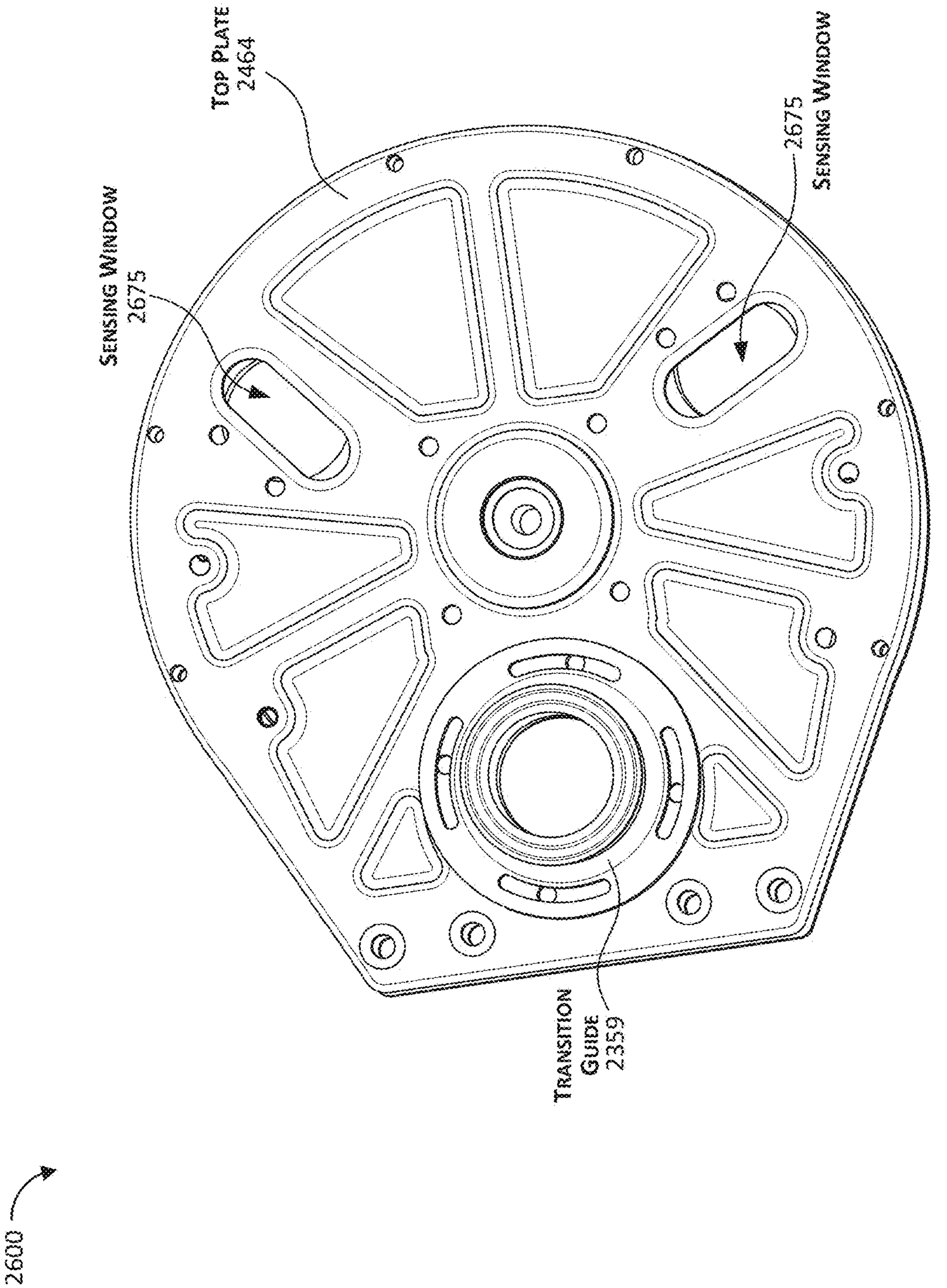
FIGS. 26-27 illustrate various perspectives of a top plate and underlying rotatable member, according to an embodiment herein.
Figure 27:
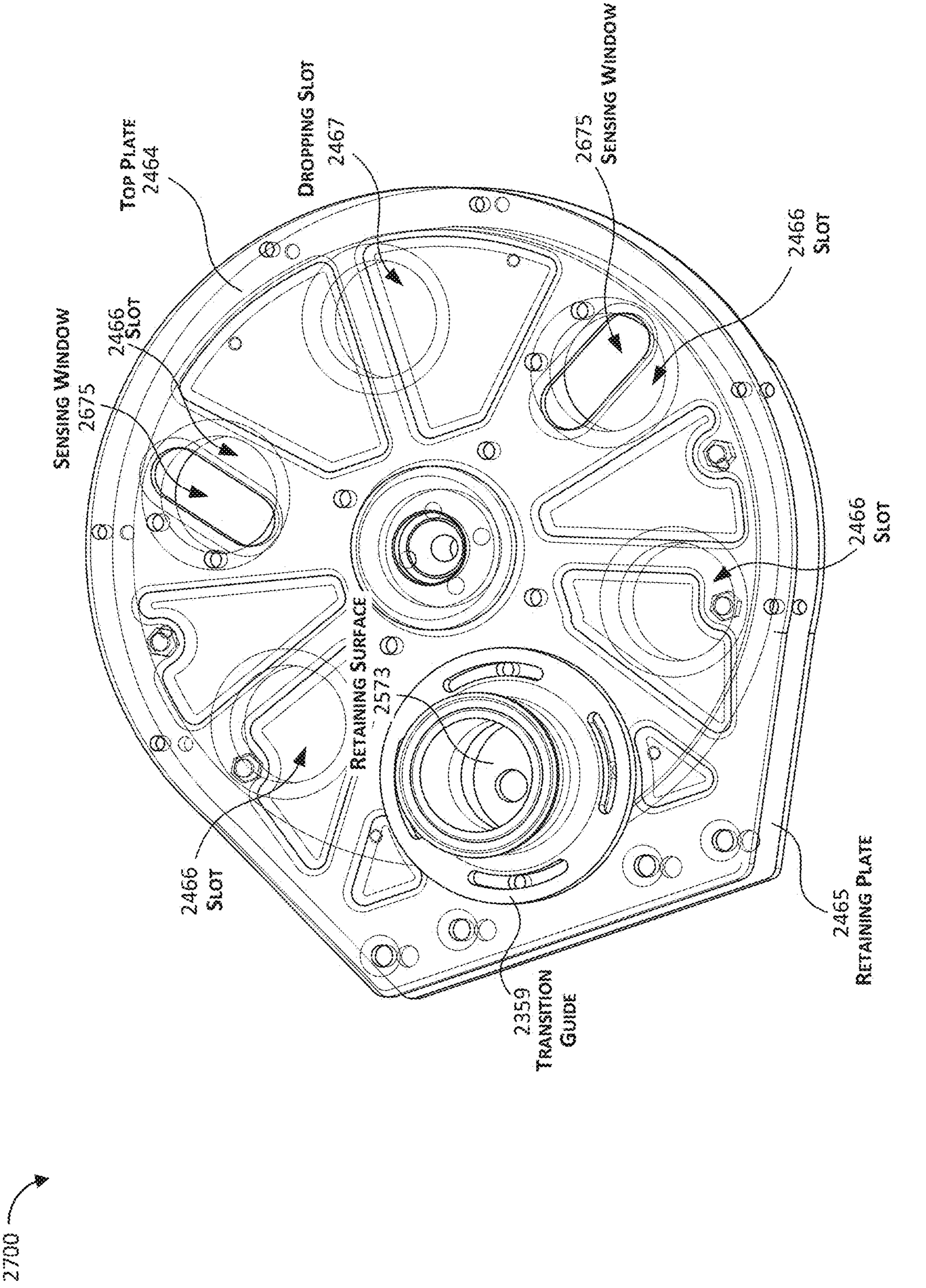

With particular reference to FIGS. 26-27, perspectives 2600 and 2700 of the top plate 2464 are provided, according to various embodiments herein. As shown, the transition guide 2359 may be positioned on a first side of the top plate 2464 with the rotatable member 2363 positioned on an opposing side of the top plate 2464. As noted above, the transition guide 2359 may align with a respective slot 2466 of the rotatable member 2363 via an opening in the top plate 2464. The top plate may also include one or more sensing windows 2675. The sensing windows 2675 may align with a slot 2466 preceding the dropping slot 2467, allowing for detection of cartridges 101 before they reach the release position. In some cases, the sensing windows 2675 may be positioned for both slots 2466 on either side of the dropping slot 2467 to allow rotation of the rotatable member 2363 in either direction, providing operational flexibility for bidirectional rotation during indexed movement.

The sensing windows 2675 may be configured to receive a cartridge sensor 2472. The cartridge sensor 2472 may be an optical sensor or other sensor that is configured to detect the presence of a cartridge 101 in the underlying slot 2466. In other words, the cartridge sensor 2472 may determine whether an underlying slot 2466 loaded with a cartridge 101 and ready for release. Depending on the application, the cartridge sensor 2472 may utilize photoelectric detection, infrared sensing, or ultrasonic detection to determine whether a slot 2466 contains a cartridge 101, providing feedback to the process controller to ensure proper timing and coordination of the dropping mechanism 2361.

Figure 28:
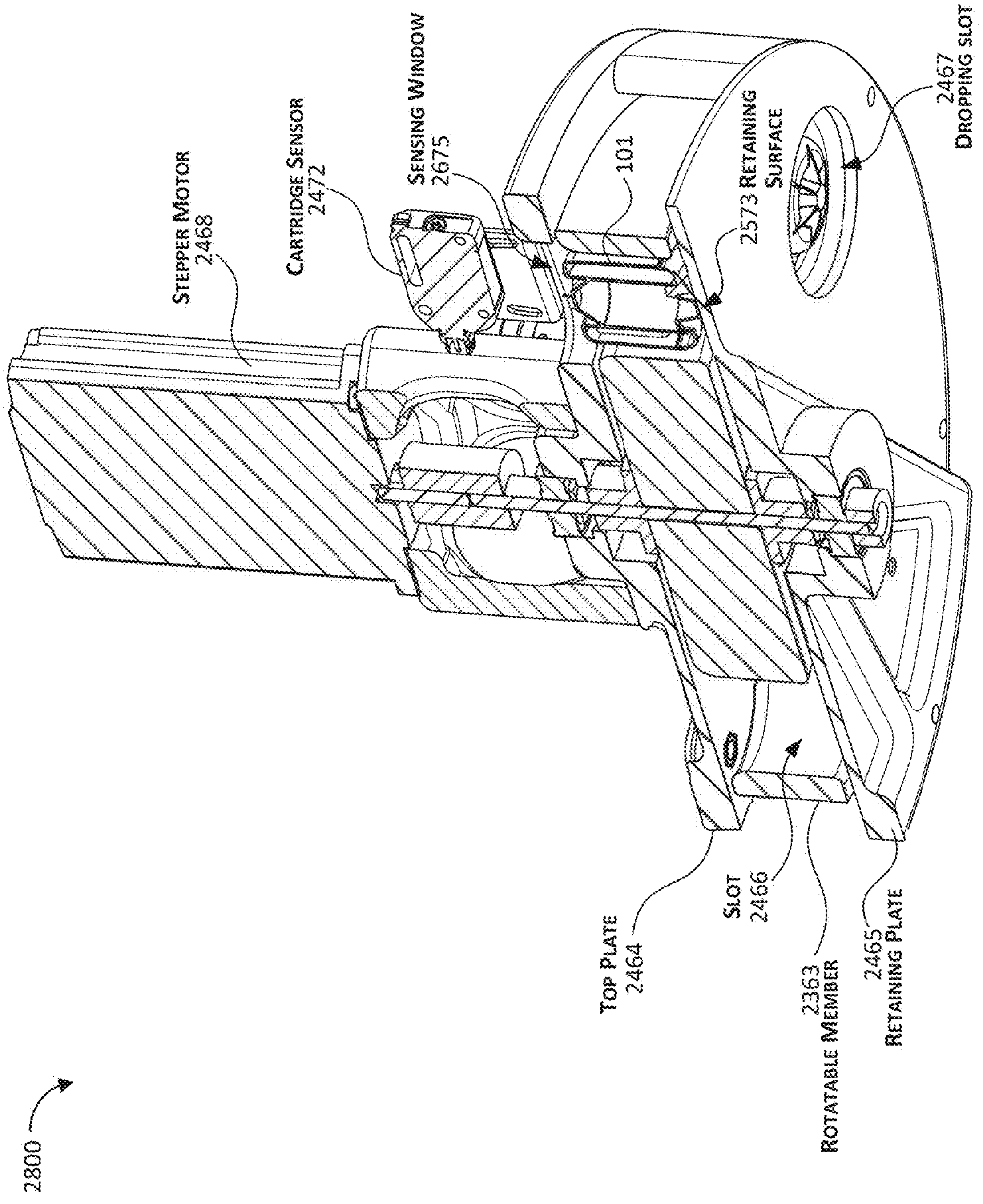
FIG. 28 illustrates a cross-sectional perspective of a dropping mechanism, according to an embodiment herein.

The cartridge sensor 2472 allows the introduction system 2307 to verify the presence of a cartridge 101 within the slots 2466 preceding the dropping slot 2467, before initiating the next indexed rotation to release the cartridge 101, such as illustrated in FIG. 28. If the cartridge sensor 2472 detects an empty slot 2466 preceding the dropping slot 2467, the process controller may initiate a double indexed rotation, effectively bypassing the empty slot 2466 and advancing to the next slot containing a retained cartridge 101. This double indexing capability ensures continuous operation and prevents missed cartridge releases when slots 2466 are empty due to supply interruptions or timing variations in the upstream assembly process.

Figure 29:
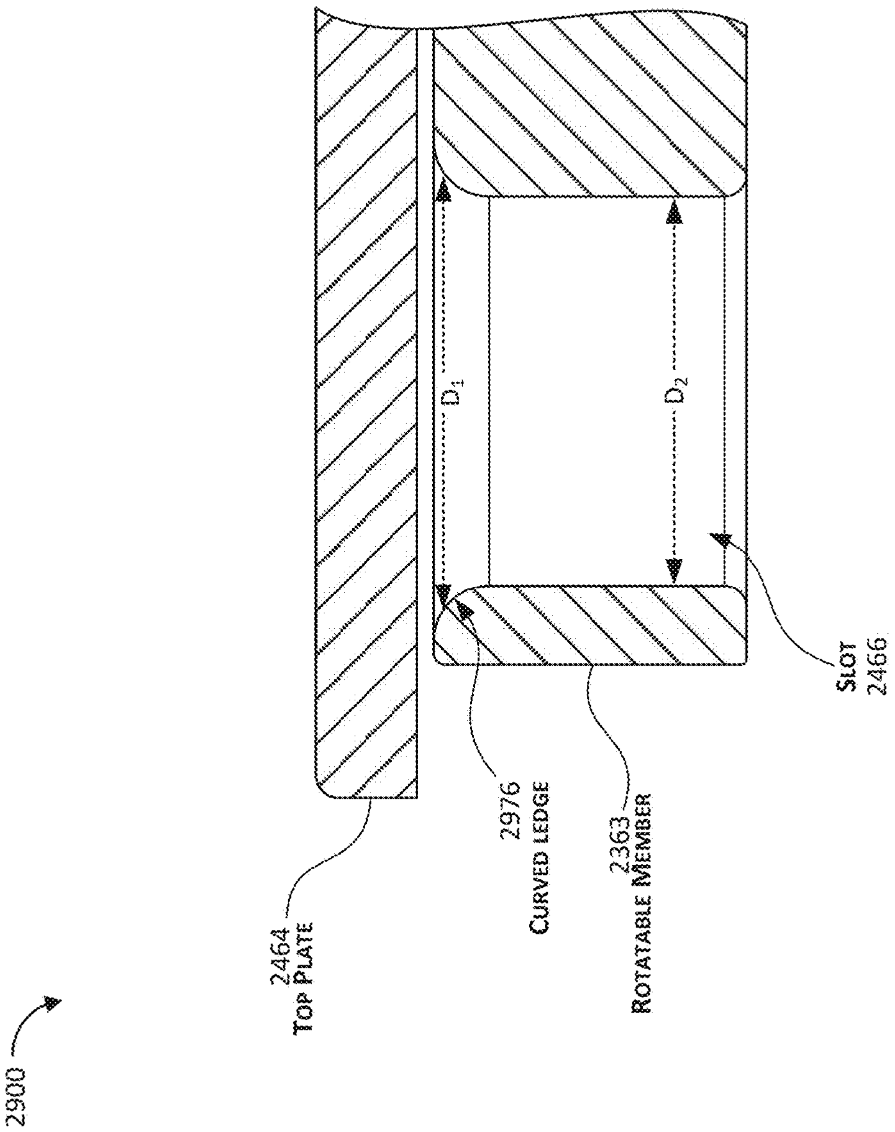
FIG. 29 illustrates a cross-sectional perspective of a slot of a rotatable member, according to an embodiment herein.

In some embodiments, the slots 2466 may be configured to facilitate smooth receipt of the cartridges 101 from the transition guide 2359. As illustrated in FIG. 29, the slots 2466 may have a curved ledge 2976 at a top end to provide extra room for receipt of the cartridge 101. The increased diameter, D1, provided by the curved ledge 2976 may prevent the cartridges 101 from becoming jammed, and allow them to fall into the slot 2466 in proper orientation (e.g., cap 214 directed downwards). Because the rotatable member 2363 is rotating and the cartridges 101 are stationary in the transition guide 2359, without the increased diameter, D1, at the entry point of the slot 2466, the cartridges 101 may experience interference or collision with the slot edges during the indexed rotation, potentially causing misalignment, jamming, or damage to the cartridge components as the rotating slot 2466 attempts to capture the stationary cartridge from the transition guide 2359.

The slots 2466 and the associated diameter dimensions may be configured to accommodate various cartridge sizes and operational requirements. In various embodiments, the increased diameter D1 at the entry point of the slot 2466 may range from 15 to 80 millimeters, from 20 to 60 millimeters, from 25 to 50 millimeters, or from 30 to 45 millimeters, depending on the specific cartridge dimensions and the degree of clearance required for smooth cartridge capture during indexed rotation. The diameter D2 at the bottom portion of the slot 2466 may be configured to provide secure retention while allowing controlled release, and may range from 10 to 70 millimeters, from 15 to 55 millimeters, from 20 to 45 millimeters, or from 25 to 40 millimeters. The dimensional relationship between D1 and D2 may be optimized such that D1 is approximately 1.2 to 2.0 times larger than D2, providing adequate entry clearance while maintaining proper cartridge positioning within the slot 2466 during the indexed rotation process. These dimensional ranges may be adjusted based on the specific cartridge geometry, rotational speed of the rotatable member 2363, and the desired level of operational reliability for different production environments.

The introduction system 2307 may be in operable communication with a proximity sensor 110 configured to detect the presence of a beverage container 109 within a dropping zone underneath the dropping slot 2467. As a given beverage container 109 moves along the conveyor line 108, the proximity sensor 110 may detect when the beverage container 109 is positioned within the dropping zone of the dropping slot 2467. The dropping zone may be defined as a predetermined area beneath the dropping slot 2467 where accurate cartridge placement into the beverage container 109 can be achieved, typically spanning a distance corresponding to the opening diameter of the beverage container 109 plus a tolerance margin to account for variations in container positioning and conveyor speed.

The proximity sensor 110 may be an optical sensor, such as a photoelectric sensor or laser sensor, an ultrasonic sensor, an inductive sensor, a capacitive sensor, or a magnetic sensor, depending on the specific detection requirements and environmental conditions of the packaging line. The proximity sensor 110 may be in electrical communication with a process controller such that when the beverage container 109 is detected within the dropping zone, the process controller may activate the stepper motor 2468 to drive the rotatable member 2363 into the releasing position, thereby releasing the retained cartridge 101 in synchronization with the movement of the beverage container 109. This synchronized operation ensures precise timing between cartridge release and container positioning, enabling accurate placement of the cartridge 101 into the beverage container 109 without disrupting the continuous flow of the packaging line or requiring modifications to existing conveyor systems.

Figure 30:
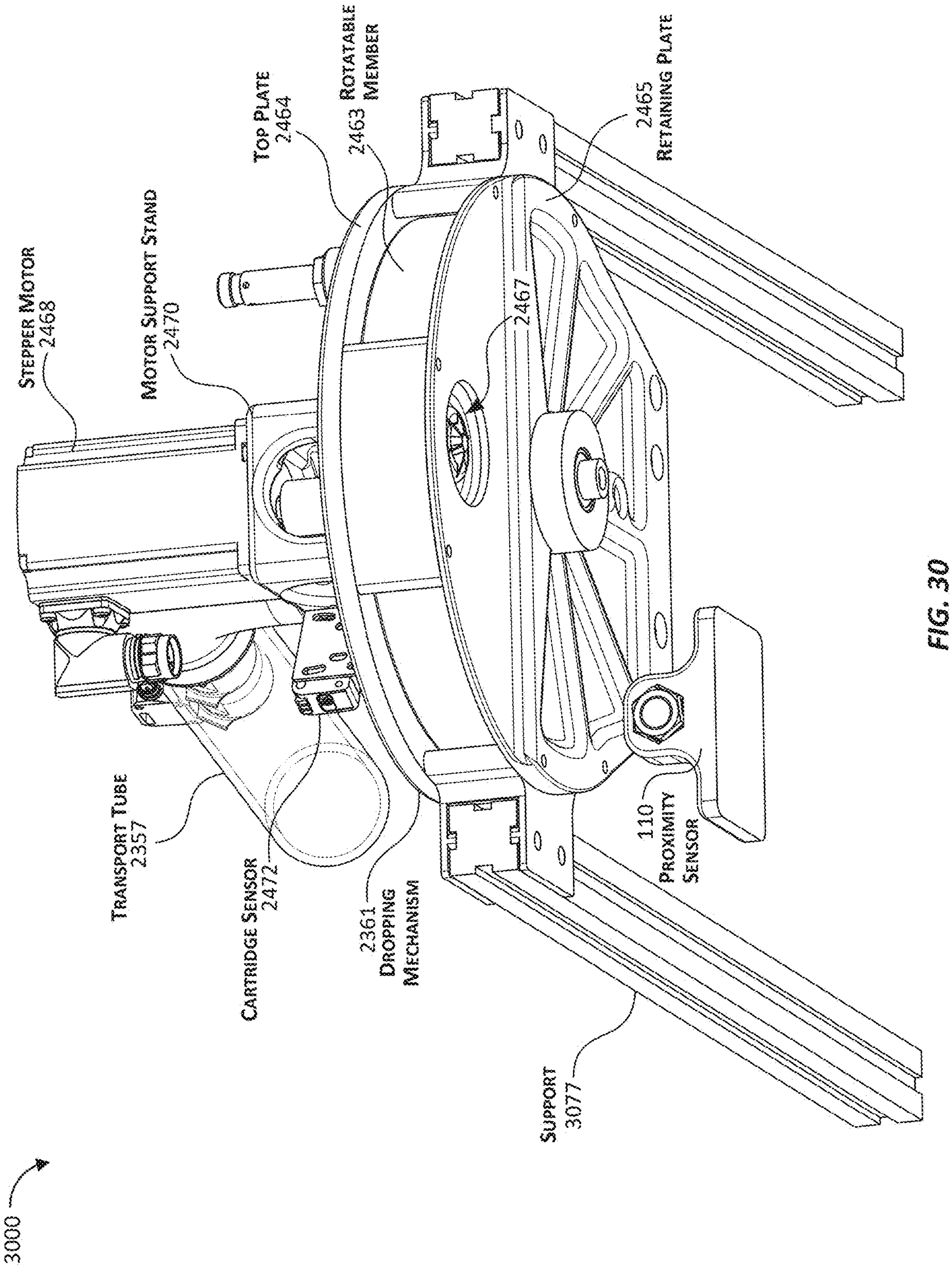
FIG. 30 illustrates a bottom-up perspective of an introduction system, according to an embodiment herein.

In some embodiments, the dropping slot 2467 may be positioned at a predetermined distance above the conveyor system 108, and more specifically, at a predetermined distance above the beverage container 109 as it moves along the conveyor line. As shown in FIG. 30, supports 3077 may be used to position the introduction system 2307 at the predefined distance above the conveyor line 108. The predetermined distance may be optimized to minimize backsplash that may occur when the cartridge 101 impacts the beverage within the beverage container 109, while ensuring that the introduction system 2307 does not impede or make contact with the beverage container 109 during the packaging process.

In various embodiments, the predetermined distance may range from 10 to 500 millimeters, from 50 to 250 millimeters, or from 100 to 200 millimeters, depending on the specific operational requirements and container configurations. The specific predetermined distance at which the dropping slot 2467 is positioned above the beverage containers 109 may depend on multiple factors, including the size and weight of the cartridges 101, the dimensions and fill level of the beverage containers 109, the viscosity of the beverage, and the speed of the conveyor line 108. This positioning ensures that the cartridges 101 can be accurately dispensed into the beverage containers 109 without creating excessive splash or foam formation that could interfere with subsequent sealing operations, while maintaining sufficient clearance to prevent any physical interference between the introduction system 2307 and the moving beverage containers 109 during the continuous packaging process.

Figure 31A:
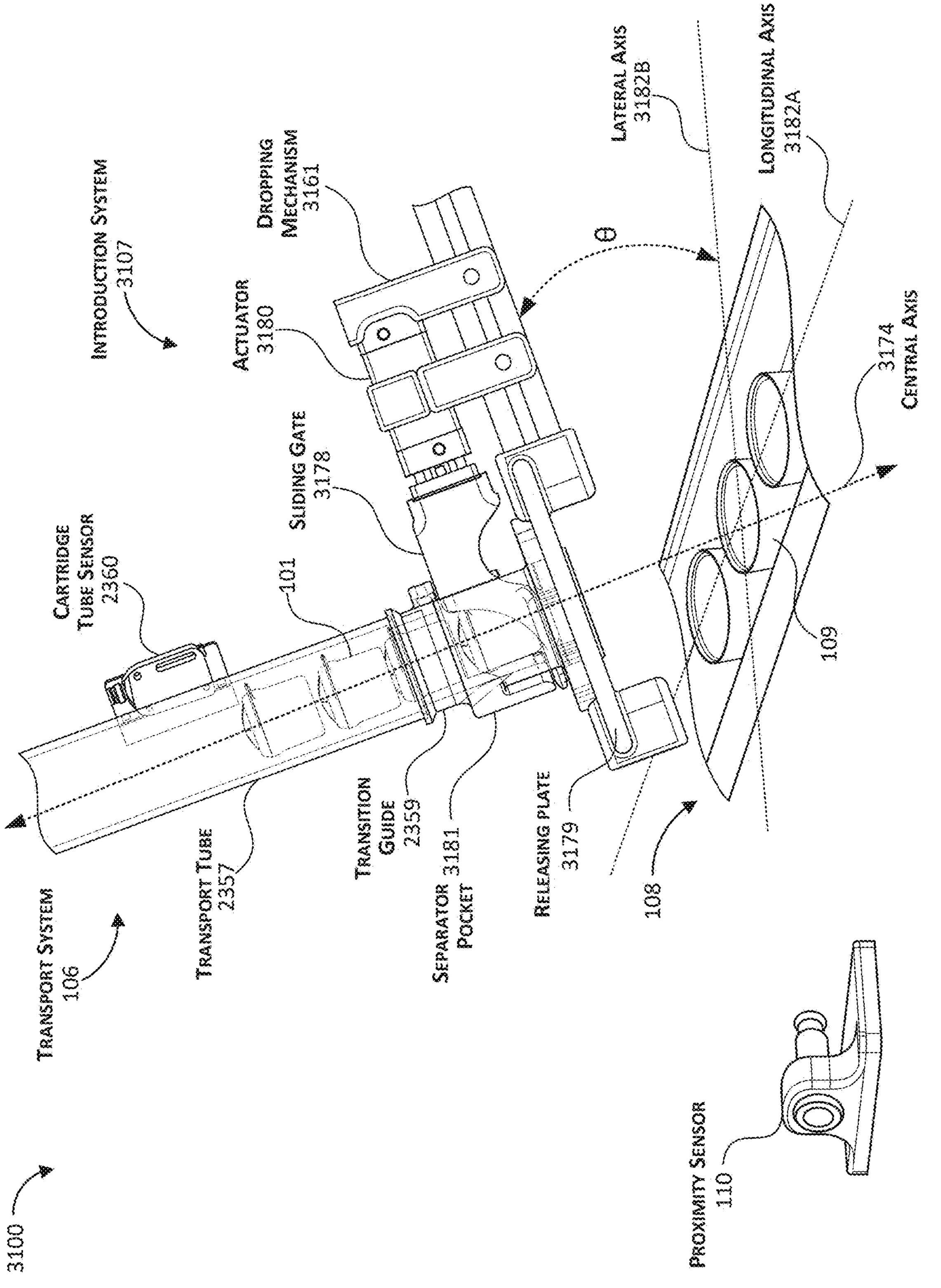
FIGS. 31A-B illustrate various perspectives an introduction system, according to an embodiment herein.
Figure 31B:
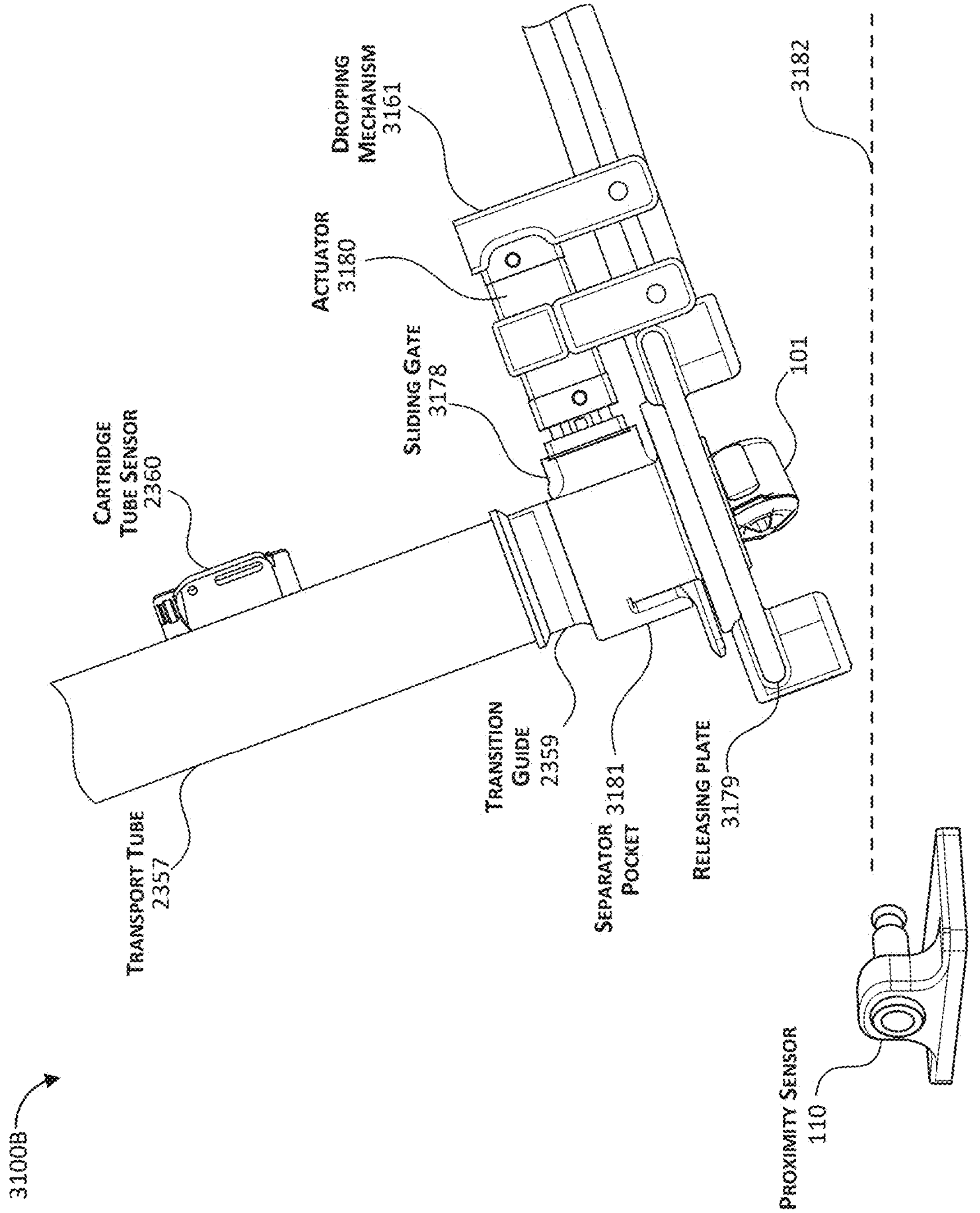

Turning now to FIGS. 31A-37B, a second embodiment of the introduction system 2307 is illustrated according to various embodiments herein. In the second embodiment, the dropping mechanism 3161 of the introduction system 2307 includes a sliding gate 3178 configured to transition between a retaining position and a releasing position. As illustrated in FIG. 31A-B, the introduction system 2307, which may be the same or similar to the introduction system 107, may be positioned above the conveyor line 108 to release cartridges 101, when in the releasing position, directly into the beverage container 109.

In the second embodiment, cartridges 101 may be received from the transport system 106 through the transition guide 2359, which may be part of or fluidly connected to a separator pocket 3181 of the dropping mechanism 3161. As illustrated in the figures, the transport tube 2357 of the transport system 106 may directly connect to the transition guide 2359 without requiring an intermediate elbow component, providing a streamlined pathway for cartridge delivery. This direct connection may facilitate smooth cartridge transfer from the transport system 106 into the separator pocket 3181, minimizing potential disruption or redirection that could affect cartridge orientation or velocity. However, depending on the specific configuration requirements and spatial constraints of the installation, an elbow may be present to accommodate facility layout or equipment positioning needs. The transition guide 2359 may be configured to maintain proper cartridge alignment as they progress from the transport tube 2357 into the separator pocket 3181, ensuring that each cartridge 101 is positioned appropriately for subsequent handling by the sliding gate 3178 during the retention and release operations.

The direct connection between the transport tube 2357 and the dropping mechanism 3161 may also allow the transport tube 2357 to act as a holding space for the cartridges 101 prior to release. As illustrated, the cartridges 101 may stack in the transport tube 2357, providing a backlog for the introduction system 2307. This stacking configuration may enable continuous operation by maintaining a ready supply of cartridges 101 within the transport tube 2357, allowing the introduction system 2307 to dispense cartridges 101 into beverage containers 109 without interruption even when upstream assembly processes experience temporary variations in cartridge delivery rates.

As illustrated in FIG. 31, the introduction system 2307 and the transport tube 2357 may be tilted at an angle, θ, from a longitudinal axis 3182A and/or a lateral axis 3182B of the conveyor line 108. The longitudinal axis 3182A extends parallel to the direction of container movement along the conveyor line 108, and the lateral axis 3182B extends orthogonal to the longitudinal axis 3182A. The angle, θ, may be at least 5 degrees, at least 10 degrees, or at least 15 degrees off of the longitudinal axis 3182A or the lateral axis 3182B of the conveyor line 108, such that a central axis 3174 of the introduction system 2307 is oriented at an angle relative to the conveyor line 108. The central axis 3174 may be defined as the axis extending through the center of the introduction system 2307, such as through the center of the transition guide 2359 and the dropping mechanism 3161, along which cartridges 101 are dispensed into the beverage containers 109.

This angled orientation may allow the cartridges 101 stacked in the transport tube 2357 to lean partially against the sidewall of the transport tube 2357, thereby minimizing the downward force of the cartridges on a retained cartridge that is ready for release. By distributing the weight of the stacked cartridges 101 against the sidewall rather than concentrating the full gravitational force directly downward, the angled configuration may reduce the pressure exerted on the cartridge 101 positioned in the separator pocket 3181. An increase in pressure on a releasing cartridge may have negative effects on smooth transition between the retained position and the releasing position. For example, excessive downward pressure may cause the cartridge 101 to bind against the retaining surface 3273 or the retaining pin 3384, making it difficult for the sliding gate 3178 to transition smoothly from the retaining position to the releasing position. Additionally, high pressure may cause the cartridge 101 to jam within the separator pocket 3181 or may result in uncontrolled rapid release when the sliding gate 3178 moves to the releasing position, potentially affecting the accuracy of cartridge placement into the beverage container 109. The angled orientation therefore provides improved operational reliability by ensuring that the cartridge release mechanism operates within optimal pressure parameters, facilitating consistent and controlled dispensing of cartridges 101 into the beverage containers 109 during the packaging process.

Figure 32A:
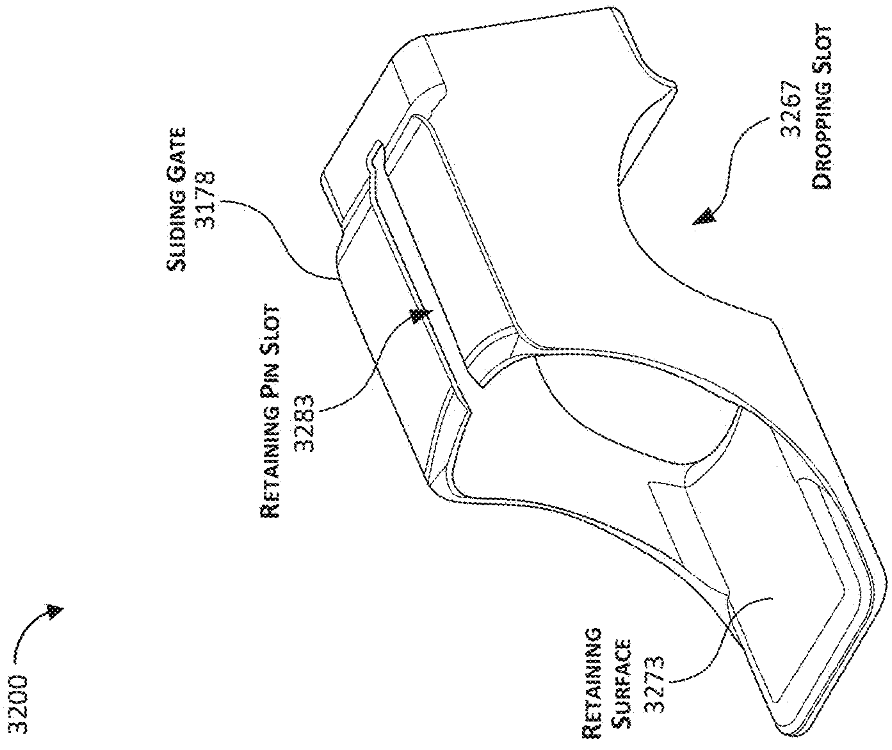
FIGS. 32A and 32B illustrate different perspectives of a dropping mechanism, according to an embodiment herein.
Figure 32B:
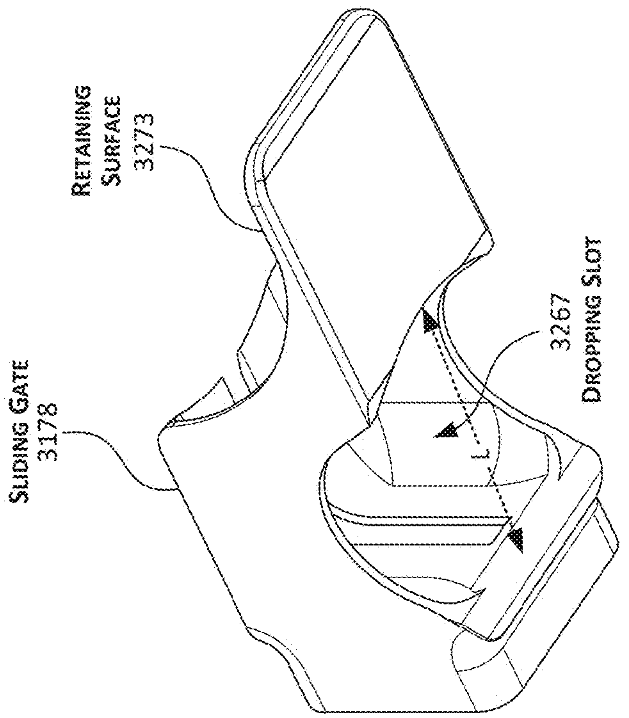

As shown in FIGS. 32A-B, the sliding gate 3178 may include a retaining surface 3273 and a dropping slot 3267. In the retaining position, the retaining surface 3273 may be aligned with the separator pocket 3181 to support and retain a given cartridge 101 received from the transition guide 2359. The dropping slot 3267 may be positioned within the sliding gate 3178 such that when the sliding gate 3178 transitions to the releasing position, the dropping slot 3267 aligns with the separator pocket 3181 and an opening in the releasing plate 3179, creating a clear pathway for the cartridge 101 to be released into the beverage container 109 below. The separator pocket 3181 may be sized to accommodate the dimensions of the cartridge 101 while providing sufficient clearance to prevent jamming during the transition between retaining and releasing positions.

In some embodiments, the diameter of the separator pocket 3181 may be the same diameter as the transition guide 2359, which may be the same as the diameter of the transport tube 2357. This uniform diameter configuration ensures smooth cartridge flow from the transport tube 2357 through the transition guide 2359 and into the separator pocket 3181 without dimensional restrictions that could cause jamming or misalignment. It should be appreciated that while the transition guide 2359 is referenced as a separate component from the separator pocket 3181, in some embodiments, they may be monoformed, such that the transition guide 2359 and the separator pocket 3181 are part of the same component. In such monoformed configurations, the separator pocket 3181 refers to the portion of the transition guide 2359 that is configured to receive and allow movement of the sliding gate 3178, as described in greater detail below. This integrated design eliminates joints or connection points that could harbor contaminants and provides enhanced structural integrity while simplifying manufacturing and maintenance requirements.

To prevent jamming or catching of the cartridge 101, such as interference from the hinge 216 of the cartridge 101, during release, the dropping slot 3267 may have a length, L, that is larger than the diameter of the separator pocket 3181. The length, L, may be approximately 1.1 to 1.3 times greater than the diameter of the separator pocket 3181, providing sufficient clearance for smooth cartridge passage. By increasing the length of the dropping slot 3267, this configuration provides additional space as the cartridge 101 begins to fall when the sliding gate 3178 transitions into the releasing position. This enlarged dropping slot 3267 accommodates any protruding features of the cartridge 101, such as the hinge 216 connecting the cap 214 to the body 213, ensuring that these components do not interfere with the release mechanism or cause the cartridge 101 to become stuck during the dropping operation.

Similarly, the diameter of the release opening 3385 in the releasing plate 3179 may be configured to be the same as or larger than the length, L, of the dropping slot 3267 to ensure continued clearance as the cartridge 101 falls through the releasing plate 3179. This dimensional coordination between the dropping slot 3267 and the release opening 3385 prevents any catching or interference of cartridge components, such as the hinge 216 or other protruding features, during the complete fall trajectory from the separator pocket 3181 through the releasing plate 3179 and into the beverage container 109 below. The increased length also allows for manufacturing tolerances and variations in cartridge orientation while maintaining reliable release performance across different cartridge configurations and operating conditions.

To move the sliding gate 3178 between the retaining and releasing positions, the sliding gate 3178 may be operatively connected to an actuator 3180. In some embodiments, the actuator 3180 may be a pneumatic actuator, hydraulic actuator, or electric motor that provides controlled linear or rotational movement to position the sliding gate 3178 appropriately for cartridge retention or release. The actuator 3180 may be in operable communication with the proximity sensor 110, which, as noted above, is configured to detect when the beverage container 109 is positioned within the dropping zone of the introduction system 107. Upon detection of the beverage container 109 within the dropping zone, the proximity sensor 110 may transmit a signal to a control system, such as a process controller, which in turn activates the actuator 3180 to transition the sliding gate 3178 from the retaining position to the releasing position. This synchronized operation ensures that the cartridge 101 is released at the precise moment when the beverage container 109 is optimally positioned beneath the introduction system 107 to receive the cartridge 101, thereby maintaining accurate timing coordination with the movement of beverage containers along the packaging line.

Figure 33:
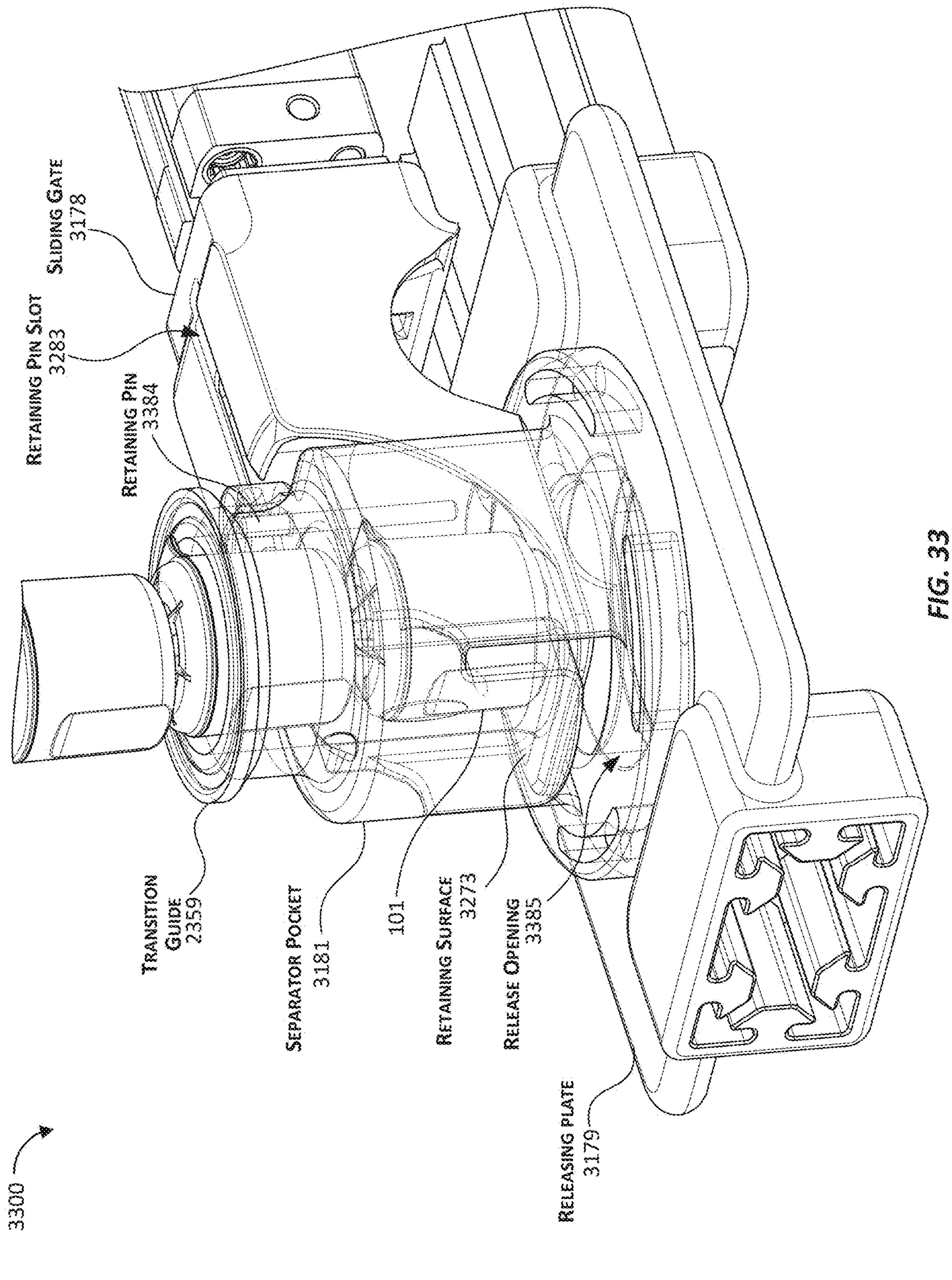
FIGS. 33-34 illustrate various perspectives of an introduction system, according to an embodiment herein.
Figure 34:
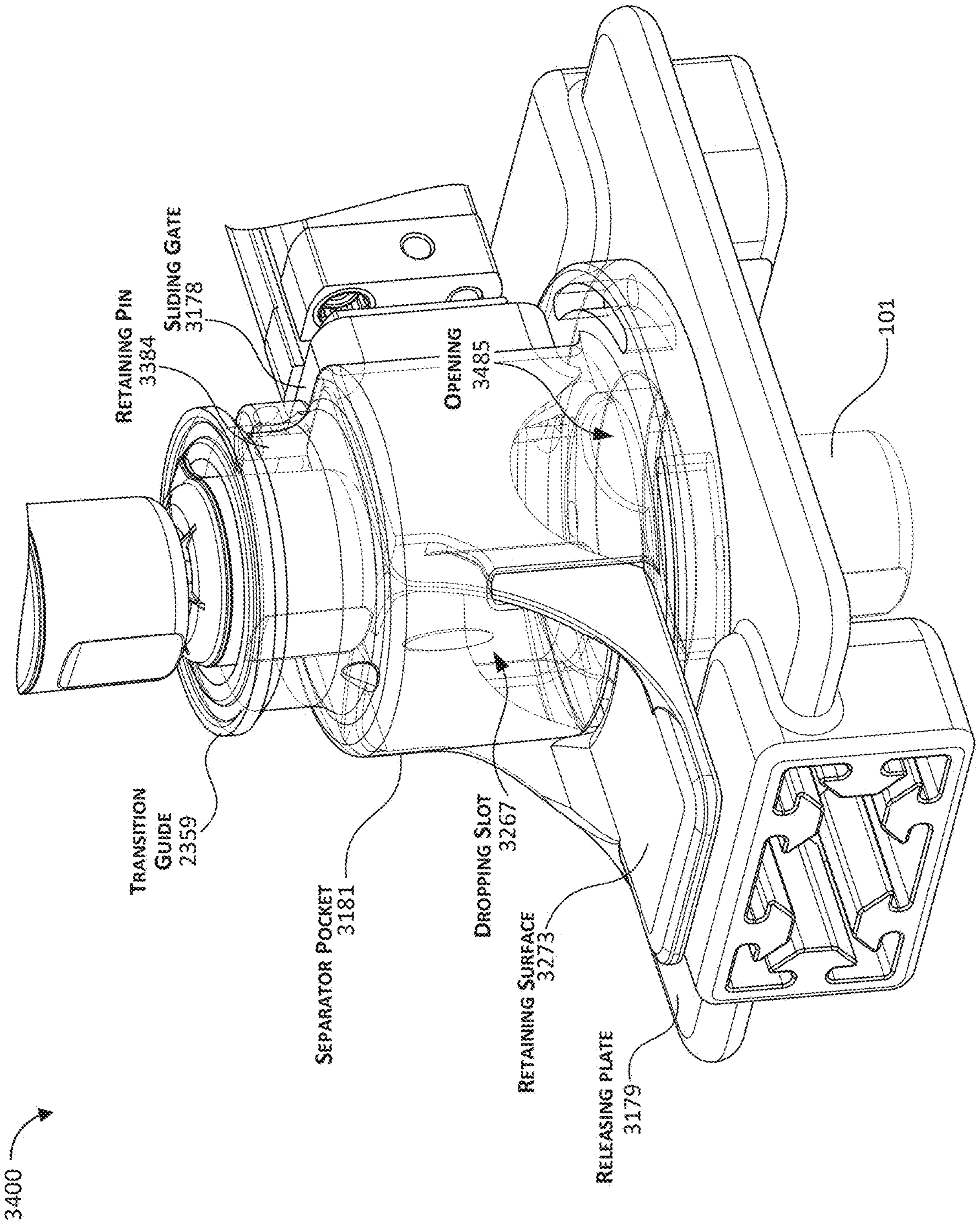

The introduction system 2307 may further include a releasing plate 3179 positioned beneath the sliding gate 3178, as illustrated in FIG. 33. The releasing plate 3179 may include an opening 3385 that aligns with the conveyor line 108 to ensure that released cartridges 101 are directed into the beverage containers 109 as they move along the packaging line. The releasing plate 3179 may be secured to or positioned relative to the separator pocket 3181 such that the opening 3385 is aligned with both the transition guide 2359 and, in some cases, the transport tube 2357. This alignment ensures that when the sliding gate 3178 transitions to the releasing position, the dropping slot 3267 of the sliding gate 3178 aligns with the opening 3385 of the releasing plate 3179, creating a clear pathway for the cartridge 101 to be released from the separator pocket 3181 through the opening 3385 and into the beverage container 109 below. The precise alignment between these components aids in accurate cartridge placement and reliable operation of the introduction system 2307.

Figure 35A:
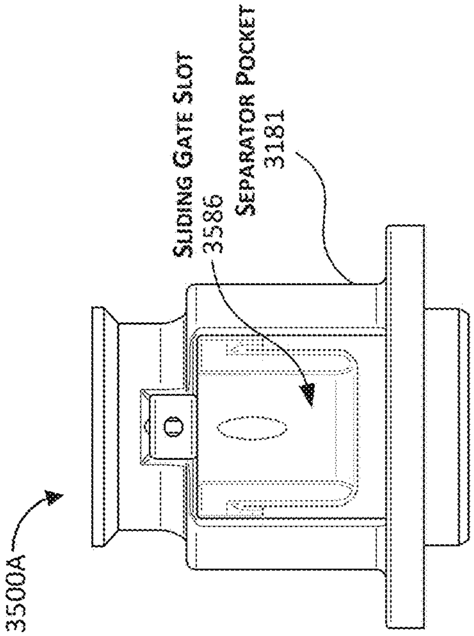
FIGS. 35A-C illustrate various perspectives of a separator pocket of a dropping mechanism, according to an embodiment herein.
Figure 35B:
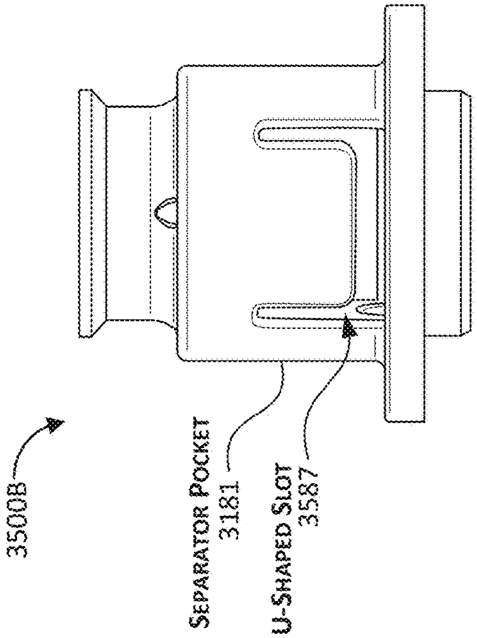
Figure 35C:
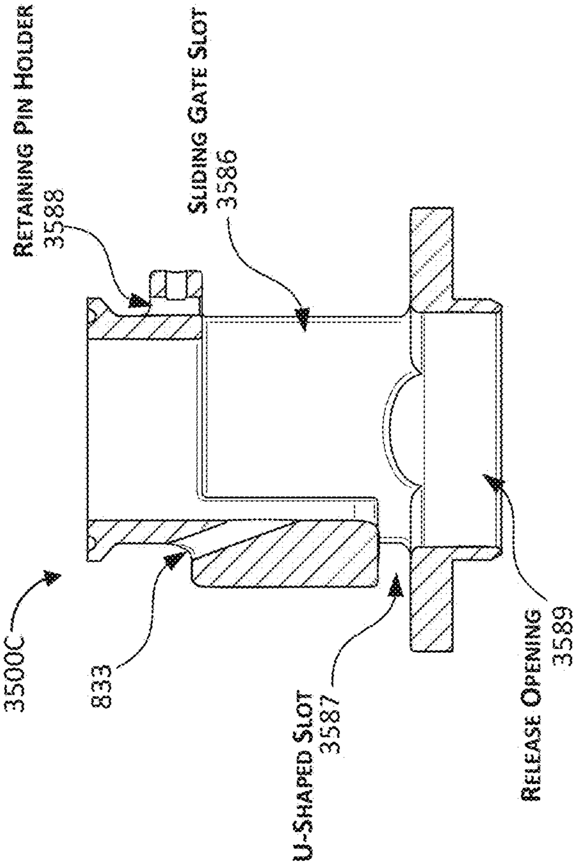

In some embodiments, the sliding gate 3178 may be configured to insert through the separator pocket 3181. As illustrated in FIGS. 35A-35C, the separator pocket 3181 may include a sliding gate slot 3586 on a first side and a U-shaped slot 3587 on an opposing side. The sliding gate slot 3586 may be configured to allow the sliding gate 3178 to insert into the separator pocket 3181, while the U-shaped slot 3587 may be configured to allow the sliding gate 3178 to transition forward, thereby inserting the retaining surface 3273 through the U-shaped slot 3587. The sliding gate slot 3586 may be dimensioned to provide a close tolerance fit with the sliding gate 3178, ensuring smooth linear movement while preventing excessive lateral play that could affect the precision of cartridge positioning. The U-shaped slot 3587 may be configured with a curved profile that accommodates the geometry of the retaining surface 3273 as it transitions through the separator pocket 3181. This U-shaped configuration may allow the retaining surface 3273 to move from a position where it blocks the cartridge 101 from falling through the separator pocket 3181 to a position where it no longer obstructs the cartridge's path, thereby enabling controlled release.

As shown in FIG. 33, the introduction system 2307 may include a retaining pin 3384 configured to prevent the cartridges 101 retained in the separator pocket 3181, such as a cartridge seated on the retaining surface 3273, from falling into the dropping slot 3267, when the dropping mechanism is in the retaining position. The retaining pin 3384 provides security by engaging with the cartridge 101 against the retaining surface 3273, ensuring that the cartridge 101 remains properly positioned until the sliding gate 3178 transitions to the releasing position.

The separator pocket 3181 may include a retaining pin holder 3588 positioned to secure the retaining pin 3384 in a fixed location relative to the sliding gate 3178. The retaining pin holder 3588 ensures that the retaining pin 3384 remains stationary during operation of the dropping mechanism 3161, providing a stable reference point for cartridge retention. To allow for movement of the sliding gate 3178, the sliding gate 3178 may include a retaining pin slot 3283 which allows the sliding gate 3178 to move around the retaining pin 3384. This configuration enables the sliding gate 3178 to transition between the retaining and releasing positions while the retaining pin 3384 remains fixed in position. In other words, the sliding gate 3178 transitions to the releasing position, the retaining pin slot 3283 allows the sliding gate 3178 to move around the retaining pin 3384, thereby allowing the sliding gate 3178 to align the dropping slot 3267 with the retained cartridge 101 and permitting the cartridge 101 to be released.

As noted above, the sliding gate 3178 may be configured to translate linearly between the retaining and releasing positions. In some embodiments, the sliding gate 3178 may be configured to pivot about a hinge mechanism, instead of translating linearly as illustrated. In linear translation embodiments, the actuator 3180 may drive the sliding gate 3178 along a predetermined path to achieve the proper alignment between the dropping slot 3267 and the opening 3385 in the releasing plate 3179. In pivoting embodiments, the sliding gate 3178 may rotate about a fixed axis to transition between the retaining and releasing positions, with the actuator 3180 providing the rotational force necessary to achieve the desired alignment for cartridge release.

Figure 36B:
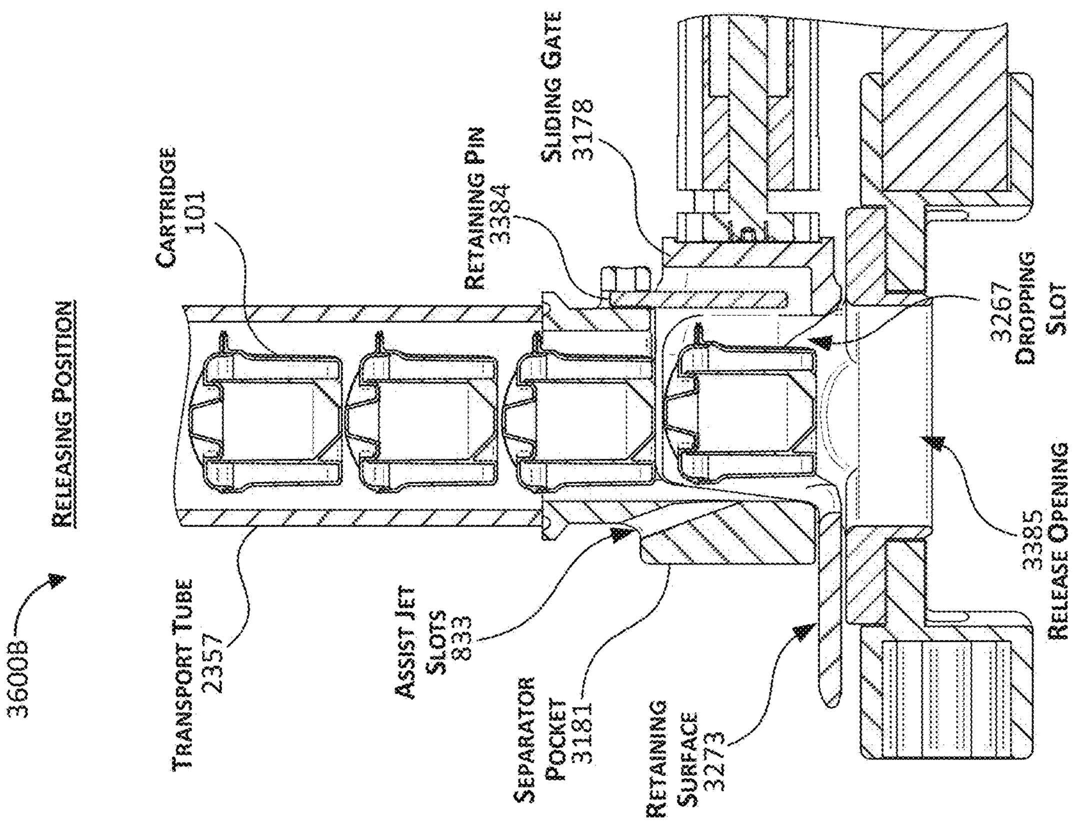
FIGS. 36A and 36B illustrate retaining and releasing positions of a dropping mechanism, according to an embodiment herein.
Figure 36A:
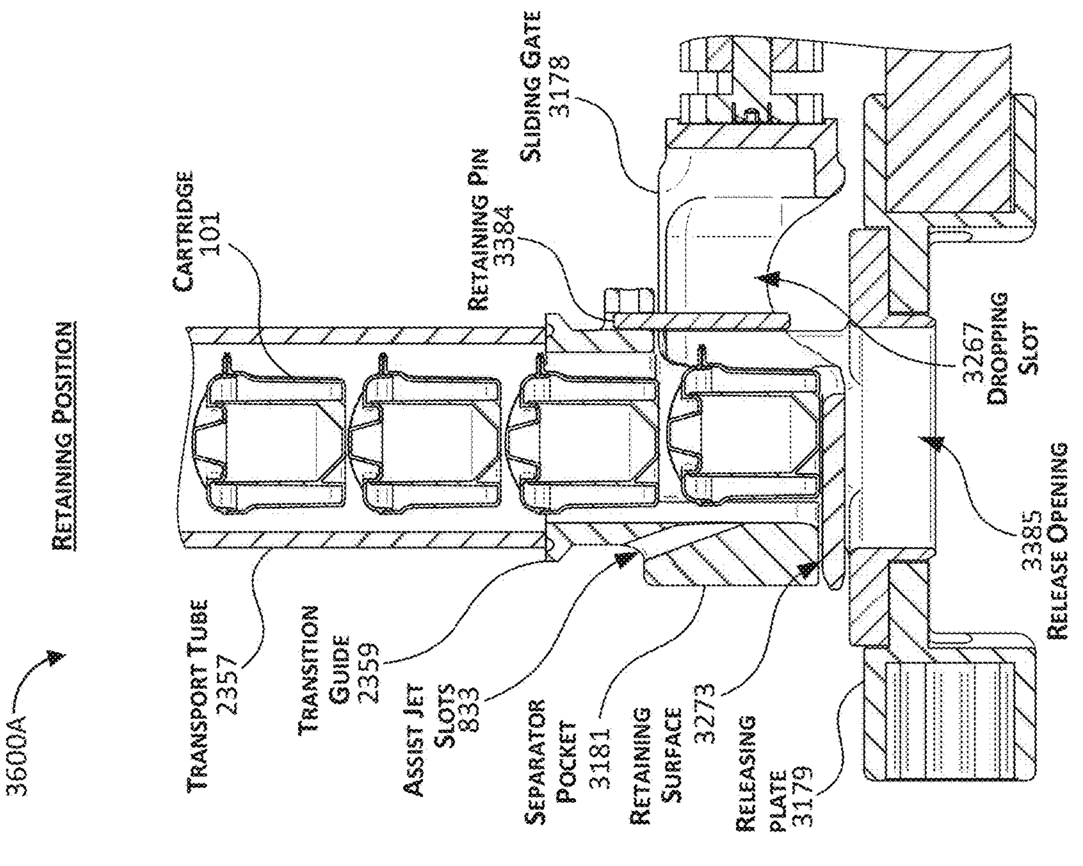

With particular reference to FIGS. 36A-B, perspectives 3600A and 3600B provide cross-sectional views of the introduction system 2307 in the retaining position and releasing position, respectively. As illustrated, multiple cartridges 101 may be retained in the transport tube 2357, with at least one cartridge being held in the separator pocket 3181, awaiting release. The retained cartridge 101 in the separator pocket 3181 may be held against the retaining surface 3273 of the sliding gate 3178. To prevent the retained cartridge 101 seated on the retaining surface 3273 from falling into the dropping slot 3267 when the sliding gate 3178 is in the retaining position, the introduction system 2307 includes the retaining pin 3384.

When the sliding gate 3178 transitions to the releasing position, the sliding gate 3178 may slide forward such to align the dropping slot 3267 with the retained cartridge 101. The retaining surface 3273 of the sliding gate 3178 slides through the U-shaped slot of the separator pocket 3181 during this transition. The dropping slot 3267 aligns with the release opening 3385 of the releasing plate 3179, thereby providing a clear path for the cartridge 101 to drop into the underlying beverage container 109. As illustrated, in some embodiments, the separator pocket 3181 may also include assist jet slots 833 configured to allow an assist jet to inject inert gas as the retained cartridge 101 is released. This may provide additional propulsion for the drop and may also minimize entrained oxygen as the cartridge 101 is dropped into the open beverage container 109.

Figure 37B:
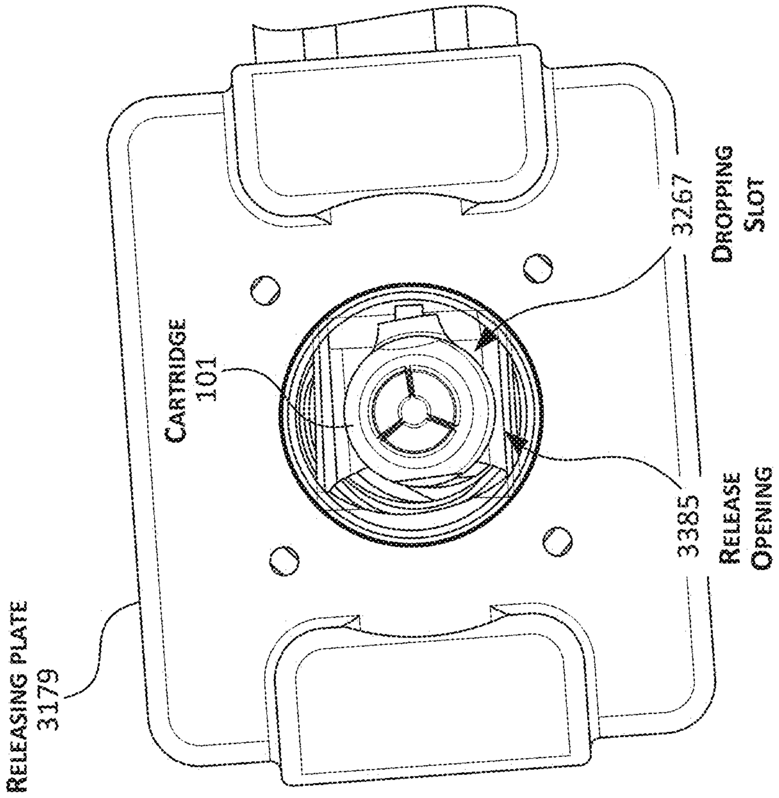
FIGS. 37A and 37B illustrate a bottom-up perspective of a releasing plate and retaining surface, according to an embodiment herein.
Figure 37A:
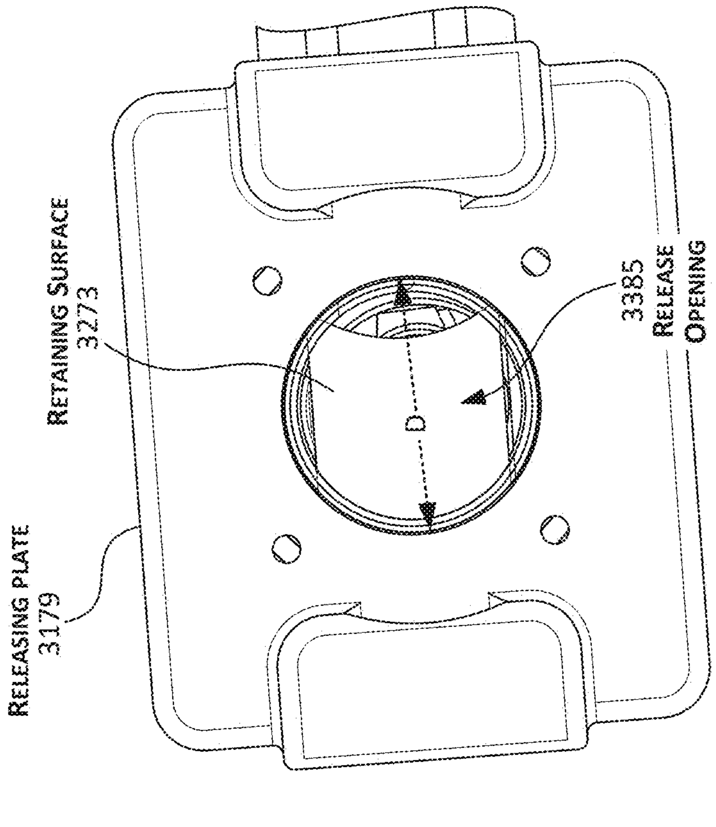

Referring now to FIGS. 37A-B, bottom-up perspectives of the releasing plate 3179 and retaining surface 3273 are provided, according to embodiments herein. As shown in FIG. 37A, when the sliding gate 3178 is in the retaining position, the retaining surface 3273 may align with the release opening 3385 of the releasing plate 3179, thereby preventing the retained cartridge 101 from falling through the opening 3385. However, when the sliding gate 3178 transitions into the releasing position, the dropping slot 3267 of the sliding gate 3178 aligns with the release opening 3385, thereby exposing the cartridge 101 to the opening 3385. The influence of gravity may then cause the cartridge 101 to fall through the dropping slot 3267 and the release opening 3385 and into the beverage container 109 aligned below. This coordinated alignment between the dropping slot 3267 and the release opening 3385 ensures precise timing for cartridge release, allowing the introduction system to accurately dispense cartridges into moving beverage containers during the packaging process.

The coordinated operation of the assembly and introduction system 100 may be managed by a control system that includes one or more process controllers configured to synchronize the individual actions of various system components with the beverage packaging line. The control system may be in operable communication with multiple components throughout the assembly and introduction system 100, including the filler assembly 934, capping assembly 935, transport system 106, and introduction system 107, enabling centralized coordination of cartridge processing from initial sorting through final dispensing into beverage containers 109. The control system may receive input signals from various sensors positioned throughout the system, such as the proximity sensor 110 that detects beverage containers 109 on the conveyor line 108, cartridge sensors 2360 that monitor cartridge presence and positioning, and pressure sensors within the transport system 106 that track cartridge flow rates. Based on these input signals, the control system may modulate the operation of assist jets, actuate dropping mechanisms 2361/3161, and coordinate timing sequences to ensure that cartridge introduction occurs precisely when beverage containers 109 are optimally positioned beneath the introduction system 107. This synchronized control may allow the assembly and introduction system 100 to maintain consistent throughput rates that match the speed of the beverage packaging line while ensuring accurate cartridge placement and preventing disruption to existing packaging operations.

Figure 38:
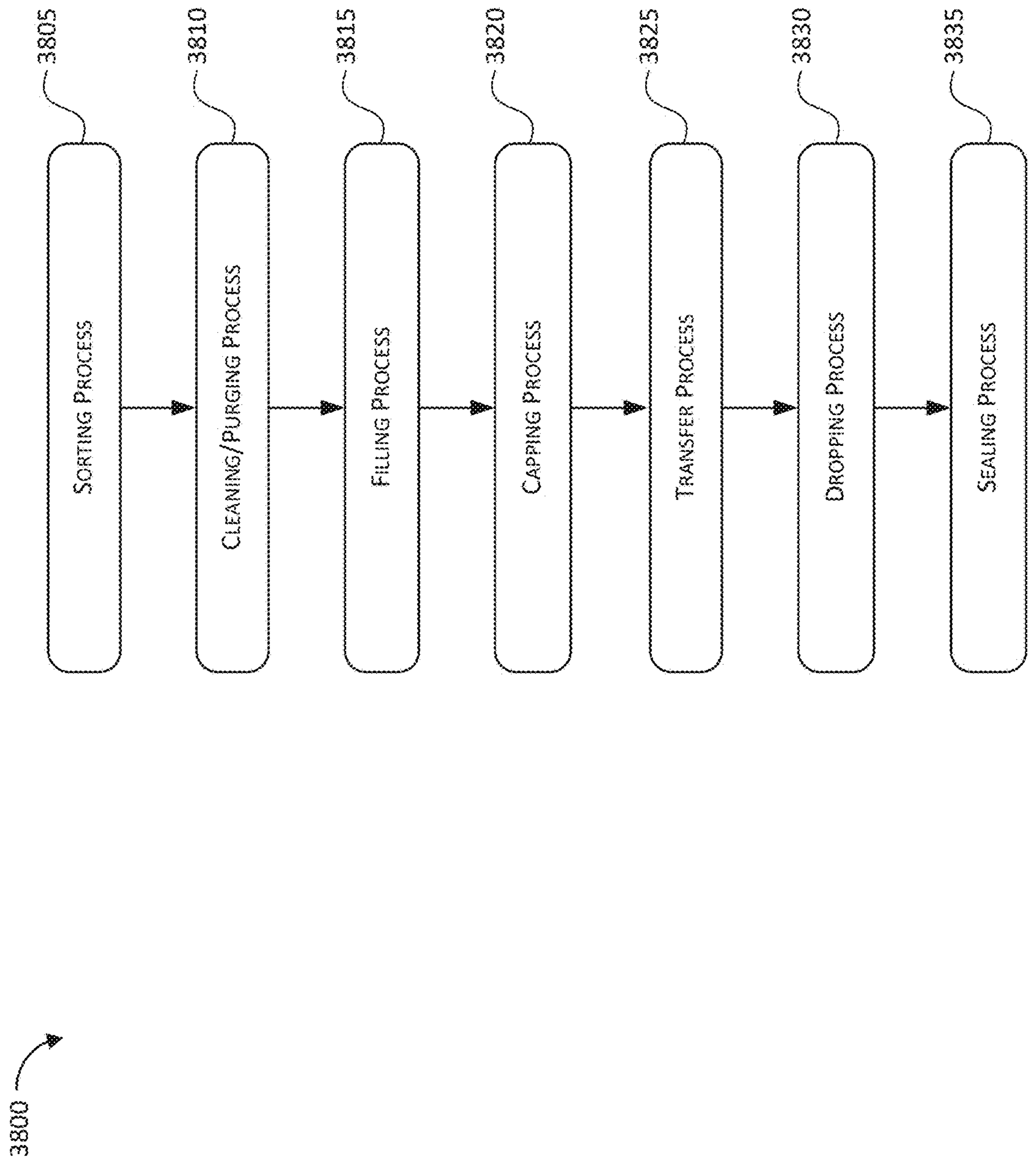
FIG. 38 illustrates a flowchart of an assembly and introduction process, according to an embodiment herein.

Referring now to FIG. 38, an example assembly and introduction process 3800 is illustrated, according to an embodiment herein. The control system may be configured to perform one or more of the steps of the process 3800, providing centralized coordination and timing control throughout the assembly and introduction operations. In some embodiments, individual process controllers may be responsible for executing specific steps of the process 3800, such as the sorting process step 3805 or the filling process step 3815, while the control system provides cohesive coordination across the multiple process controllers to ensure synchronized operation and optimal throughput. This hierarchical control architecture allows for precise management of each individual process step while maintaining overall system integration and timing coordination between the various stages of cartridge assembly and introduction.

The process 3800 may illustrate an example process by which a cartridge, such as the cartridge 101 is filled and assembled before being inserted into a beverage container, such as illustrated above. As shown, the process 3800 may start with a sorting process step 3805. During the sorting process step 3805, the cartridges 101 are sorted, and in some cases oriented into a proper orientation for the subsequent steps. As such, the assembly system 102 may include a sorting machine, such as the sorting bowl 104 (e.g., vibratory bowl feeder) or the elevator 103. The type of sorting machine may vary depending on the beverage packaging line, such as the type of beverage container 109 used and the pacing/speed of the conveyor line 108. FIGS. 5-6 illustrate example sorting bowls 504 that may be implemented during the sorting process step 3805.

Once the cartridges 101 are oriented in a desired direction, a cleaning/purging process step 3810 may be performed. The cleaning/purging process step 3810 may sanitize the cartridges 101, in particular the inner chamber 220 and outer chamber 221 of the cartridge 101, prior to introducing the cartridge 101 into the beverage container 109. In embodiments, the cartridges 101 may be rinsed with a sanitizing component, such as ionized air, UV light, sterile water, or other sanitizing liquids, to remove any contaminants and prepare them for filling. As such, the assembly system 102 may include the sanitization unit 727, like a blower or gun, to clean the cartridges 101. The sanitization unit 727 may neutralize static electricity within the inner chamber 220 and outer chamber 221, and remove any dust, debris, or particles from the chamber surfaces.

In some embodiments, during the cleaning/purging process step 3810 the cartridges 101 may be subjected to a purging process. The purging process may involve purging the cartridges 101 of any oxygen using the first nozzle 937A of the filler assembly 934. As described above a primary factor contributing to flavor degradation is the presence of oxygen, as such it may be desirable to remove it from the cartridge 101. Not only does oxygen degrade the beverage itself, but it may also degrade the remediating components rendering them less effective or muted. As such, the purging process may be desirable prior to injection of the remediating components to ensure that the flavor of the components is not compromised by oxidation. Moreover, the cartridges 101 may be purged or otherwise cleaned to reduce introduction of dissolved oxygen into the packaged beverage. As such, filling of the cartridges 101 with the remediating component and/or introduction of the cartridges 101 into the packaged beverage may be performed under an oxygen-free environment, such as in an inert environment. Accordingly, the filler-capper assembly 105 may include a purging system.

The purging system may be a non-reactive or inert gas purging system that uses a purging gas to displace oxygen within the cartridge 101. Common purging gases include carbon dioxide, nitrogen, and argon, depending on the type of beverage and the packaging process. The purging gas may be delivered into the inner chamber 220 of the cartridge 101 via the first nozzle 937A, which may be positioned inside or just above the chamber. The purging gas, being heavier than air in many cases, may sink to the bottom of the chambers, pushing out lighter gases like oxygen, which may be vented from the environment. For example, a puff of carbon dioxide may be provided into the inner chamber 220 of the cartridge 101 prior to injection of the remediating component(s). The cleaning/purging process step 3810 may be carefully timed and controlled using the process controller 1355, such as programmable logic controllers (PLCs) or similar automation systems, to ensure efficient use of purging gas without wastage.

Once the cleaning/purging process step 3810 is complete, one or more remediating components may be injected into the inner chamber 220 via a filling process step 3815. As such, the filler assembly 934 may include the second nozzle 937B. The second nozzle 937B may inject a predefined volume of remediating component into the inner chamber 220. In some cases, the filler assembly 934 may include multiple nozzles so that more than one cartridge 101 can be filled at a time, depending on the configuration and underlying packaging process. In some embodiments, the filling process step 3815 may be performed in an oxygen-deprived environment, such as under a carbon dioxide blanket to minimize oxygen exposure.

Since a beverage packaging line may switch up the type of beverage being packaged, the filler assembly 934 may be in operable communication with the packaging line or including a graphical user interface (GUI) via which an operator can input the type of beverage being packaged. Since the type of remediating component or amount may vary depending on the type of beverage, the filler assembly 934 may automatically adjust the volume or type of remediation component being injected based on the type of beverage being packaged on the line at a given time.

Upon filling the cartridge 101 with the remediating components, the cartridge may be sealed via a capping process step 3820. As described above, the cartridge 101 includes the body 213 and the cap 214. During the cleaning/purging process step 3810 and filling process step 3815, the cap 214 may be separated from the body 213 to allow for each of those steps to be performed. As such, during the capping process step 3820, the cap 214 may be secured to the body 213 such to seal the remediating components within the inner chamber 220. The capping process step 3820 may be performed under the same or similar oxygen-deprived environment as the filling process step 3815. To perform the capping process step 3820, the capping assembly 935 may include the sealing element 940 and the tamper 938, which may vary depending on the type of cap 214 and the mechanism used to secure the cap 214 to the body 213.

In some embodiments, the filling process step 3815 and the capping process step 3820 may be performed by a unitary piece of equipment, such as the filler-capper assembly 105 illustrated and described with reference to FIGS. 9-22 above.

At this point in the process 3800, the cartridges 101 may be assembled as sealed cartridges 101B. Once assembled, the sealed cartridges 101B may be transferred via a transfer process step 3825 using the transfer element 941 and then transported through the transport system 106 to the introduction system 107. The sealed cartridges 101B may then be introduced into the beverage container 109 via a dropping process step 3830. As described above, the dropping process step 3830 may coordinate the insertion of a cartridge 101 into the body of a respective beverage container 109 with the underlying beverage packaging process. The dropping process step 3830 may be performed either prior to filling of the beverage container 109 with the beverage, during the filling process, or after filling of the beverage container 109. As such, the introduction system 107 performing the dropping process step 3830 may be in operable communication with one or more components of the underlying beverage packaging line. For example, the introduction system 107 may include the proximity sensor 110 and a process controller that automates the inserting of the cartridges 101 into the beverage containers 109 in an orchestrated manner with the underlying beverage packaging process. In some embodiments, the dropping process step 3830 may be implemented using the dropping mechanism 2361 or 3161, such as the dropping mechanisms illustrated and described with respect to FIGS. 23-37B.

After the cartridges 101 are inserted into the beverage container 109, the beverage container 109 may undergo a sealing process step 3835 to seal the beverage container 109, thereby creating a sealed packaged beverage. As part of the sealing process step 3835, the assembly and introduction system 100 may include the seal flapper 111 that guides the cartridges 101 lower into the filled beverage container 109 as the beverage container 109 enters the sealer (e.g., a seamer). For example, the seal flapper 111 may be a flexible plastic component secured near the entrance of a seamer such that the seal flapper 111 gently guides and lowers the sealed cartridges 101B into the filled beverage container 109 just before the lid 112 is applied and the beverage container 109 is sealed. The seal flapper 111 ensures consistent seaming of the beverage containers 109 without interruption from the sealed cartridges 101B, which may be floating on or near the top of the beverage container 109 until the cartridge 101 is submerged.

Depending on the arrangement of the beverage packaging process, the assembly and introduction system 100 that performs one or more steps of the process 3800, may be mounted on top of or as part of beverage packaging line (e.g., a canning or bottling line). In some cases, the assembly and introduction system 100 may be positioned between the filling process and the sealing process, while in other cases, the assembly and introduction system 100 may be positioned between the sanitizing process and the filling process. Moreover, while only one assembly and introduction system 100 is described in the following, it should be appreciated that in some embodiments, a single beverage packaging line may be integrated with more than one assembly and introduction system 100.

Figure 39:
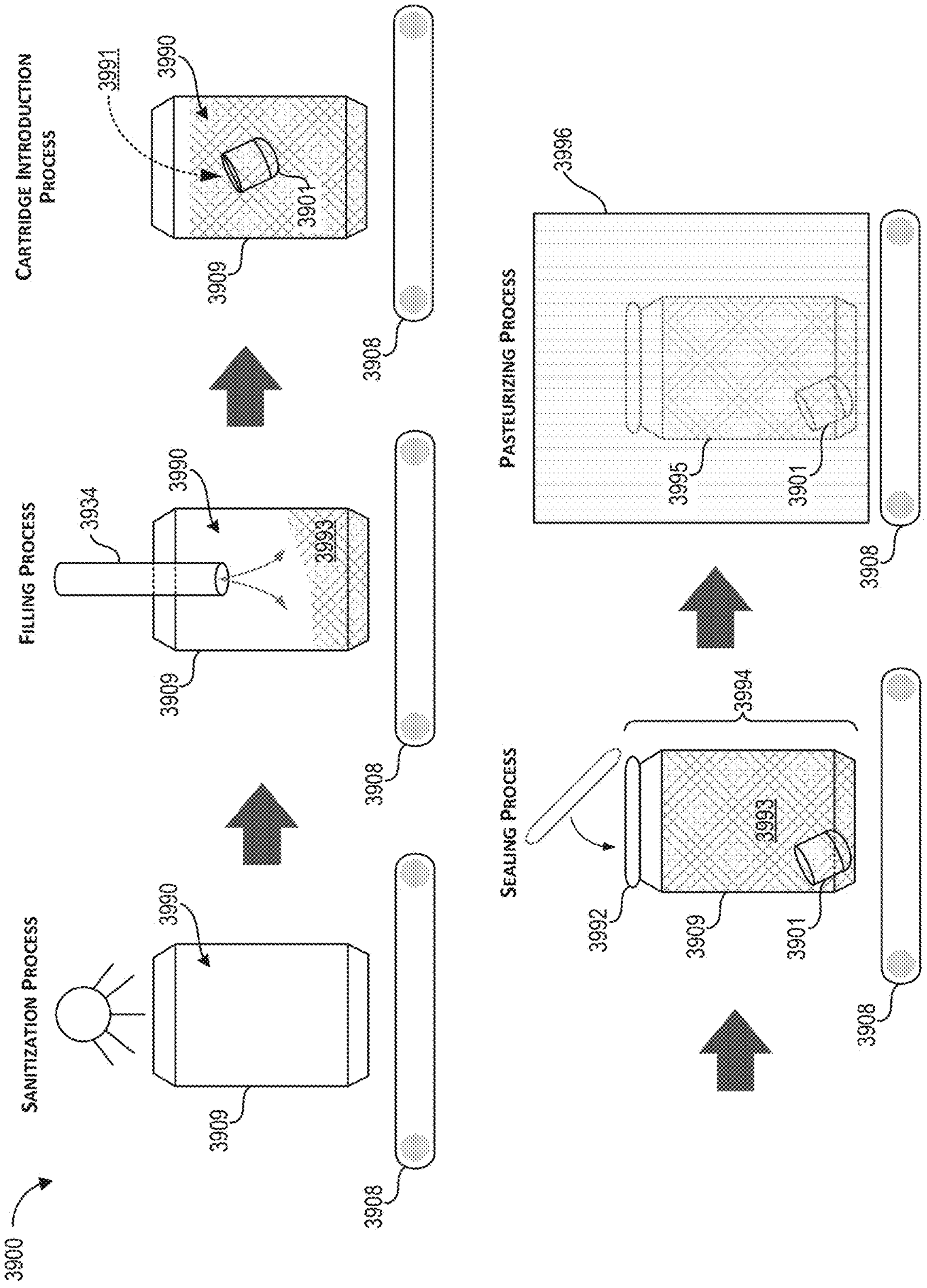
FIG. 39 illustrates an example beverage packaging process, according to an embodiment herein.

Referring now to FIG. 39, an example beverage packaging process 3900 ("the packaging process 3900") is illustrated, according to an embodiment herein. As illustrated, the packaging process 3900 may include multiple steps or subprocesses, such as a sanitization process step, cartridge introduction process step, filling process, sealing process, and pasteurizing process. It should be appreciated that additional steps may be performed within the packaging process 3900 and one or more of the illustrated steps may not be present, depending on the beverage packaging line. Additionally, each of these steps or subprocesses may vary depending on the type of beverage container being packaged via the packaging process 3900. For ease of explanation, the following discussion focuses on the beverage container being an aluminum can, however, it should be appreciated that the following is equally applicable to other types of containers, which may include glass bottles, cardboard containers, or plastic bottles.

During the packaging process 3900, a beverage container 3909, which may be the same or similar to the beverage container 109, of a packaged beverage may be fed or moved between the various steps or subprocesses, such as via a conveyor 3908, which may be the same or similar to the conveyor line 108. In some systems, the beverage container 3909 is transferred along the production line using automated arms, rollers, or guided tracks that maintain the positioning and orientation necessary for each specific stage. In some embodiments, the beverage container 3909 may be moved between different stations for each of the steps or subprocesses, while in other embodiments, a single integrated unit may perform all these steps—sanitizing, cartridge introduction, filling, sealing, labeling, and even packing—without the need for separate machines or manual intervention.

Towards the beginning of the packaging process 3900, a sanitization process step may be performed to sanitize the beverage container 3909 of the packaged beverage. In particular, the sanitization process step may sanitize an interior space 3990 of the beverage container 3909 to ensure it is free of contaminants before the beverage is introduced. Common sanitization methods include rinsing the interior space 3990 with hot water or steam, which helps eliminate bacteria and other microbes. Chemical sanitization may also be employed, using food-safe sanitizers such as chlorine dioxide or peracetic acid, which are then thoroughly rinsed out to ensure no residue remains. In some systems, ultraviolet (UV) light sanitization may be used to sterilize containers, especially for high-speed production lines, as it is a non-invasive and chemical-free method. These sanitization processes may aid in maintaining the cleanliness and safety of the packaged beverage, ensuring that the final product meets health and safety standards.

Once sanitized, a filling process may be performed in which a beverage 3993 is injected into the interior space 3990 of the beverage container 3909. For example, a nozzle 3934 may be inserted into the interior space 3990 of each container 3909 to inject the beverage 3993 into the container 3909. In some embodiments, a cartridge 3901, which may be the same or similar to the cartridge 101, may be inserted into the beverage container 3909 at the same time that the beverage 3993 is injected, prior to, or as illustrated, subsequent to. As can be appreciated, the arrangement of the cartridge introduction process step and the filling process may vary depending on the type of container and/or type of beverage. For example, for a glass bottle, the cartridge 3901 may be inserted before the filling process at least due to the smaller diameter of the bottle neck.

As can be appreciated, the filling process may vary depending on the specific requirements of the beverage 3993 being packaged. For carbonated beverages, such as beer or soda, an isobaric filling process may be used. This method fills the beverage container 3909 under pressure to prevent the loss of carbonation and minimize foam formation. Non-carbonated beverages, like juices or still water, often use gravity filling, where the beverage 3993 is allowed to flow into the beverage container 3909 through the force of gravity, making it a simpler process. For more viscous liquids, such as syrups or smoothies, volumetric filling is employed, where precise quantities are measured and dispensed to ensure consistency. In some cases, hot fill processes are used for beverages 3993 that require pasteurization, such as certain juices or teas, where the liquid is heated before being poured into the container to kill bacteria and extend shelf life. Each filling process may be selected to maintain product integrity while ensuring efficiency and accuracy in the packaging process.

The packaging process 3900 may continue to the cartridge introduction process step, which is also referred to herein as the dropping process. As illustrated, a cartridge 3901, which may be the same or similar to the cartridge 101, may be "dropped" or otherwise inserted 3991 into the interior space 3990 of the beverage container 3909. During the cartridge introduction process step, the cartridge 3901 may be oriented such that the cap 214, which may include a domed surface of the cartridge faces the bottom surface of the beverage container 3909. In other embodiments, the cartridge 3901 may be oriented in other orientations, depending on the packaging process 3900. For example, in some embodiments, the cartridge 3901 may be inserted to have a horizontal orientation, such to be floating on its side once inserted.

The cartridge introduction process step may be performed in a synchronized manner with the packaging process 3900. For example, if the packaging process 3900 packages a single beverage container 3909 at a time, then the cartridge introduction process step 3991 may insert a single cartridge 3901 at a time, matching the pace and timing of the packaging process 3900. In another example, if the packaging process 3900 packages multiple beverage containers at time (e.g., a set of containers at a time), then the cartridge introduction process step 3991 may insert a cartridge 3901 into each of the beverage containers simultaneously, again matching the pace and timing of the packaging process 3900. As described above, a respective chamber (e.g., outer chamber 221) of the cartridge 3901 may fill with the beverage 3993 once inserted to equalize the cartridge 3901 with the internal pressure of the packaged beverage.

As noted above, the cartridge introduction process step 3991 may be paced and set up to match the pace and timing of the underlying packaging process 3900. As such, the assembly and introduction system 100 described herein may include a control system that is in operable communication with one or more components of the packaging process 3900, such as the conveyor 3908 or filler station, such to coordinate the pacing and timing accurately. For example, if there is disruption in the packaging process 3900 that causes the conveyor 3908 to come to a halt, then the assembly and introduction system 101 may receive an indication of the disruption and mirror the subsequent actions of the packaging process 3900, such as pausing the assembly and introducing processes and restarting them again once the conveyor 3908 begins again.

Once the beverage container 3909 is filled with the beverage 3993 to a desired level, the packaging process 3900 may continue to a sealing process. At the sealing process, the beverage container 3909 may be sealed using a sealing mechanism to form the filled beverage 3995. In the illustrated example, a lid 3992 of the container may be secured to a body 3994 of the beverage container 3909 by a sealing mechanism to form the sealed container 3995. Different types of sealing processes can be used depending on the packaging type. For instance, in canning, a double-seam sealing process is common, where the lid 3992 is mechanically crimped and rolled onto the container to create an airtight seal. In bottling, crown caps or screw tops may be applied, using either mechanical pressure or heat to secure the closure. For plastic bottles, induction sealing may be employed, where a foil liner is heated to bond to the bottle's rim, ensuring tamper-evidence and preservation of the product.

Following the sealing process, the sealed container 3995 may be subjected to one or more pasteurizing processes. For example, the sealed container 3995 may be introduced into a pasteurization chamber 3996, where it is heated to a specific temperature for a controlled period to kill harmful microorganisms and extend the shelf life of the product. In a typical tunnel pasteurization process, the sealed container 3995 may pass through a series of temperature-controlled zones, gradually heating and then cooling to ensure that the beverage 3993 is pasteurized without altering its taste or quality. For some beverages, such as beer or certain fruit juices, flash pasteurization may be used, where the product is quickly heated before being cooled and packaged. These pasteurization methods may ensure the safety and longevity of the beverage, particularly for products that are not heavily processed or preserved using additives.

Once pasteurized, the packaged beverages may continue on to one or more subsequent steps, such as a labeling process, where labels are applied to the packaged beverages using adhesive or heat shrink methods to provide product information, branding, and regulatory details. Following labeling, the packaged beverages may be inspected for quality assurance, ensuring that each unit meets the required standards before it is packed for distribution. The packaging step may involve grouping individual units into cartons, trays, or cases, depending on the intended shipping and retail display format. Once packaged, the packaged beverages are prepared for storage or transported to distribution centers, where they are shipped to retailers or directly to consumers, ensuring that the product reaches the market in optimal condition.

Figure 40:
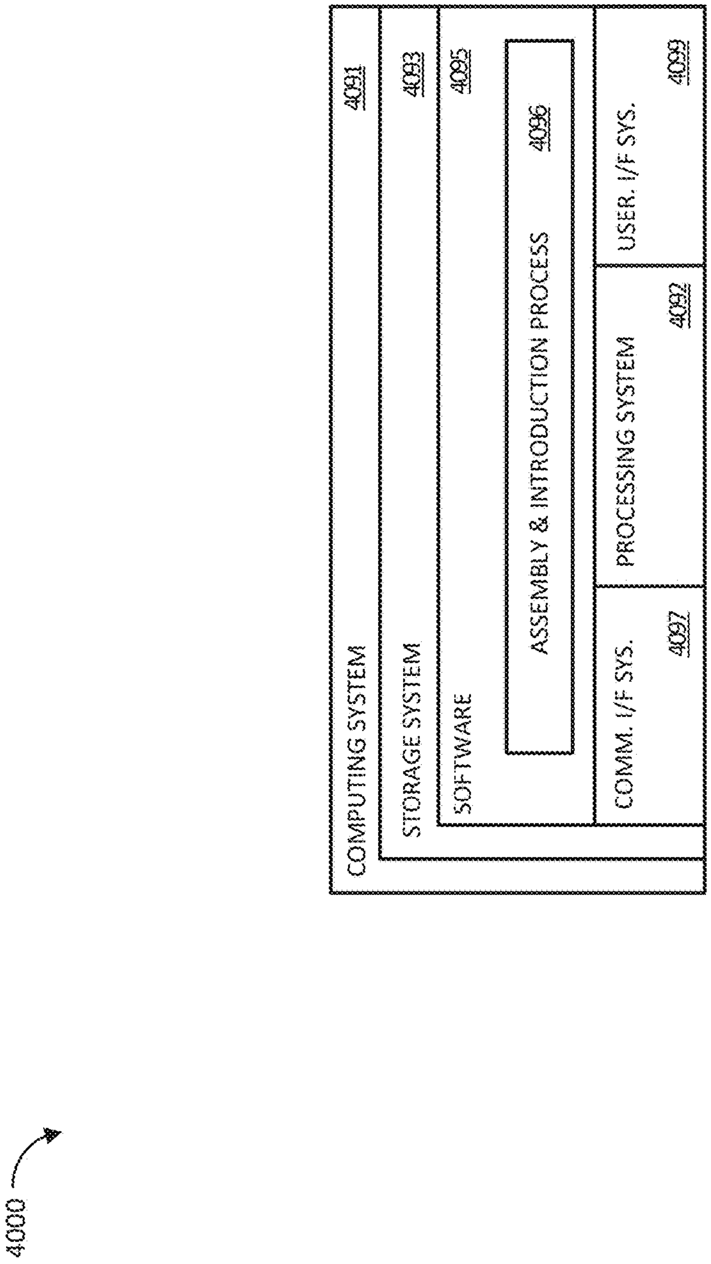
FIG. 40 illustrates a computing system that includes a processing system, a storage system, software, and a communication interface system, according to an embodiment herein.

Referring to FIG. 40, FIG. 40 illustrates a computing apparatus 4000 that may be used to provide one or more functions of the cartridge assembly and introduction process, as described herein. For example, a controller that operates or controls one or more of the above steps, such as the assembly process 3800 or the packaging process 3900 may be or include the computing apparatus 4000. As illustrated, the computing apparatus 4000 includes a computing system 4091 having a processing system 4092 that includes a microprocessor and other circuitry that retrieves and executes software 4095 from storage system 4093. The processing system 4092 may be implemented within a single processing device but may also be distributed across multiple processing devices or sub-systems that cooperate in executing program instructions. Examples of the processing system 4092 include general purpose central processing units, graphical processing units, application specific processors, and logic devices, as well as any other type of processing device, combinations, or variations thereof.

The storage system 4093 may comprise any computer readable storage media readable by processing system 4092 and capable of storing software 4095. The storage system 4093 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations the storage system 4093 may also include computer readable communication media over which at least some of the software 4095 may be communicated internally or externally. The storage system 4093 may be implemented as a single storage device but may also be implemented across multiple storage devices or sub-systems co-located or distributed relative to each other. The storage system 4093 may comprise additional elements, such as a controller capable of communicating with the processing system 4092 or possibly other systems.

The software 4095 (including assembly introduction process 4096) may be implemented in program instructions and among other functions may, when executed by the processing system 4092, direct the processing system 4092 to operate as described with respect to the various operational scenarios, sequences, and processes illustrated herein. For example, the software 4095 may include program instructions for implementing or performing the processes described herein, such as the assembly process 3800 or the packaging process 3900, or controlling any components of the assembly and introduction system 100.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. The software 4095 may include additional processes, programs, or components, such as operating system software, virtualization software, or other application software. The software 4095 may also comprise firmware or some other form of machine-readable processing instructions executable by the processing system 4092.

In general, the software 4095 may, when loaded into the processing system 4092 and executed, transform a suitable apparatus, system, or device (of which computing system 4091 is representative) overall from a general-purpose computing system into a special-purpose computing system customized to generate features, functionality, and user experiences provided by the cartridge assembly and introduction process. Indeed, encoding the software 4095 on the storage system 4093 may transform the physical structure of the storage system 4093. The specific transformation of the physical structure may depend on various factors in different implementations of this description. Examples of such factors may include, but are not limited to, the technology used to implement the storage media of the storage system 4093 and whether the computer-storage media are characterized as primary or secondary storage, as well as other factors.

For example, if the computer readable storage media are implemented as semiconductor-based memory, the software 4095 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 4097 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between the computing system 4091 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

The computing apparatus 4000 may further include a user interface system 4099 that allows for interaction with the assembly and introduction system 100. The user interface system 4099 may include input devices such as keyboards, touchscreens, or control panels, and output devices such as displays or indicators, enabling operators to monitor and control the various processes described herein, including the assembly process 3800 and packaging process 3900.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

Examples are described herein in the context of systems and methods for providing a cartridge assembly and introduction process. Those of ordinary skill in the art will realize that the foregoing description is illustrative only and is not intended to be in any way limiting. Reference is made in detail to implementations of examples as illustrated in the accompanying drawings. The same reference indicators will be used throughout the drawings and the following description to refer to the same or like items.

Additionally, the foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure. In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application-and business-related constraints, and that these specific goals will vary from one implementation to another and from one developer to another.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. That is, the foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in an embodiment," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all the following interpretations of the word: any of the items in the list, all the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example 1 is an assembly system for filling and capping a cartridge for introduction into a beverage container during a packaging process for the beverage container, comprising: a cartridge chute configured to receive the cartridge and to direct the cartridge as the cartridge advances through the assembly system, wherein the cartridge comprises a cap and a body having an inner chamber extending from a top end towards a bottom end of the body; and a filler-capper assembly comprising: a filler assembly comprising at least one nozzle positioned to inject a remediating component into the inner chamber of the cartridge when the cartridge progresses along the cartridge chute; and a capping assembly comprising a sealing element configured to seat the cap of the cartridge onto a top end of the body of the cartridge after the remediating component is injected into the inner chamber of the cartridge.

Example 2 is the assembly system of any previous or subsequent example, wherein the at least one nozzle of the filler assembly comprises: a first nozzle configured to inject an inert gas into the inner chamber of the cartridge; and a second nozzle configured to inject the remediating component into the inner chamber of the cartridge, wherein the first nozzle and the second nozzle are positioned sequentially along the cartridge chute such that the first nozzle injects the inert gas into the inner chamber of the cartridge and the second nozzle subsequently injects the remediating component into the inner chamber as the cartridge advances along the cartridge chute.

Example 3 is the assembly system of any previous or subsequent example, wherein the capping assembly further comprises: a tamper positioned to apply pressure to the cap of the cartridge after the sealing element seats the cap onto the top end of the body, thereby sealing the cartridge.

Example 4 is the assembly system of any previous or subsequent example, wherein the tamper comprises a C-shaped pressing surface configured to accommodate retracting for the sealing element as the tamper applies pressure onto the cap of the cartridge.

Example 5 is the assembly system of any previous or subsequent example, wherein the sealing element comprises a roller mounted to an arm, the arm being coupled to a motor and configured to rotate about an axis such that rotation of the arm brings the roller into contact with a cap and moves the cap onto a top end of a cartridge body.

Example 6 is the assembly system of any previous or subsequent example, wherein the cartridge chute comprises one or more assist jet slots configured to eject an inert gas to advance the cartridge along the cartridge chute.

Example 7 is the assembly system of any previous or subsequent example, wherein the assembly system comprises: a retaining member coupled to a piston and configured to retain the cartridge in a staging position after a sealed cartridge is formed by sealing the cap onto the body of the cartridge; and a transfer element coupled to a motor and configured to transfer the sealed cartridge into an outlet of the assembly system, wherein the retaining member and the transfer element are configured to operate in a coordinated manner such that transfer element moves the sealed cartridge concurrently as the retaining member retracts, thereby allowing the sealed cartridge to pass through the outlet of the assembly system.

Example 8 is the assembly system of any previous or subsequent example, wherein the cartridge chute includes guide walls configured to maintain the cartridge in an orientation that retains the cap perpendicular to a longitudinal axis of the cartridge chute during advancement of the cartridge until engagement by the sealing element.

Example 9 is the assembly system of any previous or subsequent example, further comprising a sanitization unit positioned upstream of the cartridge chute and configured to sanitize the cartridge before the cartridge enters the cartridge chute.

Example 10 is a filler-capper assembly for filling and sealing a cartridge comprising one or more remediating components for enhancing packaged beverages, comprising: a filler assembly comprising at least one nozzle positioned to inject a remediating component into an inner chamber of the cartridge when the cartridge progresses through the filler-capper assembly, wherein the cartridge comprises a cap and a body including the inner chamber which extends from a top end towards a bottom end of the body; and a capping assembly comprising a sealing element configured to position the cap of the cartridge onto the body after filling with the remediating component.

Example 11 is the filler-capper assembly of any previous or subsequent example, wherein the capping assembly further comprises: a tamper positioned above the cartridge and configured to apply downward pressure to the cap of the cartridge after the sealing element seats the cap onto the body, thereby sealing the cartridge.

Example 12 is the filler-capper assembly of any previous or subsequent example, wherein the capping assembly further comprises: a tamper configured to apply downward pressure onto the cap of the cartridge after the sealing element seats the cap onto the body, wherein the tamper and the sealing element are configured to operate in a coordinated manner such that the tamper extends concurrently as the sealing element seats a cap onto a cartridge body, and wherein the tamper comprises a C-shaped pressing surface configured to accommodate retraction of the sealing element once the cap has been seated.

Example 13 is the filler-capper assembly of any previous or subsequent example, wherein the at least one nozzle of the filler assembly comprises: a first nozzle configured to inject an inert gas into the inner chamber of the cartridge; and a second nozzle configured to inject the remediating component into the inner chamber of the cartridge, wherein the first nozzle and the second nozzle are positioned sequentially along the filler-capper assembly such that the first nozzle injects the inert gas into the inner chamber of the cartridge and the second nozzle subsequently injects the remediating component into the inner chamber as the cartridge advances through the filler-capper assembly.

Example 14 is the filler-capper assembly of any previous or subsequent example, wherein the sealing element comprises a roller mounted to an arm, the arm being coupled to a motor and configured to rotate about an axis such that rotation of the arm brings the roller into contact with a cap and moves the cap onto a top end of the body to form a sealed cartridge.

Example 15 is the filler-capper assembly of any previous or subsequent example, wherein: the filler-capper assembly is configured to fill and cap at least two cartridges; and the filler-capper assembly further comprises: a transfer element mounted to the arm and configured to transfer the sealed cartridge into an outlet of the filler-capper assembly when the arm rotates about the axis, wherein the sealing element and the transfer element are configured to operate in tandem such that rotation of the arm causes: the roller to contact the cap of a first cartridge of the at least two cartridges; and the transfer element to move a second cartridge of the at least two cartridges through the outlet of the filler-capper assembly, wherein the sealed cartridge comprises the second cartridge.

Example 16 is a method for assembling a plurality of cartridges for introduction into a plurality of beverage containers, comprising: receiving, by a cartridge chute of an assembly system, the plurality of cartridges, wherein each cartridge of the plurality of cartridges comprises a cap and a body having an inner chamber extending from a top end towards a bottom end of the body; filling, by a filler assembly of the assembly system, an inner chamber of a first cartridge of the plurality of cartridges with a remediating component; once filled, progressing, by the cartridge chute, the first cartridge from the filler assembly to a capping assembly of the assembly system; capping, by the capping assembly, the first cartridge using a sealing element configured to seat the cap onto the top end of the body of the cartridge, thereby forming a sealed cartridge; progressing, by the cartridge chute, the sealed cartridge to a staging position; retaining, by the capping assembly, the sealed cartridge in the staging position until the assembly detects that a second cartridge is sealed by the capping assembly; and transferring, by the capping assembly, the sealed cartridge through an outlet of the assembly system.

Example 17 is the method of any previous or subsequent example, wherein filling, by the filler assembly, the inner chamber of the first cartridge with the remediating component comprises: dispensing, by a peristaltic pump, a predetermined volume of the remediating component through a fill nozzle positioned above the inner chamber; and maintaining the oxygen-deprived environment by applying an inert gas blanket over the first cartridge during the filling operation.

Example 18 is the method of any previous or subsequent example, wherein capping, by the capping assembly, the first cartridge using the sealing element comprises: positioning, by the sealing element comprising a roller mounted to an arm, the cap onto the top end of the body by rotating the arm about an axis to bring the roller into contact with the cap; and applying, by the tamper, downward pressure onto the cap concurrently as the sealing element seats the cap, wherein the tamper comprises a C-shaped pressing surface that accommodates retraction of the sealing element.

Example 19 is the method of any previous or subsequent example, further comprising: sanitizing, by a sanitization unit, the plurality of cartridges by injecting ionized air into the inner chambers of the plurality of cartridges to remove contaminants; and advancing, by a plurality of assist jets, the plurality of cartridges along a track from the sanitization unit to the cartridge chute, wherein the assist jets use an inert gas.

Example 20 is the method of any previous or subsequent example, wherein the assembly system is configured to fill and cap the plurality of cartridges simultaneously, the method further comprising: filling, by the filler assembly, inner chambers of at least two cartridges concurrently with remediating components using multiple fill nozzles positioned above respective inner chambers; capping, by the capping assembly, the at least two cartridges simultaneously using the sealing element, wherein the sealing element comprises at least one roller mounted to a rotating arm, wherein rotation of the rotating arm causes the roller to contact respective caps and seat the caps onto respective bodies of the at least two cartridges simultaneously; and coordinating, by the rotating arm, the capping operation with a transfer operation such that as the sealing element seats the caps onto the at least two cartridges, the transfer element mounted to the rotating arm simultaneously moves a second set of previously sealed cartridges through the outlet of the assembly system.

Example 21 is the method of any previous or subsequent example, wherein the assembly system further comprises a process controller in operable communication with a beverage packaging line during the packaging process, and the method further comprises: coordinating, by the process, timing of the transferring step with movement of the plurality of beverage containers along a conveyor system; and inserting, by an introduction system, each sealed cartridge into a respective beverage container of the plurality of beverage containers during a packaging process for the beverage containers.

Example 22 is the method of any previous or subsequent example, wherein inserting each sealed cartridge comprises: detecting, by a proximity sensor, presence of a beverage container positioned beneath the introduction system; and releasing, by the introduction system, the sealed cartridge through a dropping slot of the introduction system into the beverage container.

Example 23 is a transport system for conveying cartridges from a source to an introduction system for introduction of the cartridges into a beverage container during a packaging process the beverage container, comprising: an inlet comprising an inlet opening configured to receive cartridges from the source; a straight-line tube having a diameter approximately 1.1 times a width of the cartridges; a first elbow fluidly connecting the inlet to the straight-line tube; and a transition guide fluidly connecting the straight-line tube to the introduction system, the transition guide comprising an outlet opening through which the cartridges are dispensed into the introduction system.

Example 24 is the transport system of any previous or subsequent example, further comprising a second elbow fluidly connecting the straight-line tube to the transition guide.

Example 25 is the transport system of any previous or subsequent example, wherein the straight-line tube comprises one or more sensor slots disposed along a top surface of the straight-line tube, the one or more sensor slots configured to receive at least one pressure sensor for detecting the presence or movement of cartridges in the straight-line tube.

Example 26 is the transport system of any previous or subsequent example, further comprising a control system operably coupled to the at least one pressure sensor, the control system being configured to receive signals from the at least one pressure sensor indicative of cartridge movement within the straight-line tube.

Example 27 is the transport system of any previous or subsequent example, further comprising at least one assist jet configured to inject a gas into the straight-line tube to propel the cartridges through the transport system.

Example 28 is the transport system of any previous or subsequent example, wherein the at least one assist jet comprises a first assist jet positioned adjacent the inlet and a second assist jet positioned adjacent the transition guide.

Example 29 is the transport system of any previous or subsequent example, wherein: the transport system further comprises at least one pressure sensor operably coupled to the straight-line tube and configured to detect the presence or movement of the cartridges in the straight-line tube; and the control system is operably coupled to the at least one assist jet and is configured to modulate operation of the at least one assist jet in response to the signals from the at least one pressure sensor.

Example 30 is the transport system of any previous or subsequent example, wherein modulation of the at least one assist jet by the control system is configured to adjust a flow rate of gas into the straight-line tube so as to control a speed of the cartridges through the transport system.

Example 31 is the transport system of any previous or subsequent example, wherein modulation of the at least one assist jet by the control system is configured to selectively increase propulsion when a cartridge is sensed at the inlet and decrease propulsion when a cartridge is sensed adjacent the transition guide.

Example 32 is the transport system of any previous or subsequent example, wherein the control system is configured to synchronize modulation of the at least one assist jet with operation of the introduction system such that the cartridges are released into the introduction system at a controlled rate corresponding to movement of a plurality of beverage containers during the packaging process.

Example 33 is the transport system of any previous or subsequent example, wherein the gas injection by the at least one assist jet is an inert gas selected from the group consisting of: nitrogen or carbon dioxide.

Example 34 is a transport system for conveying cartridges from a source to an introduction system during a packaging process, comprising: an inlet comprising an inlet opening configured to receive cartridges from the source; at least one straight-line tube extending between the inlet and a transition guide, the at least one straight-line tube having a diameter approximately at least 1.1 times a width of the cartridges; a plurality of assist jet slots disposed along the at least one straight-line tube, each assist jet slot being configured to receive a assist jet for injecting a gas into the at least one straight-line tube to propel the cartridges; a plurality of pressure sensors disposed along the at least one straight-line tube and configured to detect the presence or movement of the cartridges; and at least one vent positioned along the at least one straight-line tube to discharge excess gas during propulsion of the cartridges through the transport system.

Example 35 is the transport system of any previous or subsequent example, wherein the plurality of assist jet slots comprises at least a first assist jet slot positioned adjacent the inlet and a second assist jet slot positioned adjacent the transition guide.

Example 36 is the transport system of any previous or subsequent example, wherein the plurality of pressure sensors are disposed at spaced intervals along a top surface of the at least one straight-line tube.

Example 37 is the transport system of any previous or subsequent example, further comprising a control system operably coupled to the plurality of pressure sensors and the plurality of assist jets, the control system being configured to modulate gas injection from the plurality of assist jets in response to signals from the plurality of pressure sensors.

Example 38 is the transport system of any previous or subsequent example, wherein modulation of the plurality of assist jets by the control system is configured to maintain the cartridges within a predetermined speed range through the transport system.

Example 39 is the transport system of any previous or subsequent example, wherein the at least one straight-line tube connects to the introduction system at an angle of at least 10 degrees relative to a longitudinal axis of a conveyor line carrying the beverage containers along the packaging process.

Example 40 is a method of transporting cartridges from a source to an introduction system during a packaging process, comprising: receiving cartridges from the source at an inlet of a transport system; directing the cartridges from the inlet into a straight-line tube via a first elbow, the straight-line tube having a diameter approximately 1.1 times a width of the cartridges; propelling the cartridges through the straight-line tube by injecting a gas into the straight-line tube through at least one assist jet; and dispensing the cartridges from a transition guide of the transport system into the introduction system.

Example 41 is the method of any previous or subsequent example, further comprising directing the cartridges from the straight-line tube to the transition guide through a second elbow fluidly connecting the straight-line tube to the transition guide.

Example 42 is the method of any previous or subsequent example, further comprising detecting, by at least one pressure sensor disposed along the straight-line tube, the presence or movement of the cartridges in the straight-line tube.

Example 43 is the method of any previous or subsequent example, further comprising transmitting, by the at least one pressure sensor, a signal to a control system, and modulating, by the control system, operation of the at least one assist jet in response to the signal.

Example 44 is the method of any previous or subsequent example, wherein modulating the operation of the at least one assist jet comprises adjusting a flow rate of the gas injected into the straight-line tube to control a speed of the cartridges through the transport system.

Example 45 is the method of any previous or subsequent example, wherein modulating the operation of the at least one assist jet comprises selectively increasing propulsion when a cartridge is detected at the inlet and decreasing propulsion when a cartridge is detected adjacent the transition guide.

Example 46 is an introduction system for dispensing cartridges into a moving beverage container during a packaging process for beverage containers, comprising: a transition guide configured to receive cartridges from a source; a dropping mechanism disposed below the transition guide, the dropping mechanism being actuatable between: a retaining position in which the dropping mechanism retains a first cartridge received from the transition guide, and a releasing position in which the dropping mechanism permits the first cartridge to be released into a beverage container; and a control system configured to actuate the dropping mechanism from the retaining position to the releasing position in synchronization with movement of the beverage container such that the first cartridge is released into the beverage container.

Example 47 is the introduction system of any previous or subsequent example, wherein: the dropping mechanism comprises a rotatable member and a retaining plate, the transition guide being disposed on a first side of the rotatable member and the retaining plate being disposed on an opposing side of the rotatable member; the retaining plate comprising a dropping slot positioned to align with a conveyor line along which the beverage container is moved below the introduction system; and the rotatable member and the retaining plate being cooperatively aligned such that a first cartridge received in a first slot of the rotatable member is retained against a retaining surface of the retaining plate until the first slot rotates into alignment with the dropping slot, whereby the first cartridge is released through the dropping slot into the beverage container.

Example 48 is the introduction system of any previous or subsequent example, wherein the rotatable member comprises a starwheel having at least three slots, each slot being sized to receive a cartridge from the transition guide, the starwheel being configured to rotate about a central axis such that, upon indexed rotation of the starwheel between successive slots about the central axis, at least one slot is aligned with the transition guide to receive a respective cartridge while at least one other slot is simultaneously aligned with the dropping slot to release the first cartridge.

Example 49 is the introduction system of any previous or subsequent example, wherein the introduction system further comprises a proximity sensor configured to sense the beverage container as it moves along a conveyor line, the proximity sensor being further configured to transmit a signal to the control system upon sensing the beverage container, the control system actuating the dropping mechanism into the releasing position in response to the signal.

Example 50 is the introduction system of any previous or subsequent example, wherein: the dropping mechanism comprises a rotatable member having a plurality of slots configured to receive cartridges from the transition guide; and the introduction system further comprises: a top plate positioned on a first side of the rotatable member between the transition guide and the rotatable member so as to align with at least one of the plurality of slots during indexed rotation of the rotatable member; and a cartridge sensor, wherein the top plate comprises at least one sensing window positioned to permit the cartridge sensor to detect whether a respective slot of the plurality of slots contains a cartridge, the cartridge sensor being configured to transmit a signal to the control system upon detecting the cartridge in the respective slot, the signal indicating that the respective slot contains the cartridge and is ready for release of the cartridge upon detection of the beverage container.

Example 51 is the introduction system of any previous or subsequent example, wherein the dropping mechanism comprises a rotatable member having a plurality of slots distributed circumferentially about a central axis of the rotatable member, the plurality of slots being configured such that, upon an indexed rotation of the rotatable member about the central axis, at least one slot retains a cartridge in the retaining position while at least one other slot simultaneously releases a second cartridge in the releasing position, the indexed rotation comprising movement of the rotatable member sufficient to advance a first slot of the plurality of slots from the retaining position to the releasing position.

Example 52 is the introduction system of any previous or subsequent example, wherein: the dropping mechanism comprises a sliding gate and a releasing plate, the transition guide being disposed on a first side of the sliding gate and the releasing plate disposed on an opposing side of the sliding gate; the sliding gate comprises: a dropping slot configured to align with a conveyor line along which the beverage container is moved below the introduction system; and a retaining surface configured to align with the transition guide to receive the first cartridge when the dropping mechanism is in the retaining position; and wherein the sliding gate and the releasing plate are aligned such that the first cartridge received by the sliding gate is retained against the retaining surface until the sliding gate is translated into the releasing position, thereby aligning the dropping slot of the sliding gate with an opening in the releasing plate to permit the first cartridge to be released into the beverage container.

Example 53 is the introduction system of any previous or subsequent example, wherein the sliding gate is configured to translate linearly between the retaining position and the releasing position.

Example 54 is the introduction system of any previous or subsequent example, wherein the sliding gate is configured to pivot about a hinge between the retaining position and the releasing position.

Example 55 is the introduction system of any previous or subsequent example, wherein the control system is configured to actuate the sliding gate in synchronization with movement of the beverage container such that the dropping slot is aligned with the releasing plate when the beverage container is positioned below the introduction system.

Example 56 is the introduction system of any previous or subsequent example, wherein: the dropping mechanism further comprises a retaining pin fixed relative to the sliding gate, the retaining pin being positioned to engage the first cartridge against the retaining surface to prevent the first cartridge from moving toward the dropping slot while the sliding gate is in the retaining position; and the sliding gate comprises a retaining pin slot configured to receive the retaining pin and permit translation of the sliding gate around the retaining pin as the sliding gate is moved into the releasing position.

Example 57 is the introduction system of any previous or subsequent example, wherein the dropping mechanism comprises: a dropping slot configured to align with a conveyor line along which the beverage container is moved below the introduction system; and a retaining surface configured to hold a cartridge in the retaining position until the dropping slot is advanced into alignment to permit release of the cartridge, wherein the control system is configured to actuate the dropping mechanism in synchronization with movement of the beverage container so as to transition the dropping mechanism from the retaining position to the releasing position, thereby releasing the cartridge through the dropping slot into the beverage container when the beverage container is positioned below the introduction system.

Example 58 is the introduction system of any previous or subsequent example, further comprising a proximity sensor configured to detect the beverage container as it moves along the conveyor line, the proximity sensor being configured to transmit a signal to the control system upon detecting the beverage container, wherein the control system is configured to actuate the dropping mechanism from the retaining position to the releasing position in response to the signal.

Example 59 is an introduction system for dispensing cartridges into a moving beverage container during a packaging process for beverage containers, comprising: a transition guide configured to receive cartridges from a source; a sliding gate disposed below the transition guide and movable between a retaining position and a releasing position, the sliding gate comprising: a retaining surface configured to support a cartridge received from the transition guide when the sliding gate is in the retaining position and a dropping slot configured to align with the cartridge when the sliding gate is in the releasing position to permit the cartridge to be released; and a releasing plate disposed on an opposing side of the sliding gate from the transition guide, the releasing plate comprising an opening aligned with a conveyor line along which the beverage container is moved below the introduction system, such that when the sliding gate is moved into the releasing position the cartridge is released through the dropping slot and the opening of the releasing plate into the beverage container.

Example 60 is the introduction system of any previous or subsequent example, wherein the sliding gate is configured to translate linearly between the retaining position and the releasing position.

Example 61 is the introduction system of any previous or subsequent example, wherein the sliding gate is configured to pivot about a hinge between the retaining position and the releasing position.

Example 62 is the introduction system of any previous or subsequent example, wherein: the sliding gate further comprises a retaining pin slot; the introduction system comprises a retaining pin fixed relative to the sliding gate, the retaining pin being positioned to engage the cartridge against the retaining surface when the sliding gate is in the retaining position; and the retaining pin slot being configured to receive the retaining pin as the sliding gate is moved into the releasing position.

Example 63 is the introduction system of any previous or subsequent example, wherein the sliding gate and the releasing plate are cooperatively aligned such that the cartridge is retained against the retaining surface until the sliding gate is moved into the releasing position, thereby aligning the dropping slot with the opening of the releasing plate to permit release of the cartridge into the beverage container.

Example 64 is the introduction system of any previous or subsequent example, further comprising a control system operably coupled to the sliding gate, the control system being configured to actuate the sliding gate in synchronization with movement of the beverage container such that the dropping slot is aligned with the opening of the releasing plate when the beverage container is positioned below the introduction system.

Example 65 is the introduction system of any previous or subsequent example, wherein the introduction system is mounted relative to the conveyor line such that a central axis of the introduction system is oriented at least 10 degrees off from a longitudinal axis of the conveyor line.

Example 66 is an introduction system for dispensing cartridges into a moving beverage container during a packaging process for beverage containers, the system comprising: a transition guide configured to receive cartridges from a source; a rotatable member disposed below the transition guide and configured to rotate about a central axis between a retaining position and a releasing position, wherein the rotatable member comprises: a plurality of slots distributed circumferentially about the central axis, each slot being sized to receive a cartridge from the transition guide and to retain the cartridge when in the retaining position and to release the cartridge when in the releasing position; and a retaining plate disposed adjacent the rotatable member on an opposing side from the transition guide, the retaining plate comprising a dropping slot positioned to align with a conveyor line along which the beverage container is moved below the introduction system, wherein indexed rotation of the rotatable member about the central axis advances at least one slot containing a retained cartridge from the retaining position into alignment with the dropping slot of the retaining plate, thereby releasing the retained cartridge into the beverage container.

Example 67 is the introduction system of any previous or subsequent example, wherein the rotatable member comprises a starwheel having at least three of the plurality of slots.

Example 68 is the introduction system of any previous or subsequent example, wherein, upon indexed rotation of the rotatable member about the central axis, at least one of the plurality of slots is aligned with the transition guide to receive a cartridge while at least one other slot is simultaneously aligned with the dropping slot of the retaining plate to release the retained cartridge.

Example 69 is the introduction system of any previous or subsequent example, further comprising a top plate disposed on a first side of the rotatable member between the transition guide and the rotatable member, the top plate being configured to align with at least one of the plurality of slots during indexed rotation of the rotatable member.

Example 70 is the introduction system of any previous or subsequent example, wherein the top plate comprises at least one sensing window positioned to permit a cartridge sensor to detect whether a respective slot of the plurality of slots contains the retained cartridge, the cartridge sensor being configured to transmit a signal to a control system upon detecting the retained cartridge in the respective slot.

Example 71 is the introduction system of any previous or subsequent example, further comprising a proximity sensor configured to detect the beverage container as it moves along the conveyor line, the proximity sensor being configured to transmit a signal to a control system, wherein the control system is configured to actuate indexed rotation of the rotatable member in synchronization with movement of the beverage container.

Example 72 is a method of dispensing cartridges into beverage containers during a packaging process, comprising: transporting a plurality of beverage containers along a conveyor line; receiving a plurality of cartridges from a source at a transition guide of an introduction system, wherein the introduction system comprises a dropping mechanism configured to transition between a retaining position and a releasing position; retaining, by the dropping mechanism, a first cartridge of the plurality of cartridges in the retaining position; detecting a first beverage container of the plurality of beverage containers as the first beverage container moves along the conveyor line; actuating the dropping mechanism in response to detecting the first beverage container to move the dropping mechanism into the releasing position; and releasing, by the dropping mechanism, the first cartridge into the first beverage container while the first beverage container is moving along the conveyor line beneath the introduction system.

Example 73 is the method of any previous or subsequent example, wherein: the dropping mechanism comprises: a rotatable member having a plurality of slots; and a retaining plate comprising a dropping slot; and actuating the dropping mechanism comprises rotating the rotatable member about a central axis to advance a first slot of the plurality of slots containing the first cartridge from the retaining position into alignment with the dropping slot of the retaining plate for release into the first beverage container.

Example 74 is the method of any previous or subsequent example, wherein: the dropping mechanism comprises a sliding gate and a releasing plate, the sliding gate comprising a retaining surface and a dropping slot; and actuating the dropping mechanism comprises translating the sliding gate from the retaining position to the releasing position such that the dropping slot of the sliding gate is aligned with an opening of the releasing plate to permit release of the first cartridge into the first beverage container.

Example 75 is the method of any previous or subsequent example, wherein: the method further comprises sensing, by a proximity sensor, movement of the first beverage container along the conveyor line; and actuating the dropping mechanism comprises transmitting a signal from the proximity sensor to a control system when the first beverage container is detected.

Example 76 is the method of any previous or subsequent example, further comprising: detecting, by cartridge sensor, whether the dropping mechanism contains a cartridge prior to release; and transmitting, by the cartridge sensor, a signal to a control system indicating that the dropping mechanism is loaded and ready for release.

Example 77 is the method of any previous or subsequent example, wherein the dropping mechanism simultaneously retains a second cartridge of the plurality of cartridges in the retaining position while releasing the first cartridge into the first beverage container.

What is claimed is:

1. A transport system for conveying cartridges from a source to an introduction system for introduction of the cartridges into a beverage container during a packaging process of the beverage container, the transport system comprising:

an inlet comprising an inlet opening configured to receive cartridges from the source;

a straight-line tube having an inner diameter that is 1.1 to 1.3 times a width of the cartridges, wherein the straight-line tube comprises one or more sensor slots disposed along a top surface of the straight-line tube, the one or more sensor slots configured to receive at least one pressure sensor for detecting the presence or movement of cartridges in the straight-line tube;

a first elbow fluidly connecting the inlet to the straight-line tube; and a transition guide fluidly connecting the straight-line tube to the introduction system, the transition guide comprising an outlet opening through which the cartridges are dispensed into the introduction system.

2. The transport system of claim 1, further comprising a second elbow fluidly connecting the straight-line tube to the transition guide.

3. The transport system of claim 1, further comprising a control system operably coupled to the at least one pressure sensor, the control system being configured to receive signals from the at least one pressure sensor indicative of cartridge movement within the straight-line tube.

4. The transport system of claim 1, further comprising at least one assist jet configured to inject a gas into the straight-line tube to propel the cartridges through the transport system.

5. The transport system of claim 4, wherein the at least one assist jet comprises a first assist jet positioned adjacent the inlet and a second assist jet positioned adjacent the transition guide.

6. The transport system of claim 4, wherein:

the control system is operably coupled to the at least one assist jet and is configured to modulate operation of the at least one assist jet in response to the signals from the at least one pressure sensor.

7. The transport system of claim 6, wherein modulation of the at least one assist jet by the control system is configured to adjust a flow rate of gas into the straight-line tube so as to control a speed of the cartridges through the transport system.

8. The transport system of claim 6, wherein modulation of the at least one assist jet by the control system is configured to selectively increase propulsion when a cartridge is sensed at the inlet and decrease propulsion when a cartridge is sensed adjacent the transition guide.

9. The transport system of claim 6, wherein the control system is configured to synchronize modulation of the at least one assist jet with operation of the introduction system such that the cartridges are released into the introduction system at a controlled rate corresponding to movement of a plurality of beverage containers during the packaging process.

10. The transport system of claim 4, wherein the gas injection by the at least one assist jet is an inert gas selected from the group consisting of: nitrogen or carbon dioxide.

11. A method of transporting cartridges from a source to an introduction system during a packaging process, the method comprising:

receiving cartridges from the source at an inlet of a transport system;

directing the cartridges from the inlet into a straight-line tube via a first elbow, the straight-line tube having an inner diameter that is 1.1 to 1.3 times a width of the cartridges;

propelling the cartridges through the straight-line tube by injecting a gas into the straight-line tube through at least one assist jet, wherein:

the straight-line tube comprises one or more sensor slots disposed along a top surface of the straight-line tube, the one or more sensor slots configured to receive at least one pressure sensor for detecting the presence or movement of the cartridges in the straight-line tube; and operation of the at least one assist jet is based on signals from the at least one pressure sensor; and dispensing the cartridges from a transition guide of the transport system into the introduction system.

12. The method of claim 11, further comprising detecting, by at least one pressure sensor disposed along the straight-line tube, the presence or movement of the cartridges in the straight-line tube.

13. The method of claim 12, further comprising:

transmitting, by the at least one pressure sensor, a signal to a control system; and modulating, by the control system, operation of the at least one assist jet in response to the signal, wherein modulating the operation of the at least one assist jet comprises at least one of:

adjusting a flow rate of the gas injected into the straight-line tube to control a speed of the cartridges through the transport system; or selectively increasing propulsion when a cartridge is detected at the inlet and decreasing propulsion when a cartridge is detected adjacent the transition guide.

14. The transport system of claim 1, wherein:

the one or more sensor slots comprise a plurality of sensor slots spaced along the straight-line tube; and the plurality of sensor slots are disposed at spaced intervals along the top surface of the straight-line tube.

15. The transport system of claim 1, wherein the straight-line tube comprises one or more assist jet slots configured to receive at least one assist jet.

16. The transport system of claim 1, further comprising at least one vent positioned along the straight-line tube and configured to discharge excess gas during propulsion of the cartridges through the transport system.

17. The transport system of claim 1, wherein:

the straight-line tube comprises a plurality of straight-line tubes; and a final straight-line tube of the plurality of straight-line tubes connects to the transition guide and is oriented at an angle of at least 10 degrees relative to a longitudinal axis of a conveyor line carrying the beverage containers during the packaging process.

18. The transport system of claim 1, wherein the one or more sensor slots comprise a first sensor slot positioned adjacent the inlet and a second sensor slot positioned adjacent the transition guide.

19. The method of claim 11, further comprising discharging excess gas from the straight-line tube through at least one vent positioned along the straight-line tube during propulsion of the cartridges.

20. The method of claim 11, wherein modulating operation of the at least one assist jet comprises maintaining the cartridges within a predetermined speed range through the transport system.

* * * * *